United States Patent
Kato

(10) Patent No.: US 7,999,861 B2
(45) Date of Patent: Aug. 16, 2011

(54) IMAGE PROCESSING APPARATUS FOR GENERATING COMPOSITE IMAGE WITH LUMINANCE RANGE OPTIMIZED FOR A DESIGNATED AREA

(75) Inventor: Yutaka Kato, Fukuchiyama (JP)

(73) Assignee: Omron Corporation, Kyoto (JP)

( * ) Notice: Subject to any disclaimer, the term of this patent is extended or adjusted under 35 U.S.C. 154(b) by 350 days.

(21) Appl. No.: 12/402,240

(22) Filed: Mar. 11, 2009

(65) Prior Publication Data
US 2009/0231469 A1 Sep. 17, 2009

(30) Foreign Application Priority Data
Mar. 14, 2008 (JP) ................ P2008-065757

(51) Int. Cl.
*H04N 9/68* (2006.01)
(52) U.S. Cl. ............ 348/234; 348/362; 348/22.1
(58) Field of Classification Search .......... 348/234, 348/222.1, 221.1, 229.1, 360, 362, 86, 82; 250/208.1
See application file for complete search history.

(56) References Cited

U.S. PATENT DOCUMENTS

| | | | | |
|---|---|---|---|---|
| 7,190,402 | B2* | 3/2007 | Ban et al. | 348/362 |
| 2005/0178949 | A1* | 8/2005 | Saeki | 250/208.1 |
| 2005/0285860 | A1* | 12/2005 | Pfister et al. | 345/426 |
| 2007/0145136 | A1* | 6/2007 | Wiklof et al. | 235/454 |
| 2009/0174795 | A1* | 7/2009 | Kato et al. | 348/234 |

FOREIGN PATENT DOCUMENTS
JP 2002-334326 11/2002
* cited by examiner

*Primary Examiner* — Nelson D. Hernández Hernández
(74) *Attorney, Agent, or Firm* — Foley & Lardner LLP

(57) ABSTRACT

When an area desired to be displayed with high accuracy and an area desired to be inspected and measured with high accuracy in a measuring object are smaller than a photographing range, the entire area of a composite image is displayed and designation of an area is received, to thereby generate an image of the entire area in which composition processing of optimizing luminance of pixels included in this area is performed. Therefore, an input part is provided for receiving the setting of a designated area in image data, a composite luminance distribution is calculated based on the size of a standardized luminance distribution value in the designated area, and composite image data is generated.

7 Claims, 28 Drawing Sheets

Fig. 5
| Exposure time (second) | Brightness range | Brightness lower limit value |
|---|---|---|
| 1/10 | 10 to 30 | 20 |
| 1/20 | 20 to 40 | 30 |
| 1/40 | 30 to 50 | 40 |
| 1/80 | 40 to 60 | 50 |
| 1/160 | 50 to 70 | 60 |
| 1/320 | 60 to 80 | 70 |
| 1/640 | 70 to 90 | 80 |
| 1/1280 | 80 to 100 | 90 |
Fig. 6A
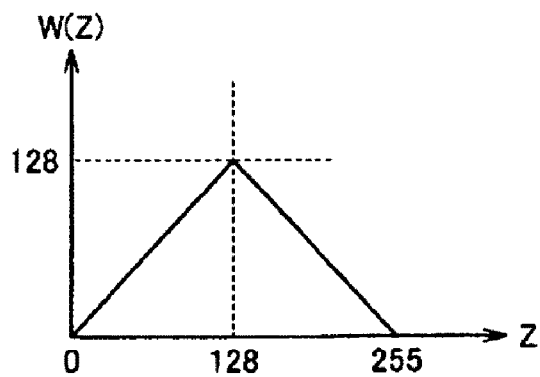
Fig. 6B
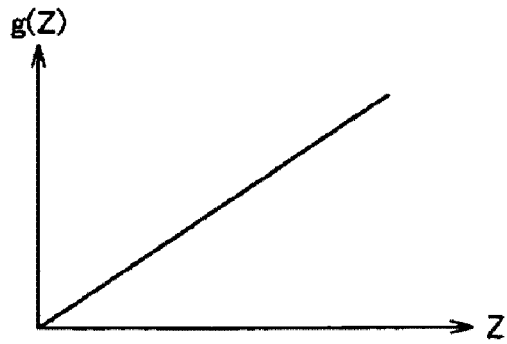

Fig. 14

| Exposure time (second) | Brightness range |
|---|---|
| 1/10 | 10 to 30 |
| 1/14 | 15 to 35 |
| 1/20 | 20 to 40 |
| 1/28 | 25 to 45 |
| 1/40 | 30 to 50 |
| 1/57 | 35 to 55 |
| 1/80 | 40 to 60 |
| 1/113 | 45 to 65 |
| 1/160 | 50 to 70 |
| 1/226 | 55 to 75 |
| 1/320 | 60 to 80 |
| 1/453 | 65 to 85 |
| 1/640 | 70 to 90 |
| 1/905 | 75 to 95 |
| 1/1280 | 80 to 100 |

Exposure time candidate: 1/40 to 1/640

IMAGE PROCESSING APPARATUS FOR GENERATING COMPOSITE IMAGE WITH LUMINANCE RANGE OPTIMIZED FOR A DESIGNATED AREA

This application claims priority from Japanese Patent Application P2008-065757, filed on Mar. 14, 2008. The entire content of the aforementioned application is incorporated herein by reference.

BACKGROUND OF THE INVENTION

1. Technical Field

The present invention relates to an image processing apparatus capable of generating composite image data, in which a dynamic range is extended, by using a plurality of image data obtained by photographing a measuring object more than once based on different exposure conditions.

2. Related Art

In an FA (Factory Automation) field, a so-called visual sensor is put into practical use, as an apparatus for optically inspecting a defect and the like generated in a measuring object such as a workpiece, and optically measuring a size of this defect.

When inspection and measurement are performed by using such a visual sensor, the measuring object must be properly photographed. Generally, a dynamic range (a gradation range capable of expressing luminance) of an image pickup apparatus that acquires images by an image pickup element such as a CCD (Coupled Charged Device) and a CMOS (Complementary Metal Oxide Semiconductor) sensor is limited. Therefore, when an exposure amount at the time of photographing is increased, total or partial overexposure (halation) occurs in a photographed image, and luminance information and color information of the measuring object cannot be accurately acquired. Reversely, when the exposure amount is decreased at the time of photographing, total or partial underexposure occurs, and therefore effective luminance information cannot be acquired. Further, in the measuring object having a portion of locally different reflectance and the measuring object having irregularities like a mirror surface, partial overexposure or underexposure occurs under an influence of lighting.

Thus, a difference between a brightest portion and a darkest portion included in an image of the measuring object formed on the image pickup element is large, and when the dynamic range of the image to be obtained originally exceeds the dynamic range of the image pickup element, there arises a problem that the whole body of the measuring object cannot be properly photographed.

Therefore, a technique of extending the dynamic range is known, in which the dynamic range is extended by photographing the same measuring object more than once under exposure conditions, and compounding a plurality of image data obtained by each photographing. Such a processing is also referred to as a high dynamic composition processing and a super latitude processing (Super Latitude process; SL processing). For example, Japanese Laid-Open Patent Publication No. 2002-334326 discloses a visual sensor realizing extension of the dynamic range with a low calculation processing load.

When an area in the measuring object to be displayed at high accuracy, or an area in the measuring object to be inspected is smaller than the photographing range, it is not necessary to perform composition processing so that the luminance range is optimal for every area of the photographed image data, and it is sufficient to perform composition processing with the luminance range optimized for a necessary area.

Therefore, the present invention is provided to solve the above-described problems, and an object of the present invention is to provide an image processing apparatus capable of generating a composite image with the luminance range optimized for the necessary area.

SUMMARY

According to one aspect of the present invention, there is provided an image processing apparatus, including: a camera interface connected to an image pickup part for photographing a measuring object and generating image data, such that a control instruction for controlling the image pickup part is outputted and the image data photographed by the image pickup part is inputted; a display screen output part connected to a display part, for outputting image data for display displayed on the display part; an input part that receives an input from the outside; and a processing part that executes processing, the image processing apparatus having a setting mode for performing setting based on the input received from the input part, and an operation mode for executing processing in accordance with the setting, wherein in the setting mode, the processing part outputs the control instruction for causing the image pickup part to photograph the measuring object through a camera interface, based on a first photographing condition including a plurality of photographing conditions to differentiate a luminance of the inputted image data, receives the input of a plurality of image data corresponding to the plurality of photographing conditions based on the control instruction, acquires the plurality of image data, with luminance of constituent pixels expressed by a first gradation number, calculates a standardized luminance standardized based on a photographing condition corresponding to each image data, regarding the luminance of the pixels constituting each image data, generates composite image data expressed by a second gradation number of which a gradation number of a composite standardized luminance of pixels constituting an image is increased from the first gradation number, by compounding the standardized luminance of each pixel of each image data at a mutually corresponding coordinates position, in accordance with weighting imposed on the standardized luminance previously defined based on the photographing conditions, generates the image data for display by converting the luminance of each pixel as needed such that the second gradation number expressing the luminance of pixels constituting the composite image data becomes a third gradation number, to output this image data for display by the display screen output part, receives designation of an area in the image data for display and sets a designated area, through the input part, and performs processing of setting a photographing condition corresponding to each range of the standardized luminance, such that one or a plurality of photographing conditions corresponding to a range of a composite standardized luminance in the designated area defined by an upper limit value and a lower limit value of the composite standardized luminance of pixels constituting the designated area in the composite image data, are set as a second photographing condition, in accordance with a previously defined correspondence relation, and in the operation mode, when there are a plurality of second photographing conditions set in the setting mode, the processing part outputs the control instruction for causing the image pickup part to photograph the measuring object based on the set plurality of photographing conditions, through the camera interface part, receives the input of the plurality of image data corresponding to the plurality of photographing conditions based on the control instruction, acquires the plurality of image data in which the luminance of the constituent pixels is expressed by the first gradation number, calculates the standardized luminance standardized based on a photographing condition corresponding to each image data, regarding the luminance of the pixels constituting each image data, generates the composite image data, in which the gradation number of the composite standardized luminance of the pixels constituting the image is increased from the first gradation number, by compounding the standardized luminance of each pixel of each image data at a mutually corresponding coordinates position, in accordance with weighting imposed on the standardized luminance previously defined based on the photographing condition, converts luminance gradation regarding the composite standardized luminance of pixels constituting an entire area of the composite image data, by luminance gradation conversion for converting the luminance of each pixel such that a range of the composite standardized luminance in the designated area defined by the upper limit value and the lower limit value of the composite standardized luminance of pixels constituting the designated area in the composite image data, becomes a fourth gradation number, and performs processing of calculating image data to be processed so as to be provided to later image processing, and when the second photographing condition set in the setting mode is one photographing condition, the processing part outputs the control instruction for causing the image pickup part to photograph the measuring object, based on the set one photographing condition, through the camera interface part, receives the input of one of the image data corresponding to the photographing condition based on the control instruction, acquires the image data in which the luminance of the constituent pixels is expressed by the first gradation number, and calculates the standardized luminance standardized based on the photographing condition corresponding to this image data, regarding the luminance of the pixels constituting this image data, converts luminance gradation regarding the luminance of the pixels constituting an entire area of the image data, by luminance gradation conversion for converting the luminance of each pixel such that a range of the standardized luminance in the designated area defined by the upper limit value and the lower limit value of the standardized luminance of pixels constituting the designated area in the image data, becomes the fourth gradation number, and performs processing of calculating image data to be processed so as to be provided to later image processing.

The standardized luminance here means standardization for expressing the luminance of a pixel of each image by a common luminance scale by correcting the changing ratio of optical power which is incident on the image pickup element due to the difference in photographing condition, because the ratio of the optical power incident on the image pickup element is different depending on each photographing condition when the photographing conditions are different, and the luminance of the pixel of the acquired image data is also different.

The third gradation number is the gradation number for expressing the luminance of the pixel constituting the image data for display outputted by the display screen output part. When the third gradation number is equal to the second gradation number, it is not necessary to convert the luminance of the pixel constituting the composite image data, and the composite image data becomes the image data for display as it is.

According to this aspect of the present invention, at the time of setting, an overexposure and an underexposure hardly occur in the image data compounded based on the image data acquired under a plurality of photographing conditions, compared with the image data acquired under one photographing condition. Therefore, designation of an area to be displayed accurately, an important area such as an area to be inspected and measured, or the like is accepted while this composite image data is displayed, this area is easily and accurately set.

Also, during operating the image processing apparatus, the important area can be accurately displayed by a display apparatus of limited luminance gradation, or can be accurately inspected or measured by image processing for processing the image of limited luminance gradation. Although there is a possibility that an overexposure, an underexposure, or the like also occurs in the image other than the important area, the image of the important area which is a portion of the entire area to be photographed can be accurately generated, while holding general information of the entire area to be photographed, because the image of the entire area to be photographed expressed by a common luminance gradation conversion is obtained.

According to another aspect of the present invention, there is provided an image processing apparatus, including: a camera interface connected to an image pickup part for photographing a measuring object and generating image data, such that a control instruction for controlling the image pickup part is outputted and the image data photographed by the image pickup part is inputted; a display screen output part connected to a display part, for outputting image data for display displayed on the display part; an input part that receives an input from the outside; and a processing part that executes processing, the image processing apparatus having a setting mode for performing setting based on the input received from the input part, and an operation mode for executing processing in accordance with the setting, wherein in the setting mode, the processing part outputs the control instruction for causing the image pickup part to photograph the measuring object through a camera interface, based on a first photographing condition including a plurality of photographing conditions to differentiate a luminance of the inputted image data, receives the input of a plurality of image data corresponding to the plurality of photographing conditions based on the control instruction, acquires the plurality of image data in which luminance of constituent pixels is expressed by a first gradation number, calculates a standardized luminance standardized based on a photographing condition corresponding to each image data, regarding the luminance of the pixels constituting each image data, generates composite image data expressed by a second gradation number of which a gradation number of a composite standardized luminance of pixels constituting an image is increased from the first gradation number, by compounding the standardized luminance of each pixel of each image data at a mutually corresponding coordinates position in accordance with weighting imposed on the standardized luminance previously defined based on the photographing conditions, generates the image data for display by converting the luminance of each pixel as needed such that the second gradation number expressing the luminance of pixels constituting the composite image data becomes a third gradation number, and outputs this image data for display by the display screen output part, receives designation of an area in the image data for display and sets a designated area, through the input part, and performs processing of setting a photographing condition corresponding to each range of the standardized luminance, such that one or a plurality of photographing conditions corresponding to a range of a composite standardized luminance in the designated area defined by an upper limit value and a lower limit value of the composite standardized luminance of pixels constituting the designated area in the composite image data, are set as a second photographing condition, in accordance with a previously defined correspondence relation, and in the operation mode, when there are a plurality of second photographing conditions set in the setting mode, the processing part outputs the control instruction for causing the image pickup part to photograph the measuring object based on the set plurality of photographing conditions, through the camera interface part, receives the input of the plurality of image data corresponding to the plurality of photographing conditions based on the control instruction, and acquires the plurality of image data in which the luminance of constituent pixels is expressed by the first gradation number, and for the designated area, calculates the standardized luminance standardized based on a photographing condition corresponding to each image data, regarding the luminance of pixels constituting the designated area in each image data, makes a composite standardized luminance of each pixel of each image data at a mutually corresponding coordinates position, in accordance with weighting imposed on the standardized luminance previously defined based on the photographing conditions, calculates the image data to be processed in the designated area on which luminance gradation conversion is performed regarding the composite standardized luminance of pixels constituting the designated area, by luminance gradation conversion for converting the luminance of each pixel such that a range of a composite standardized luminance in the designated area defined by the upper limit value and the lower limit value of the composite standardized luminance of the pixels constituting the designated area, becomes a fourth gradation number, and for an area other than the designated area, calculates the standardized luminance standardized based on the photographing condition corresponding to the image data, regarding the luminance of pixels constituting the area other than the designated area in the image data generated based on one photographing condition out of the plurality of photographing conditions, calculates the image data to be processed in the area other than the designated area on which the luminance gradation conversion is performed regarding the standardized luminance of the pixels constituting the area other than the designated area by the luminance gradation conversion, and performs processing of creating the image data to be processed of an entire area including the image data to be processed of the designated area and the image data to be processed of the area other than the designated area, so as to be provided to later image processing, and when the second photographing condition set in the setting mode is one photographing condition, the processing part: outputs the control instruction for causing the image pickup part to photograph the measuring object based on the set one photographing condition, through the camera interface, receives the input of one image data corresponding to the photographing condition based on the control instruction, acquires the image data in which luminance of constituent pixels is expressed by the first gradation number, converts luminance gradation regarding the luminance of pixels constituting an entire area of the image data, by luminance gradation conversion for converting the luminance of each pixel such that a luminance range in the designated area defined by the upper limit value and the lower limit value of the standardized luminance of the pixels constituting the designated area in this image data, becomes the fourth gradation number, and performs processing of calculating the image data to be processed so as to be provided to later image processing.

According to this aspect, the image of the area other than the important area can be easily generated during operation of the image processing apparatus, thus realizing uncomplicated processing.

Preferably, a photographing condition for obtaining highest luminance of inputted image data, out of a plurality of photographing conditions included in the first photographing condition is a photographing condition that does not allow pixels having saturated luminance to be included in the image data inputted corresponding to this photographing condition.

Thus, when a designation area is set at the time of setting, an image of which the luminance is never saturated is displayed. Therefore, the user can accurately designate an area while confirming the image.

Preferably, the image data inputted through the camera interface part is the image data including color information, the processing part calculates the luminance of the pixels based on a sum of the luminance of each component constituting the color information of the pixels, and in any of the composite image data, the processing part calculates the color information of the pixels of the composite image data by compounding the color information of each pixel of a plurality of image data used for generating the composite image data at a mutually corresponding coordinates position, in accordance with previously defined weighting based on the photographing conditions, imposed on the standardized luminance of the pixels, and in any of the image data to be processed, the processing part calculates the image data to be processed including the color information, with the color information of the pixels of the image data to be processed set as the color information of the corresponding pixels of the image data before performing luminance gradation conversion.

Thus, the image data to be processed including color information can be calculated.

In a preferred aspect of the present invention, the photographing conditions include exposure time of the image pickup part.

Further, in a preferred aspect of the present invention, the photographing conditions include a diaphragm of the image pickup part.

Further, in a preferred aspect of the present invention, the camera interface part is further connected to an illumination part for irradiating the measuring object with light, and the photographing conditions include illumination intensity of the illumination part.

According to the present invention, the composite image data is displayed at the time of setting, and designation of the area to be accurately displayed or the important area such as the area to be inspected and measured is received, and therefore this area can be set easily and accurately. Also, during operating the image processing apparatus, this important area can be accurately displayed on a display apparatus of limited luminance gradation, or can be accurately inspected and measured by image processing for processing the image of limited luminance gradation. Although there is a possibility that an overexposure, an underexposure, or the like also occurs in the image other than the important area, the image of the important area which is a portion of the entire area to be photographed can be accurately generated, while holding general information of the entire area to be photographed, because the image of the entire area to be photographed expressed by a common luminance gradation conversion is obtained.

BRIEF DESCRIPTION OF THE DRAWINGS

FIG. 5 shows an example of a correspondence relation between an exposure time set in an image pickup apparatus and a "brightness" range suitable for photographing;

FIGS. 6A and 6B show an example of characteristics of a weighting function and a response function;

FIG. 14 shows an example of a correspondence relation between an exposure time and "brightness" used in a second modification of the change processing of the photographing conditions according to the first embodiment of the present invention;

DESCRIPTION OF SYMBOLS

Figure 1:
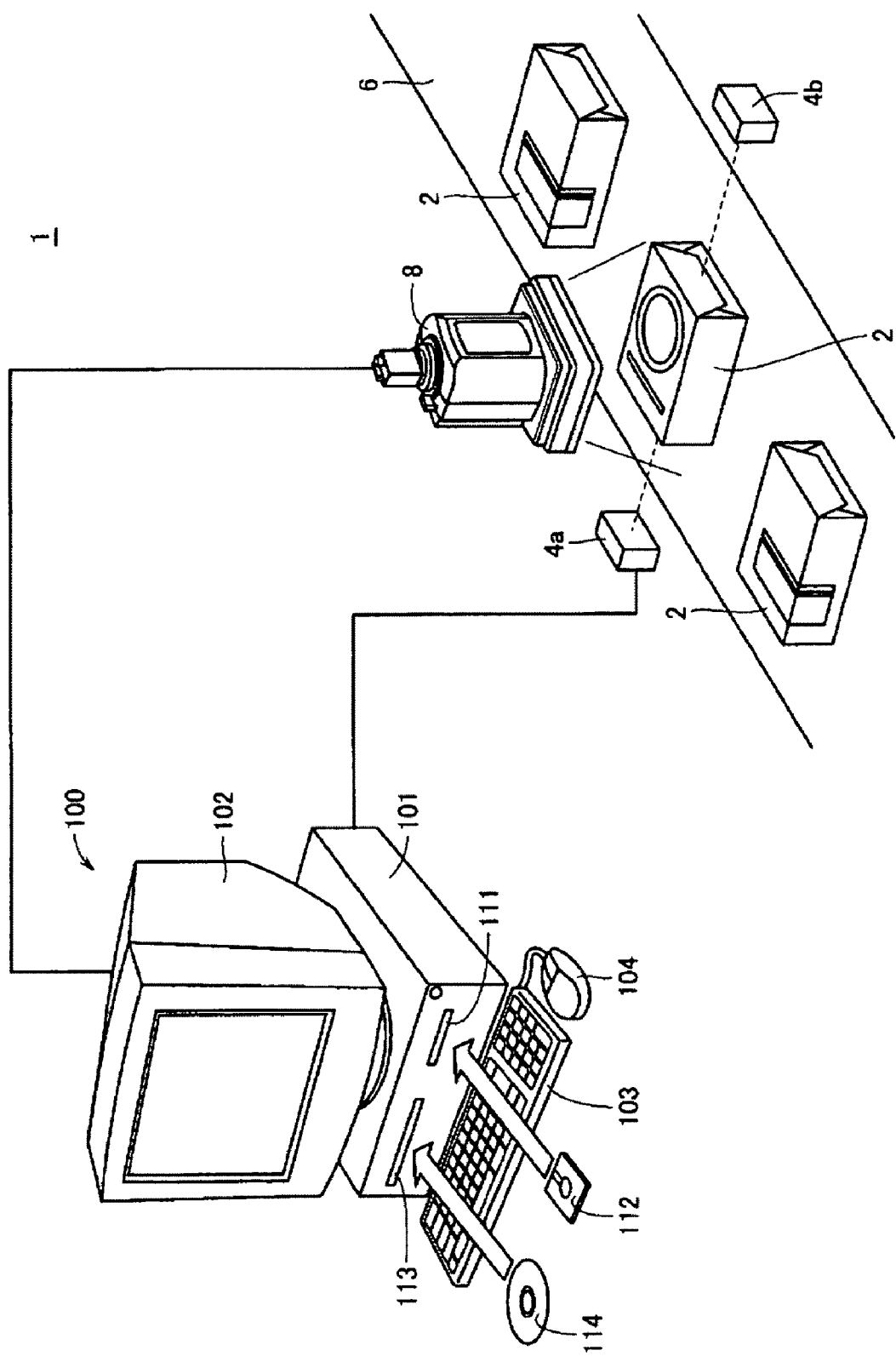
FIG. 1 shows a schematic view illustrating an overall structure of a visual sensor system 1 including an image processing apparatus according to a first embodiment of the present invention.

1: visual sensor system, 2: workpiece, 4a: light receiving part, 4b: light projecting part, 6: conveying mechanism, 8: image pickup part, 100: computer, 101: computer body, 102: monitor, 103: keyboard, 104: mouse, 105: CPU, 106: memory, 107: fixed disk, 109: camera interface part, 111: FD driving apparatus, 113: CD-ROM driving apparatus, 115: PLC interface part, 117: sensor interface part, 200, 200A, 200B: photographing control part, 202: selection part, 204, 204a to 204h: image buffer, 206a to 206h: image information extraction part, 208: color composition part, 210: luminance composition part, 212: image generation part, 214: tone mapping part, 216: brightness upper/lower limits setting part, 218: histogram generation part, 220: motion amount determination part, 222: processing time calculation part, 230: designation receiving part, 240: luminance information extraction part

DETAILED DESCRIPTION

Preferred embodiments of the present invention will be described in detail with reference to the drawings. Note that the same reference numerals are assigned to the same parts or the corresponding parts in the figures, and description therefor is not repeated.

First Embodiment

<Overall Apparatus Structure>

FIG. 1 shows a schematic view illustrating an overall structure of a visual sensor system 1 including an image processing apparatus according to a first embodiment of the present invention.

In FIG. 1, the visual sensor system 1 is typically incorporated in a production line and functions to optically inspect a defect and the like in a measuring object (referred to as a "workpiece" hereinafter) and optically measure its size and the like. As an example, in the first embodiment of the present invention, a workpiece 2 is conveyed by a conveying mechanism 6 such as a belt conveyor, and the conveyed workpiece 2 is sequentially photographed by an image pickup apparatus 8. The image data (referred to as "input image data" hereinafter) photographed by the image pickup part 8 is transmitted to a computer 100 that is a typical example of the image processing apparatus according to the present embodiment. Note that there may be further provided a lighting mechanism for emitting light to the workpiece 2 photographed by the image pickup part 8.

In addition, optoelectronic sensors disposed on both ends of a conveying mechanism 6 detect arrival of the workpiece 2 in a photographing range of the image pickup part 8. Specifically, each optoelectronic sensor includes a light receiving part 4a and a light projecting part 4b disposed on the same optical axis, and arrival of the workpiece 2 is detected by detecting the fact that light emitted from the light projecting part 4b is shielded by the workpiece 2. Note that the conveying mechanism 6 itself is controlled by a PLC (Programmable Logic Controller) or the like (not shown).

When arrival of the workpiece 2 is detected by the optoelectronic sensors, responding thereto, the image pickup part 8 photographs the workpiece 2 in response to the detection. Alternatively, sequential photographing is performed in advance, and when the arrival of the workpiece 2 is detected, the inspection or measurement of the workpiece 2 as will be described later may be performed.

As an example, the image pickup part 8 includes an image pickup element divided into a plurality of pixels, such as a CCD (Coupled Charged Device) or a CMOS (Complementary Metal Oxide Semiconductor), in addition to an optical system such as a lens. The image pickup element corresponding to each pixel has a plurality of spectral sensitivities to incident light.

More specifically, in each pixel, the image pickup element of the image pickup part 8 has spectral sensitivities to "red color", "green color", and "blue color" respectively based on the three primary colors of light. Then, the image pickup element of the image pickup apparatus 8 outputs detected values (R-luminance, G-luminance, and B-luminance) of the three colors of "red color", "green color", and "blue color" in the incident light. For example, the R-luminance shows the magnitude of light energy (light intensity) corresponding to a wavelength component included in the spectral sensitivity to red color, out of the light incident on the image pickup element. Regarding the G-luminance and the B-luminance also, the magnitude of light energy (light intensity) corresponding to a wavelength component each included in the corresponding spectral sensitivity is shown. Also, in the present embodiment, the R-luminance, the G-luminance, and the B-luminance are defined in a range of 8 bits (0 to 255 gradations).

Note that the spectral sensitivities of the image pickup element are not limited to three (three bands), and the image pickup element may have spectral sensitivities in more colors. By using such a multi-band image pickup element, a color range that can be photographed can be extended. Alternatively, the image pickup element may have detected values (C-luminance, M-luminance, and Y-luminance) of three colors of "cyan", "magenta", and "yellow", which are complementary colors of the three primary colors of light, as the spectral sensitivities. In addition, when a single-plate CCD or the like is used, each pixel sometimes has a light receiving sensitivity only on one color out of the "red color", "green color", and "blue color". In such a case, input image data having luminance in each one of the "red color", "green color", and "blue color" may be generated by an interpolation part (not shown).

Particularly, in the image pickup part 8 according to the present embodiment, the photographing conditions during photographing may be changed. The photographing conditions include an exposure condition, that is, a value for adjusting optical energy incident on the image pickup element, and typically the optical energy is adjusted by a diaphragm of an optical system, a mechanical or electronic shutter speed, and illumination intensity. In the present embodiment, a structure of adjusting the "exposure time" is exemplified as a typical example of the exposure condition. However, not only by the exposure time but also by the diaphragm or the like may be adjusted. Also, instead of changing the exposure condition, the optical energy incident on the image pickup element may be similarly adjusted by adjusting the intensity of illumination light.

Meanwhile, the computer 100 includes: a computer body 101 on which an FD (Flexible Disk) driving apparatus 111 and a CD-ROM (Compact Disk-Read Only Memory) driving apparatus 113 are mounted; a monitor 102; a keyboard 103; and a mouse 104. The computer body 101 executes previously stored programs, to thereby realize the image processing apparatus according to the present embodiment.

<Hardware Configuration>

Figure 2:
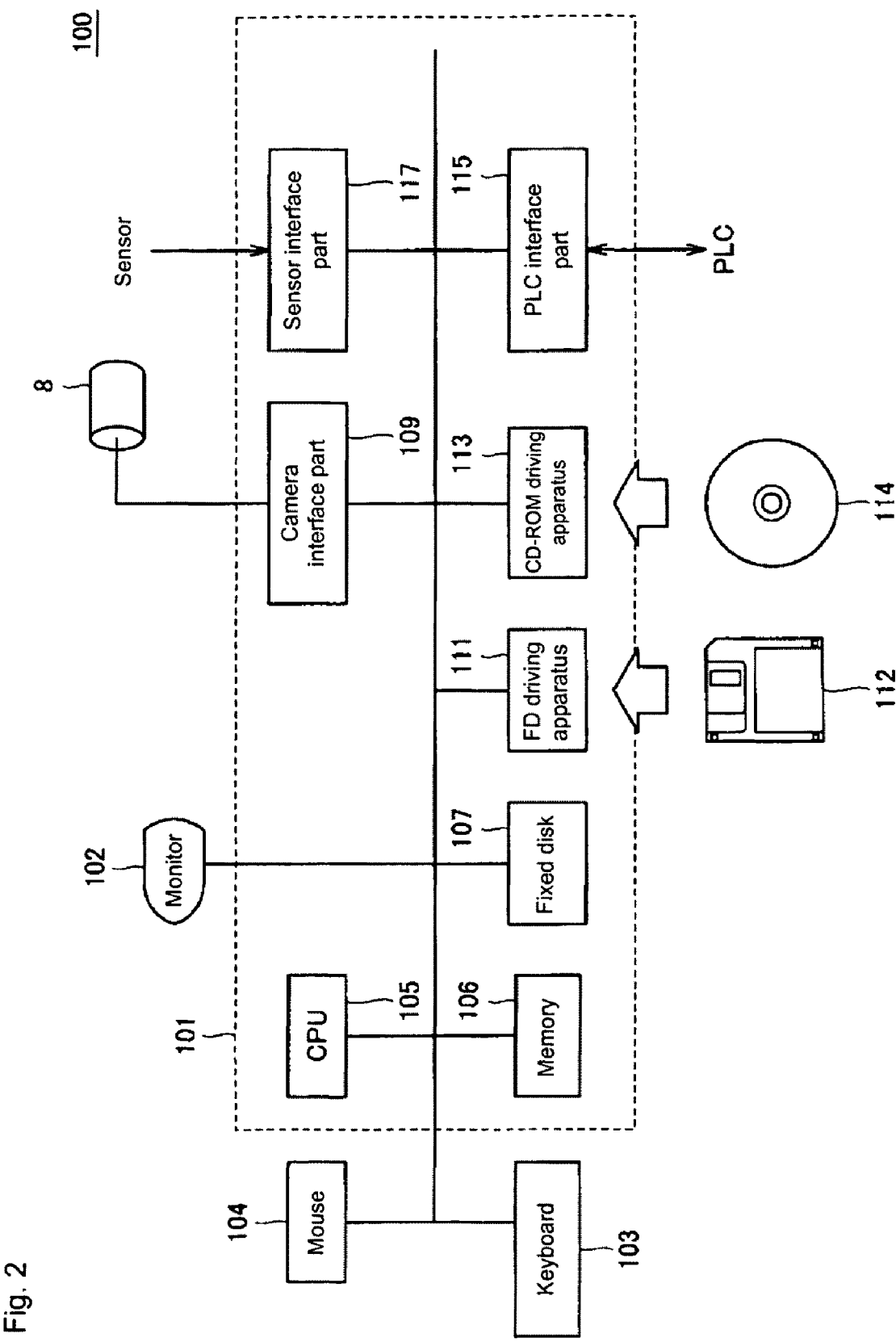
FIG. 2 shows a schematic block diagram illustrating a hardware configuration of a computer.

FIG. 2 shows a schematic block diagram illustrating a hardware configuration of the computer 100.

In FIG. 2, in addition to the FD driving apparatus 111 and the CD-ROM driving apparatus 113 shown in FIG. 1, the computer body 101 includes a CPU (Central Processing Unit) 105, a memory 106, a fixed disk 107, a camera interface part 109, a PLC interface part 115, and a sensor interface part 117, which are mutually connected by bus.

An FD 112 can be mounted on the FD driving apparatus 111, and a CD-ROM 114 can be mounted on the CD-ROM driving apparatus 113. As described above, the image processing apparatus according to the present embodiment is realized by executing a program by the CPU 105 using computer hardware such as a memory 106. Generally, such a program is stored in a recording medium such as the FD 112 and the CD-ROM 114, or is distributed over a network. Then, this program is read from the recording medium by the FD driving apparatus 111 and the CD-ROM driving apparatus 113 and is stored once in the fixed disk 107 that is a storage device. Further, this program is read from the fixed disk 107 to the memory 106 and is executed by the CPU 105.

The CPU 105 is an arithmetic processing part that executes various kinds of calculation by sequentially executing a programmed command. The memory 106 temporarily stores various kinds of information in response to program execution by the CPU 105. Various kinds of setting used in processing are stored in the memory 106 that is a storage part, or stored in the fixed disk 107 once or in another recording medium, is then read out to the memory 106, and is referenced when the CPU 105 performs calculation.

The camera interface part 109 is a device for mediating data communication between the computer body 101 and the image pickup part 8 and functions to receive an electric signal showing the input image data photographed by the image pickup part 8 and convert the received electric signal to a data format that can be processed by the CPU 105, and also convert a command outputted by the CPU 105 to an electric signal and send the converted electric signal to the image pickup part 8. Particularly, the input image data photographed by the image pickup part 8 is stored in the memory 106 or the fixed disk 107, via the camera interface part 109.

The PLC interface part 115 is a device for mediating data communication between the computer body 101 and a PLC (not shown). Also, the sensor interface part 117 receives a detected signal from the aforementioned optoelectronic sensor and the like and transmits the detected signal to the CPU 105.

The fixed disk 107 is a nonvolatile storage device that stores the program executed by the CPU 105 and the input image data.

The monitor 102 connected to the computer body 101 through a display screen output part (not shown) is a display part for displaying the information outputted from the CPU 105, and for example is constituted of an LCD (Liquid Crystal Display), a CRT (Cathode Ray Tube), and the like. As will be described later, the monitor 102 according to the present embodiment displays a composite image generated by photographing the workpiece 2, an expected processing time required for a single processing, and a histogram regarding the luminance of the pixels constituting the composite image.

The mouse 104 is an input part for receiving an instruction from a user in response to an operation such as a click or sliding, and the keyboard 103 is also an input part for receiving an instruction from the user in response to an inputted key.

In addition, the computer 100 may be connected with another output device such as a printer as needed.

<Operation Mode>

The visual sensor system 1 according to the present embodiment can select an "operation mode" for actually performing inspection and measurement by using the composite image data generated by photographing the workpiece 2, and a "setting mode" for performing setting in relation to the composition processing for the workpiece 2.

In the "setting mode", the user sets a suitable photographing condition while referring to an output image based on the composite image data displayed on the monitor 102. Also, in the "operation mode", the composite image data obtained by photographing the workpiece 2 that is actually moving on the production line is generated, and the inspection or measurement is performed on this composite image data.

<Image Composition Processing>

Next, the image composition processing for generating the composite image data will be described. The image composition processing according to the present embodiment is mainly performed to extend the dynamic range of the image pickup part 8.

Figure 3A:
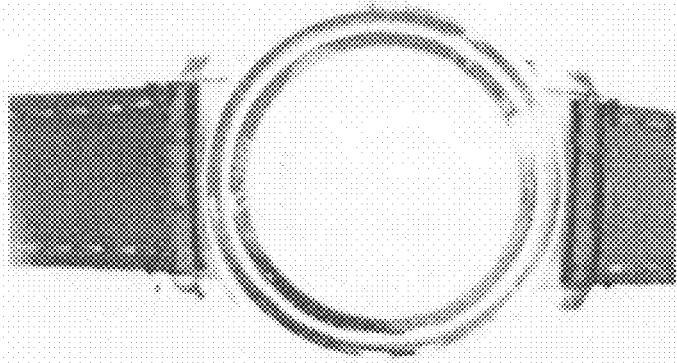
FIGS. 3A to 3C show input image data in a case of photographing a rear surface of a wrist band watch as a workpiece.
Figure 3B:
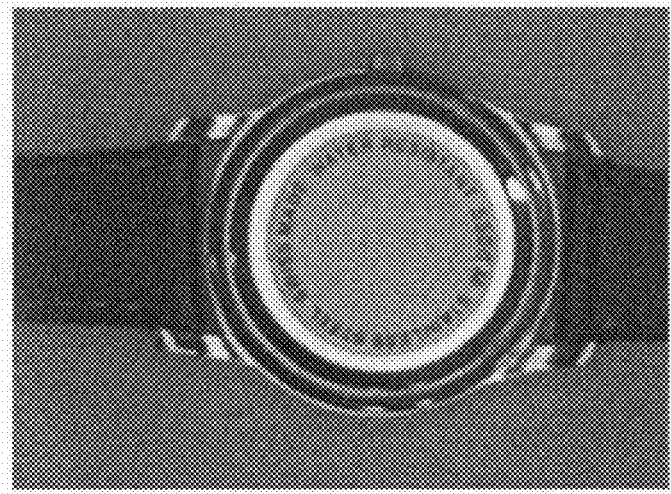
Figure 3C:
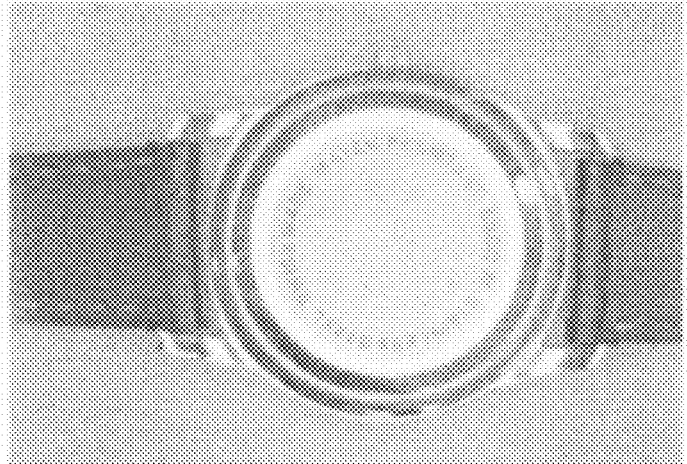

FIGS. 3A to 3C show input image data in a case where a backside of a wristwatch is photographed as a workpiece. FIG. 3A illustrates a photographed image obtained by a single photographing based on a condition of relatively long exposure time, and FIG. 3B illustrates a photographed image obtained by a single photographing based on a condition of relatively short exposure time. Note that in FIG. 3A and FIG. 3B, conditions are set so that the intensity of light incident on the image pickup part is set to be the same, that is, the diaphragm and the illumination intensity are set to be the same. The workpiece shown in FIGS. 3A to 3C includes a metal watch body part and a leather band part. The reflectances of both of them are significantly different from each other, and therefore there is also a large difference in optical power (optical energy emitted per unit time) emitted (reflected) by each part and incident on the image pickup element of the image pickup part.

Therefore, if the exposure time is prolonged, overexposure occurs in the watch body part having relatively higher reflectance, and therefore the luminance information cannot be obtained. That is, as shown in FIG. 3A, it can be seen that the letters written on the watch body part cannot be identified.

Meanwhile, if the exposure time is shortened, the optical energy cannot be sufficiently received from the band part having relatively low reflectance, and therefore effective luminance information cannot be obtained. That is, as shown in FIG. 3B, it can be seen that underexposure occurs in the band part, and a defect in a stitch or the like cannot be recognized.

Therefore, the image processing apparatus according to the present embodiment photographs the same workpiece more than once based on photographing conditions in which the luminance of the acquired image data is differentiated, and generates composite image data from the photographed plurality of input image data. The input image data includes a value (luminance of each color) corresponding to the optical energy incident on each pixel of the image pickup element of the image pickup part 8, and the image processing apparatus according to the present embodiment calculates color information (also referred to as "composite color information" hereinafter) of each pixel of the composite image data and luminance information (also referred to as "composite luminance information" hereinafter) set in a predetermined correspondence relation with the optical power incident on each pixel from the measuring object (or uniquely determined from the optical power incident on each pixel), based on a value (luminance of each color) corresponding to the optical energy of each input image data corresponding to each pixel, and the photographing condition at the time of photographing the corresponding input image data. Then, the composite image data is generated based on the composite color information and the composite luminance information.

In brief, in the calculation processing of the composite luminance information, the value (luminance) corresponding to the optical energy on the corresponding pixel in each of the input image data is standardized by the photographing conditions, and the image data having the pixel of appropriate luminance is preferentially adopted. Even when the same measuring object is photographed, if the photographing conditions are different, the ratio of the optical power incident on the image pickup element is different corresponding to each photographing condition. Therefore, in this case, the luminance of the pixel of the acquired image data is also different. However, the changing ratio of the optical power incident on the image pickup element caused by the difference in photographing condition is corrected based on the photographing conditions, and the luminance of the pixel of each image is expressed by a standardized luminance, which is a common luminance scale. The composite luminance information of each pixel of the composite image data for expressing the workpiece is mainly calculated by the information of the pixel photographed based on a photographing condition in which the light emitted (including reflection) from the workpiece is appropriately contained in the dynamic range of the image pickup element when photographed by the image pickup element. By this processing, the composite image data can be generated as a collection of pixels having luminance photographed based on an appropriate photographing condition. FIG. 3C shows an example of the composite image data generated by the image composition processing according to the present embodiment. As shown in FIG. 3C, by performing the aforementioned image composition processing, it is possible to generate a composite image data not including an overexposure as shown in FIG. 3A or an underexposure as shown in FIG. 3B.

The image composition processing according to the present embodiment is mainly realized by the following four kinds of processing.

(1) Processing of photographing the workpiece more than once under different exposure conditions (photographing processing)
(2) Processing of calculating the composite luminance from the luminance information of the photographed input image data (luminance composition processing)
(3) Processing of calculating the composite color information from the color information of the photographed input image data (color composition processing)
(4) Processing of generating the composite image data from the composite color information and the composite luminance information (generation processing)<

<Control Structure>

Figure 4:
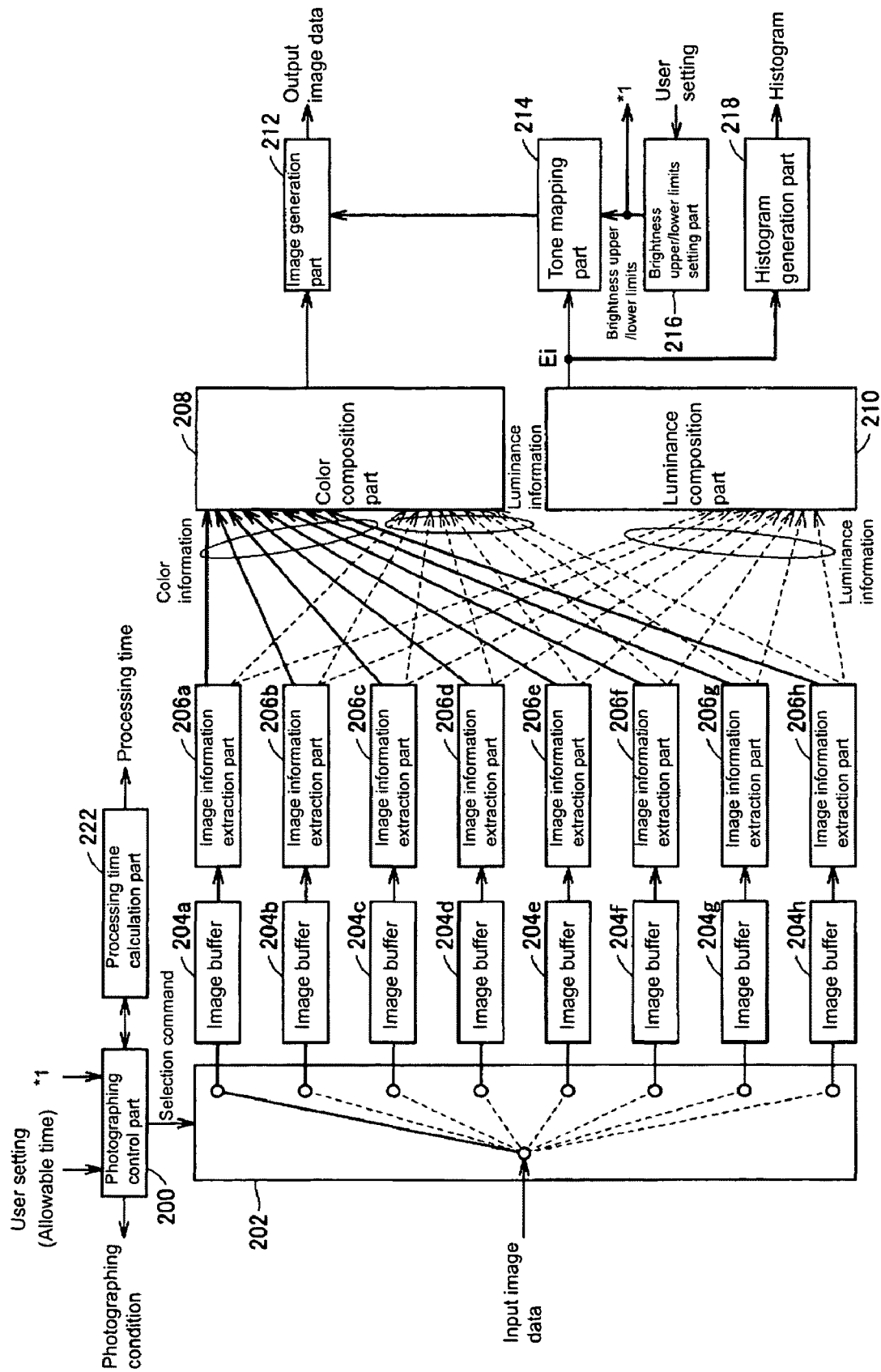
FIG. 4 shows a functional block diagram illustrating a control structure of the image processing apparatus according to the first embodiment of the present invention.

FIG. 4 shows a functional block diagram illustrating a control structure of the image processing apparatus according to the first embodiment of the present invention.

In FIG. 4, the image processing apparatus according to the present embodiment includes: a photographing control part 200; a selection part 202; image buffers 204a to 204h; and image information extraction parts 206a to 206h, as a control structure for realizing the aforementioned photographing processing (1). In addition, the image processing apparatus according to the present embodiment includes: a luminance composition part 210; a tone mapping part 214; a "brightness" upper/lower limits setting part 216; and a histogram generation part 218, as a control structure for realizing the aforementioned luminance composition processing (2), and includes: a color composition part 208 as a control structure for realizing the aforementioned color composition processing (3). Further, the image processing apparatus according to the present embodiment includes: an image generation part 212 as a control structure for realizing the aforementioned generation processing (4). Further, the image processing apparatus according to the present embodiment includes: a processing time calculation part 222. Note that the photographing control part 200, the selection part 202, the image information extraction parts 206a to 206h, the luminance composition part 210, the tone mapping part 214, the brightness upper/lower limits setting part 216, the histogram generation part 218, the color composition part 208, the image generation part 212, and the processing time calculation part 222 are controlled and processed by the CPU 105 that is a processing part. The image buffers 204a to 204h are constituted of the memory 106 that is a storage part.

The contents of each kind of processing according to the aforementioned image composition processing will be described together with the operation of each functional block.

<(1) Photographing Processing>

In FIG. 4, the photographing control part 200 generates a plurality of input image data by causing the image pickup part 8 to photograph the same workpiece more than once based on different exposure conditions. The photographing control part 200 determines how the exposure condition should be changed, according to user setting. More specifically, the image pickup part 8 according to the present embodiment has an electronic shutter capable of setting any shutter speed, and the exposure time can thereby be varied appropriately. As an example of the variable exposure time, eight patterns, i.e., "1/10 seconds", "1/20 seconds", "1/40 seconds", "1/80 seconds", "1/160 seconds", "1/320 seconds", "1/640 seconds", "1/1280 seconds" can be given as standard times. Such a variable exposure time group is set so as to be sequentially faster by a power of 2 with "1/10 seconds" set as a reference (latest value).

Particularly, the photographing control part 200 receives an allowable time that may be allotted to the composition processing at a time as user setting, and decides or changes the number of times of photographing by the image pickup part 8 and an exposure condition (exposure time) in each photographing. At this time, the photographing control part 200 may also adopt an exposure time that is not included in the aforementioned eight patterns. Note that change processing of the number of times of photographing and the exposure condition in each photographing (also referred to as "photographing condition" hereinafter) by the photographing control part 200 will be described later.

When the number of times of photographing and the exposure condition in each photographing are decided, in accordance with this decision, the photographing control part 200 sequentially photographs the workpiece and sequentially generates the input image data, by giving an instruction on the photographing condition to the image pickup part 8. The photographing control part 200 gives a selection instruction to the selection part 202 in synchronization with photographing with another exposure time. Basically, a series of photographing for generating one composite image data (for example, eight times of photographing with the exposure time set to "1/10 seconds" to "1/1280 seconds") is cyclically repeated.

The selection part 202 is disposed between the image pickup part 8 and the plurality of image buffers 204a to 204h, and electrically connects any one of the image buffers 204a to 204h with the image pickup part 8 according to the selection command from the photographing control part 200. In the following description, the image buffers 204a to 204h are generally referred to as "image buffers 204". Thus, the input image data photographed by the image pickup part 8 is transmitted to a particular image buffer 204 according to the selection command from the photographing control part 200.

The image buffers 204a to 204h are storage parts for temporarily storing the input image data from the image pickup part 8 and is constituted so as to correspond to the exposure time in the image pickup apparatus. That is, each image buffer 204 is constituted so as to selectively store only the input image data photographed with a specific corresponding exposure time. For example, in a case where the exposure time "1/10 seconds" is allotted to the image buffer 204a, the image buffer 204a stores only the input image data photographed under the exposure condition of "1/10 seconds" of the exposure time. Such a function is realized by outputting to the selection part 202 a selection command corresponding to the photographing condition, in synchronization with output of an instruction on the photographing condition to the image pickup part 8.

As described above, since a series of photographing for generating one composite image data is cyclically repeated, the input image data stored in each image buffer 204 is updated for every cycle required for this series of photographing. Note that, as will be described later, the photographing with every exposure time that can be set in the image pickup part 8 is not always performed, and in some cases, photographing is performed with only a set of necessary exposure time that is a portion of all the exposure times.

In addition, as will be described later, in the case where the exposure time that is not included in the aforementioned eight patterns is adopted by the photographing control part 200, the exposure time corresponding to each image buffer 204 may also be appropriately changed.

The image information extraction parts 206a to 206h are associated with the image buffers 204a to 204h, respectively, and the color information and the luminance information are respectively extracted from the input image data stored in the corresponding image buffer 204. Typically, the input image data is made up of the luminances of three colors (R-luminance, G-luminance, and B-luminance) that are values corresponding to the optical energy incident on each pixel. The color information of the input image data expresses a relative relation (relative ratio) of each luminance with the luminance of these three colors standardized. The luminance information of the input image data comprehensively expresses the value corresponding to the optical energy incident on each pixel and corresponds to an average value (or total value) of the luminances of three colors. Note that in the present embodiment, the R-luminance, the G-luminance, and the B-luminance are each defined in a range of eight bits (0 to 255 gradation values). Therefore, the luminance information is also defined in the range of eight bits (0 to 255 gradation values).

Note that, as a pre-processing for extracting the luminance information and the color information, white balance correction may be performed on the input image data.

Then, the image information extraction parts 206a to 206h output the extracted color information to the color composition part 208 and also output the extracted luminance information to the color composition part 208 and the luminance composition part 210.

<(2) Luminance Composition Processing>

In FIG. 4, the luminance composition part 210 calculates the composite luminance of each pixel, based on standardization of the value (luminance information) corresponding to the optical energy of each input image data photographed by the image pickup part 8 under the corresponding exposure condition. As described above, by changing the exposure time, the range of optical power suitable for photographing fluctuates. That is, if the exposure time is relatively short, photographing of a range with larger optical power is suitable, and if the exposure time is relatively long, photographing of a range with smaller optical power is suitable.

Therefore, in the present specification, an index such as "brightness" showing the magnitude of optical power emitted from the workpiece is used. Note that the "brightness" is expressed by a relative value dependent on the performance of the image pickup part 8, and even in a case of the same "brightness", actual optical power is different if the sensitivity of the image pickup element and the aperture of the optical system are different.

Generally, it is considered that the magnitude of the optical energy incident on the image pickup element of the image pickup part 8 is proportional to the exposure time. Therefore, the "brightness" in the present specification is typically obtained by dividing the luminance detected by the image pickup apparatus 8 by the exposure time and converting this value logarithmically, and the "brightness" thus obtained is used. Accordingly, the "brightness" in the present specification is an index showing the magnitude of the optical energy (optical power) per unit exposure time. By using such "brightness", a "brightness" range suitable for photographing by the image pickup part 8 can be previously defined in association with each exposure time that can be set in the image pickup part 8.

More specifically, eight exposure times settable in the image pickup part 8 according to the present embodiment is made sequentially shorter by a power of 2. Therefore, the relation between each exposure time and the "brightness" can be defined as shown in FIG. 5.

FIG. 5 shows an example of the correspondence relation between the exposure time set in the image pickup part 8 and the "brightness" suitable for photographing.

In FIG. 5, when a representative value of the "brightness" suitable for photographing is set to "20" in a case where the exposure time is set to "1/10 seconds", the representative value of the "brightness" suitable for photographing is added with "10" and can be set to "30", when the exposure time is set to "1/20 seconds" that is 1/2 times the "1/10 seconds". By thus sequentially setting the "brightness", the representative value of the "brightness" can be set to "20" to "90" in association with a range of "1/10 seconds" to "1/1280 seconds". Further, when a range covered by each exposure time is set in a range from "10" on the negative side to "10" on the positive side with the representative value of the "brightness" set as a center, a "brightness" range suitable for photographing in the case of "1/10 seconds" exposure time can be set to "10 to 30". Similarly, regarding the remaining photographing time also, a range of "±10" with the representative value of the "brightness" set as the center" is adopted as the "brightness" range.

In addition, preferably all "brightness" is set to be covered by the "brightness" range at a plurality of exposure times. In the example shown in FIG. 5, in the "brightness" range of 10 to 90, all "brightness" is set to be covered by at least two exposure times. That is, this example shows that, for example, three exposure times, "1/40 seconds", "1/80 seconds", "1/160 seconds", correspond to the "brightness" of "50", and that the "brightness" of "50" is covered by these three exposure times. Even in a case of a narrow range (as will be described later) defined by upper/lower limit values of the "brightness" inputted by the user, photographing of multiple number of times is selected at a different exposure time.

In a relation between the exposure time and the "brightness" shown in FIG. 5, when a "brightness" range necessary for the user is set, out of the "brightness" range that can be photographed by the image pickup part 8, photographing is performed with each of the plurality of exposure times corresponding to the setting of the user. That is, photographing is not performed with all exposure times shown in FIG. 5, and by performing only photographing with a particular exposure time, processing time required for the image composition processing can be shortened.

More specifically, when the "brightness" range is set to "30 to 60" by the user, for example, three times of photographing per one time of processing are performed with the exposure times of "1/20 seconds", "1/40 seconds", and "1/80 seconds" included in this range.

FIG. 4 is referenced again. The luminance composition part 210 calculates the composite luminance that is the luminance of each pixel of the composite image data, by using a plurality of input image data obtained by photographing the workpiece more than once. More specifically, the luminance composition part 210 calculates a composite luminance Ei of each pixel, by standardizing the luminance of each pixel in p pieces of input image data corresponding to each pixel (coordinate position i) of the composite image data, by the exposure time. The calculation equation of the composite luminance Ei by the luminance composition part 210 is as follows.

$$E_i = \frac{10 * \sum_{j=1}^{p} w(Z_{i,j}) \left( \log_2 \frac{g(Z_{i,j})}{T_j} - 8 \right)}{\sum_{j=1}^{p} w(Z_{i,j})}$$ [Equation 1]

wherein,
w(Z) weighting function
g(Z): response function of the image pickup apparatus
$Z_{i,j}$: the luminance of the coordinate position i of the j-th input image data
$T_j$: exposure time of the j-th input image data In the above equation, the term of "$\log_2(g(Z_{i,j})/T_j)$" corresponds to a value evaluated as "brightness" with the luminance in each input image data standardized by means of the exposure time. This is based on a technical concept that if the exposure time is relatively short, its actual "brightness" should be evaluated as a further greater value, and that if the exposure time is relatively long, its actual "brightness" should be evaluated as a further smaller value, even if the luminance has the same value of "128". That is, by multiplying the exposure condition used at the time of photographing of the corresponding input image data by coefficient 1/Tj, the standardization by the exposure time is performed, and by cumulatively adding standardized values, the composite luminance Ei is calculated.

Typically, the composite luminance $E_i$ is calculated as a value in a range of 0 to 100, according to the relation between each exposure time shown in FIG. 5 and the "brightness" range. Note that, for easy understanding, the composite luminance $E_i$ is expressed in the range of 0 to 100. However, gradation of the "brightness" of the image obtained by composition is greater than the gradation (such as 8 bits) of the image obtained by one time of photographing and therefore is expressed as data by a value including digits after a decimal point (for example, the data is treated as a value to four places of decimals by using the data of 16 bits).

In the above equation, the weighting function w(Z) and the response function g(Z) of the image pickup element 8 of the image pickup part 8 are introduced. These functions will be described with reference to FIG. 6.

FIGS. 6A and 6B show an example of the characteristics of the weighting function and the response function. FIG. 6A shows the characteristics of the weighting function w(Z), and FIG. 6B shows the characteristics of the response function g(Z).

In FIG. 6A, the weighting function w(Z) is a function for reflecting the reliability for the value of the luminance outputted from the image pickup part 8. That is, under a certain exposure condition, regarding a value closer to the lower limit value (0) or the upper limit value (255) of the luminance outputted from the image pickup apparatus 8, the reliability is considered to be low compared with a value closer to the intermediate value (128). In other words, if the image pickup part 8 photographs a measuring object having the most suitable "brightness" under a certain exposure condition, this luminance is considered to have approximately the intermediate value.

Therefore, in consideration of such characteristics, as the weighting function w(Z), it is preferred to use a function of which a value near the lower limit value or the upper limit value is smaller compared with a value near an intermediate level of the luminance gradation scale. As an example, the present embodiment adopts a triangular weighting function of which the intermediate level of the luminance gradation scale becomes a maximum value (128) and the lower limit value and the upper limit value both become zero. By adopting such a weighting function, the composite luminance is calculated by preferentially adopting data with its luminance set within a predetermined range out of the input image data at each exposure time.

Also, in FIG. 6B, the response function g(Z) is a function for compensating non-linearity between the luminance outputted from the image pickup part 8 and the optical energy actually inputted into the image pickup part 8. For example, in the image pickup element such as a CCD, the relation between the inputted optical energy or the light quantity and the outputted voltage signal is non-linear. Such a non-linear characteristic is also referred to as a gamma characteristic. By the response function g (Z), the gamma characteristic is compensated, and the luminance outputted from the image pickup part 8 is corrected to be proportional to the optical energy actually inputted into the image pickup part 8. Note that FIG. 6B shows the response function g(Z) in the case of the luminance outputted from the image pickup part 8 being in a proportional relation with the inputted optical energy, for simplifying the description.

Note that "−8" of a constant term in the above equation is the term for compensating an offset generated when the relation between each exposure time and the "brightness" range is defined as shown in FIG. 5, and this term may be suitably set according to the relation between each exposure time and the "brightness" range.

In addition, in the above equation, a logarithm with "2" set as a base is used. However, the base is not necessarily limited to "2", and a natural logarithm with the Naperian number "e" set as a base and a common logarithm with "10" set as a base may also be used.

(Tone Mapping)

In FIG. 4 again, the luminance composition part 210 outputs the calculated composite luminance $E_i$ to the tone mapping part 214. The tone mapping part 214 generates the luminance information for generating the output image data based on the composite luminance $E_i$. Specifically, by assigning each composite luminance $E_i$ (luminance range: 0 to 100, however, having greater gradations than 256 gradations) to the luminance range of the composite image data (such as 0 to 255 gradation values), the tone mapping part 214 generates the luminance information of the composite image data. Note that the resolution (dynamic range) of each composite luminance $E_i$ is higher than that of the input image data, and therefore by making the luminance range of the composite image data have more gradations than the input image data, further precise composite image data can be generated.

Particularly, the tone mapping part 214 assigns a predetermined range of the composite luminance $E_i$ to the luminance range of the composite image data, according to the setting of "brightness" upper/lower limits by the user as will be described later.

Figure 7:
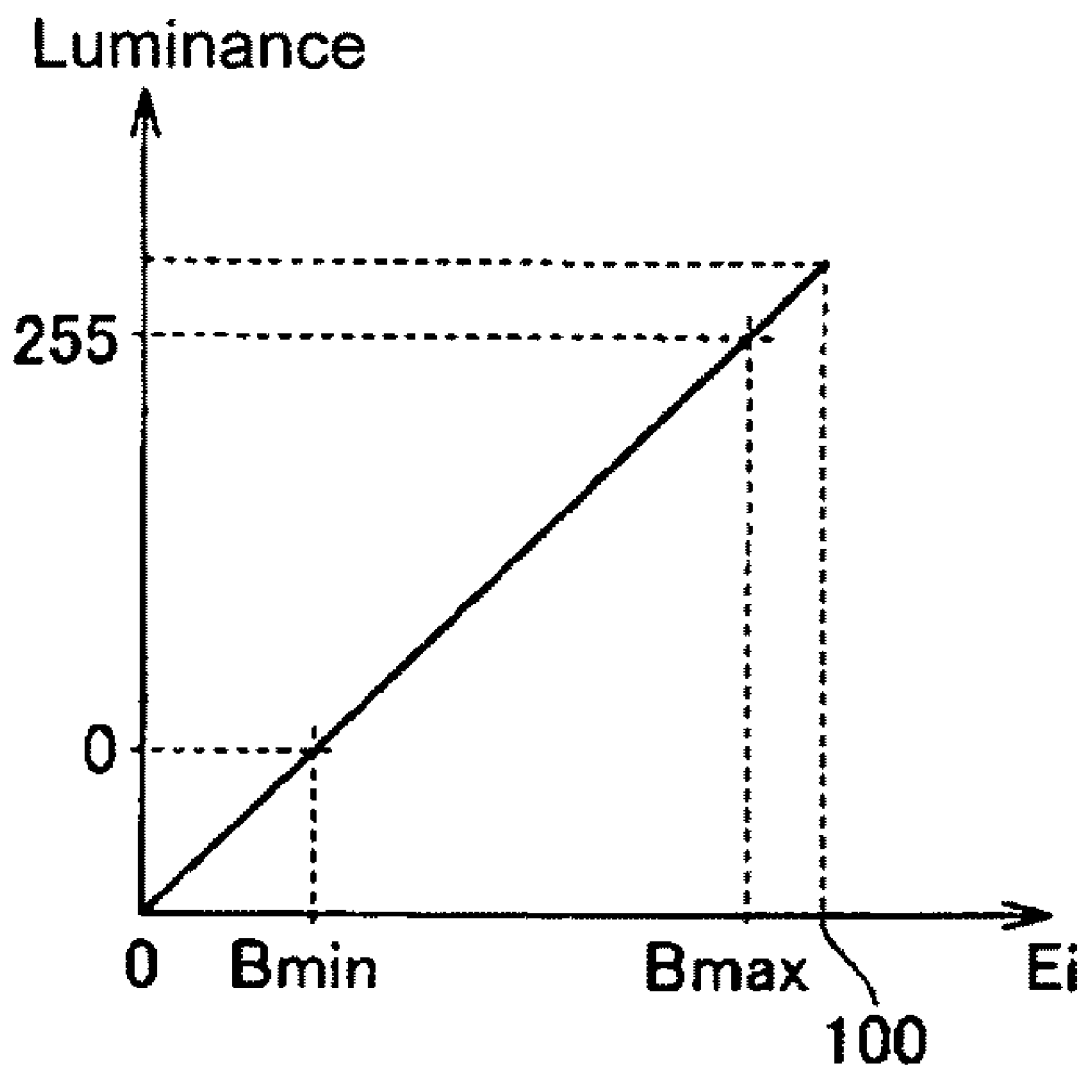
FIG. 7 shows an explanatory view for describing an assignment processing by a tone mapping part.

FIG. 7 shows an explanatory view for describing the assignment processing by the tone mapping part 214. In FIG. 7, in order to simplify the description, an example will be given for a case in which the tone mapping part 214 performs linear assignment processing. As a most simple example, the luminance range of 0 to 100 is allotted to a gradation scale of 0 to 255 while maintaining a proportional relation of the composite luminance $E_i$ to the inputted optical energy. Thus, data having a greater gradation than a display capability of the monitor can be displayed with a gradation (such as 8 bits display) compatible with the display capability of the monitor.

As described above, when "brightness" upper limit value Bmax and "brightness" lower limit value Bmin are set by the user, the tone mapping part 214 assigns this range of the composite luminance $E_i$ to luminance $Y_i$ in accordance with the following equation.

$$Y_i = 255 \times (E_i - B\min)/(B\max - B\min)$$

Calculation Example

As an example, in a case where the luminance at coordinate positions i of three input image data photographed in three exposure times of "1/20 seconds", "1/40 seconds", and "1/80 seconds" are respectively "190", "100", and "50", the composite luminance $E_i$ of the pixel corresponding to this coordinate position i is calculated as follows. In the equation, W(190)=65, W(100)=100, and W(50)=50.

$E_i$=10×{65×(log 190+log 20−8)+100×(log 100+log 40−8)+50×(log 50+log 80−8)}/(65+100+50)=40

Then, when the "brightness" upper limit value Bmax is set at "60", and the "brightness" lower limit value Bmin is set at "30" by the user, the luminance $Y_i$ of the composite image data is calculated as follows.

$Y_i$=255×(40−30)/(60−30)=85

(Generation of Histogram)

In FIG. 4 again, the luminance composition part 210 outputs the calculated composite luminance $E_i$ to the histogram generation part 218. The histogram generation part 218 generates a histogram regarding the composite luminance $E_i$. That is, the histogram generation part 218 classifies the composite luminance $E_i$ of each pixel into classes of predetermined widths and integrates the number of pixels, based on the composite luminance $E_i$ of each pixel. This assists the aforementioned user setting of the "brightness" upper limit value and the "brightness" lower limit value while referring to the range of relatively higher ratio in the composite luminance $E_i$ calculated by the luminance composition part 210.

In addition, the histogram generation part 218 is constituted so that generation processing of the histogram is suspended or restarted in response to the user setting as will be described later.

<(3) Color Composition Processing>

In FIG. 4, the color composition part 208 calculates the composite color information from the color information of a plurality of input image data. As will be described later, each pixel of the composite image data is obtained by multiplying the composite color information calculated by the color composition part 208, by the composite luminance information calculated by the luminance composition part 210 and the tone mapping part 214. Therefore, the composite color information outputted from the color composition part 208 is expressed by values showing a relative ratio of the "red color", "green color", and "blue color".

In addition, in the same way as the aforementioned luminance composition part 210, the color composition part 208 calculates the composite color information of each pixel of the composite image data, based on the color information of each pixel in a plurality of input image data corresponding to each coordinate position. More specifically, the color composition part 208 generates the composite color information by performing cumulative addition of the values obtained by multiplying the color information of each input image data by a weighting according to its reliability.

The color information at a coordinate position i of the j-th input image data is defined as $(r_{i,j}, g_{i,j}, b_{i,j})$. However, the color composition part 208 standardizes the color information outputted from the image information extraction parts 206a to 206h, so as to establish the equation, $r_{i,j}+g_{i,j}+b_{i,j}=1$. In addition, the luminance at the coordinate position i of the j-th input image data is defined as $Z_{i,j}$. When standardized color information and luminance are used, a calculation equation of the composite color information $(r_i, g_i, b_i)$ is as follows.

$$r_i = \frac{\sum_{j=1}^{p} w(Z_{i,j}) \cdot r_{i,j}}{\sum_{j=1}^{p} w(Z_{i,j})}$$ [Equation 2]

$$g_i = \frac{\sum_{j=1}^{p} w(V_{i,j}) \cdot g_{i,j}}{\sum_{j=1}^{p} w(Z_{i,j})}$$

$$b_i = \frac{\sum_{j=1}^{p} w(Z_{i,j}) \cdot b_{i,j}}{\sum_{j=1}^{p} w(Z_{i,j})}$$

wherein,
w(Z): weighting function
p: number of input image data

The weighting function w(Z) has the same characteristic as that of FIG. 6A. That is, the weighting function w(Z) is the function for reflecting the reliability for the value of the luminance outputted from the image pickup part 8. The technical meaning of this weighting function w(Z) has been described above, and therefore detailed description therefore is not repeated.

Then, the color composition part 208 outputs the calculated composite color information to the image generation part 212.

<(4) Generation Processing>

The image generation part 212 sequentially calculates the image information of the pixel at the coordinate position i by sequentially multiplying the luminance $Y_i$ generated by the luminance composition part 210 and the tone mapping part 214, by the corresponding composite color information $(r_i, g_i, b_i)$, and thereby generates the composite image data.

That is, absolute color information $(R_i, G_i, B_i)$ at the coordinate position i of the composite image data can be expressed as follows.

$(R_i, G_i, B_i) = Y_i \times (r_i, g_i, b_i)$

The composite image data is generated in accordance with the aforementioned procedure of (1) to (4). Note that in the photographing processing of (1), a series of photographing operation is repeatedly executed, and in synchronization with this repeated execution of the photographing processing, the processing from (2) to (4) is also executed.

<Calculation of Processing Time>

In FIG. 4 again, the processing time calculation part 222 calculates an expected processing time required for generating one composite image data. More specifically, based on the information from the photographing control part 200, the processing time calculation part 222 estimates the processing time in consideration of the number of times of photographing by means of the image pickup part 8, the exposure time in each photographing, and the processing amount of the image composition processing. The processing time corresponds to the time from starting photographing by the image pickup part 8 to completion of generation of the composite image data, required for generating one composite image data. The processing time calculated by the processing time calculation part 222 is displayed for the user and is outputted to the photographing control part 200, so as to be used in the change processing of the photographing conditions.

<Screen Display Example>

Figure 8:
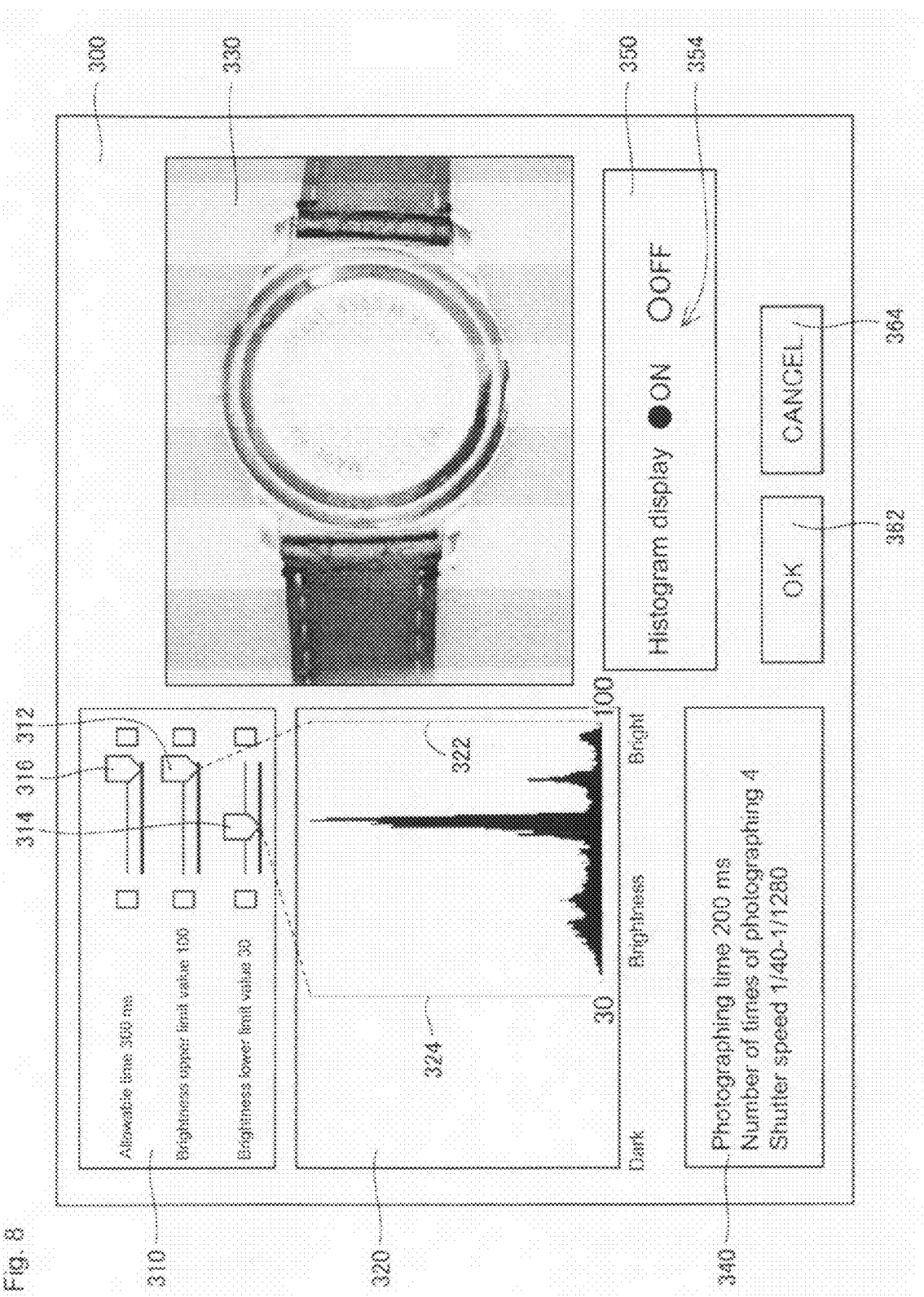
FIG. 8 shows a screen display example in a "setting mode" displayed on a monitor of the image processing apparatus according to the first embodiment of the present invention.

FIG. 8 shows a screen display example in a "setting mode" displayed on the monitor of the image processing apparatus according to the first embodiment of the present invention.

In FIG. 8, when the "setting mode" is selected, a setting mode screen 300 is displayed on the monitor 102. Note that the CPU 105 and a graphic board (not shown) cooperate to function as a display screen output part so as to cause the setting mode screen 300 to be displayed on the monitor 102. Such a screen display is realized by a GUI (Graphical User Interface) program incorporated as part of OS (Operating System), and the GUI also provides an environment for performing various user settings on the screen by using a cursor operated by the keyboard 103 and the mouse 104 by the user.

The setting mode screen 300 includes a set value limits input area 310, a histogram display area 320, a composite image display area 330, a photographing information display area 340, and a display mode selection area 350.

In the set value input area 310, there are disposed a slide bar 312 for setting the "brightness" upper limit value, a slide bar 314 for setting the "brightness" lower limit value, and a slide bar 316 for setting the "allowable time". The "brightness" upper/lower limit values set by the operation of these slide bars 312 and 314 are inputted into a "brightness" upper/lower limits setting part 216 (FIG. 4). Then, according to these "brightness" upper/lower limit values, a required exposure time is selected based on the relation shown in FIG. 5, and the number of times of photographing and the exposure time in the image pickup part 8 are changed.

In addition, in the "allowable time" set by the operation of the slide bar 316, an allowable maximum value of the processing time required for generating one composite image data is set. That is, the user sets a maximum processing time that can be allotted to generation processing of one composite image data as the "allowable time", based on the takt time of, e.g., a production line in which the visual sensor system 1 according to the present embodiment is disposed. The "allowable time" is given to the photographing control part 200 (FIG. 4).

The histogram generated in the histogram generation part 218 (FIG. 4) is visually displayed in the histogram display area 320. Further, on this histogram, position display is made at positions corresponding to the "brightness" upper/lower limit values set by the operation of the aforementioned slide bars 312 and 314.

The composite image based on the output image data generated according to the set "brightness" upper/lower limit values is displayed in the composite image display area 330. The composite image displayed in this composite image display area 330 displays the composite image data used in inspection or measurement in the operation mode, and with reference to the display of this composite image display area 330, the user adjusts the setting of the lighting condition for the workpiece and of the "brightness" upper/lower limit values.

In addition, the display image in the composite image display area 330 is updated every time the composite image data is generated by the image generation part 212 (FIG. 4). Therefore, the composite image can be displayed for the user, substantially like a moving image. Note that the cycle of updating the display of this composite image depends on the number of times of photographing, the exposure condition in each photographing, and the time required for the image composition processing performed by the image pickup apparatus 8. Therefore, in the image processing apparatus according to the present embodiment, this updating cycle is changeable according to the user setting.

In the photographing information display area 340, "photographing time", "the number of times of photographing", and "shutter speed" are displayed. The "photographing time" is the expected processing time required for generating one composite image data calculated by the processing time calculation part 222 (FIG. 4). Also, the "the number of times of photographing" displays the number of times of photographing (that is, the number of input image data) required for generating the composite image data, and the "shutter speed" displays the maximum and minimum values of the exposure time that is set (or is settable) at the image pickup part 8. That is, the displayed "photographing time" shows a processing cycle required for generating one composite image data.

In the display mode selection area 350, a radio button 354 for selecting display/non-display of the histogram in the histogram display area 320 is displayed. When non-display of the histogram is selected by the radio button 354, display of the histogram in the histogram display area 320 is not performed.

Further, in the setting mode screen 300, an "OK" button 362 and a "CANCEL" button 364 are disposed, and when the user selects the "OK" button 362, the value set in each item is stored in the fixed disk 107 or the like, and then the mode is set to the "operation mode". Meanwhile, when the user selects the "CANCEL" button 364, the value set in each item is not stored in the fixed disk 107 or the like, and then the mode is set to the "operation mode".

<Control Structure in the Operation Mode>

Figure 9:
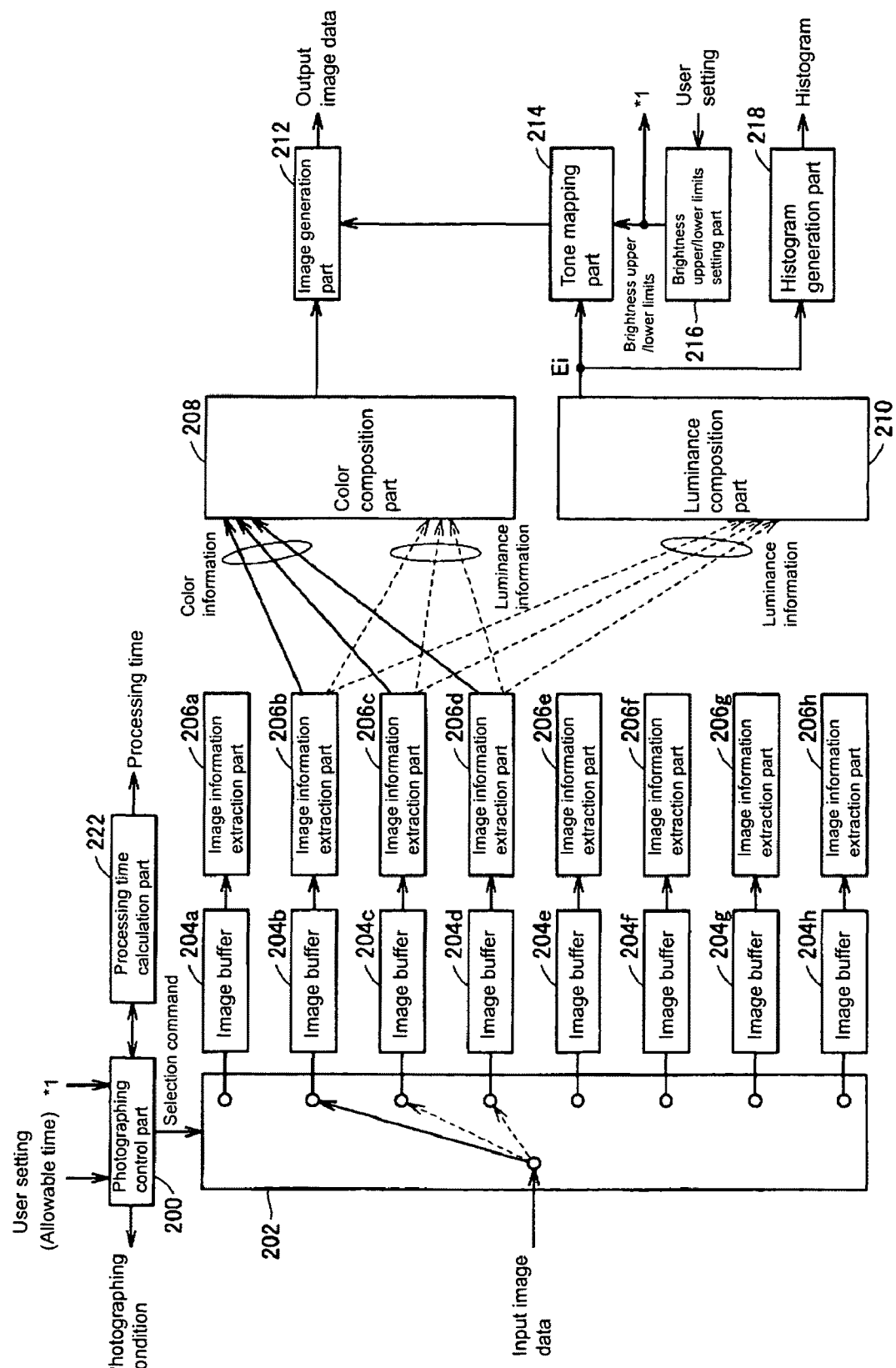
FIG. 9 shows an explanatory view for describing a control operation in an operation mode of the image processing apparatus according to the first embodiment of the present invention.

FIG. 9 is an explanatory view for describing control operation in the operation mode of the image processing apparatus according to the first embodiment of the present invention.

In FIG. 9, as an example, in the case where the composite image data is formed from three input image data, three exposure conditions are sequentially set in the image pickup part 8, and thereafter photographing is performed. Then, along with photographing, the input image data is outputted only from three image buffers 204 of the eight image buffers 204. Thus, in the "operation mode", the entire processing time can be shortened by streamlining the exposure conditions (photographing time) set in the image pickup part 8 and the processing time required for image composition.

In the setting mode screen 300 shown in FIG. 8, photographing must be performed based on all the exposure conditions that can be basically set in the image pickup part 8, to display the histogram. This is because the histogram reflecting all the exposure conditions must be displayed so that the user can appropriately set the "brightness" upper/lower limit values.

Meanwhile, when the user sets non-display of the histogram, the aforementioned consideration is not necessary, and therefore it is sufficient to photograph only the input image data required for generation of the composite image data. That is, it is sufficient to photograph the workpiece the required number of times of photographing and under the exposure condition in each time of photographing, according to the set "brightness" upper/lower limit values. Accordingly, by switching the mode to a control operation of acquiring only necessary input image data as shown in FIG. 9, the composite image displayed in the composite image display area 330 in the "setting mode" can be further speedily updated.

<Setting of "Brightness" Upper/Lower Limit Values>

The photographing control part 200 (FIG. 4) determines the number of times of photographing and the exposure time in each photographing with reference to the relation shown in FIG. 5, according to the "brightness" upper/lower limit values set by the user. At this time, the tone mapping part 214 assigns the range corresponding to the composite luminance, to the luminance range of the composite image data, and therefore it is also possible to display the composite image focusing on regions of any "brightness" in the workpiece.

For example, it is possible to display an image of 0 to 255 gradations with the lower limit value of the designated "brightness" set at "0" and the upper limit value thereof set at "255".

FIGS. 10A to 10D show an example of the relation between the "brightness" upper/lower limit values and the composite image, in the image processing apparatus according to the first embodiment of the present invention. Note that the workpiece has the same rear surface of a wrist watch as shown in FIGS. 3A to 3C.

Figure 10A:
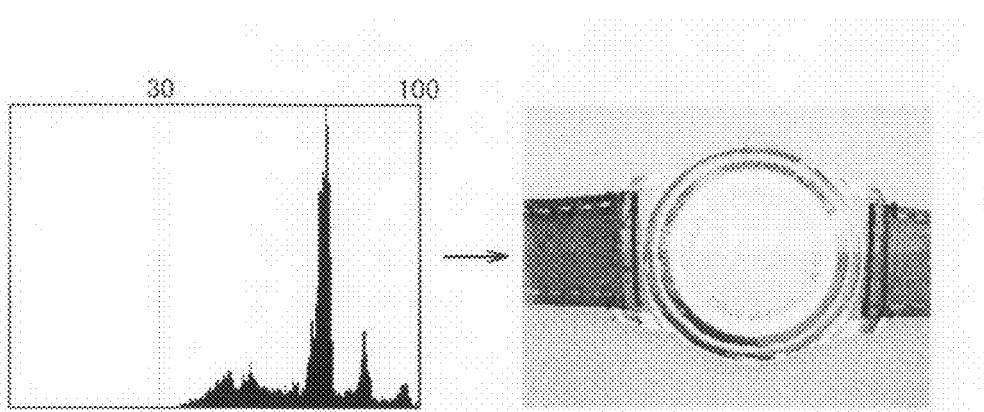
FIGS. 10A to 10D show an example of a relation between "brightness" upper/lower limit values and a composite image in the image processing apparatus according to the first embodiment of the present invention.

As shown in FIG. 10A, by setting the range in which an effective pixel appears in the histogram to the "brightness" upper/lower limit values, it is found that the watch body part made of metal and the band part made of leather having greatly different reflectances are clearly photographed.

Figure 10B:
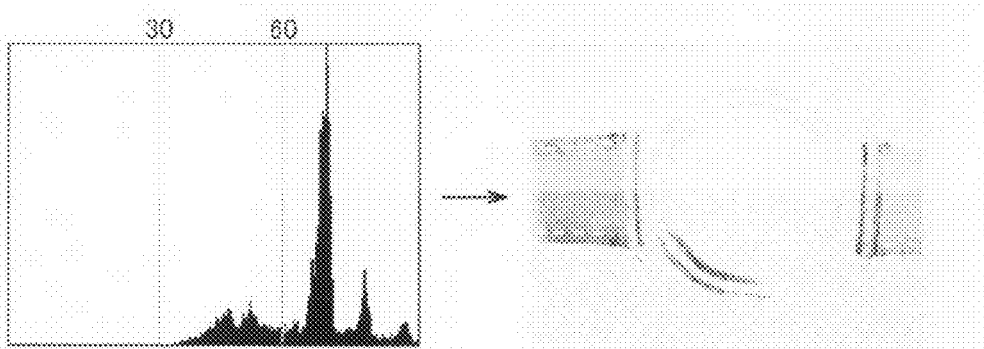
Figure 10C:
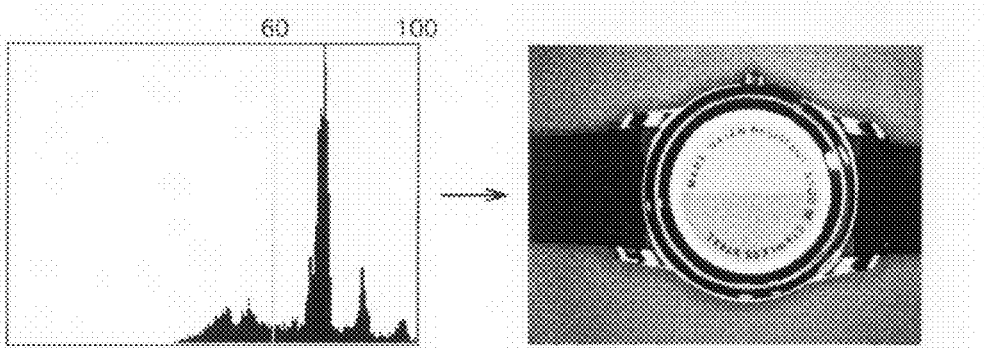

Meanwhile, as shown in FIG. 10B, when the range of the pixel mainly corresponding to the band part made of leather is set to the "brightness" upper/lower limit values, it is found that although the band part made of leather is clearly photographed, overexposure occurs in the watch body part made of metal. Reversely, as shown in FIG. 10C, when the range of the pixels mainly corresponding to the watch body part made of metal is set to the "brightness" upper/lower limit values, it is found that although the watch body part made of metal is more clearly photographed, underexposure occurs in the band part made of leather.

Figure 10D:
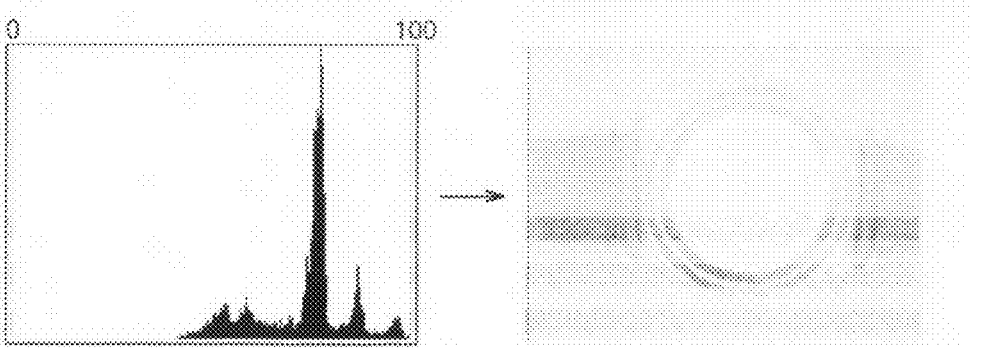

In addition, as shown in FIG. 10D, when the whole range of the histogram is set to the "brightness" upper/lower limit values, it is found that although the whole part of the image is clearly photographed, contrast is deteriorated compared with FIG. 10A.

Thus, by adjusting a proper "brightness" upper/lower limit values according to a target workpiece, the user can generate a composite image data suitable for inspection or measurement.

<Calculation of the Processing Time>

As described above, the processing time calculation part 222 (FIG. 4) calculates the expected processing time required for generating one composite image data, and the calculated processing time is displayed in the photographing information display area 340 as "photographing time". In the description hereunder, by using FIG. 11, an example of the calculation method of the processing time by this processing time calculation part 222 will be described.

Figure 11:
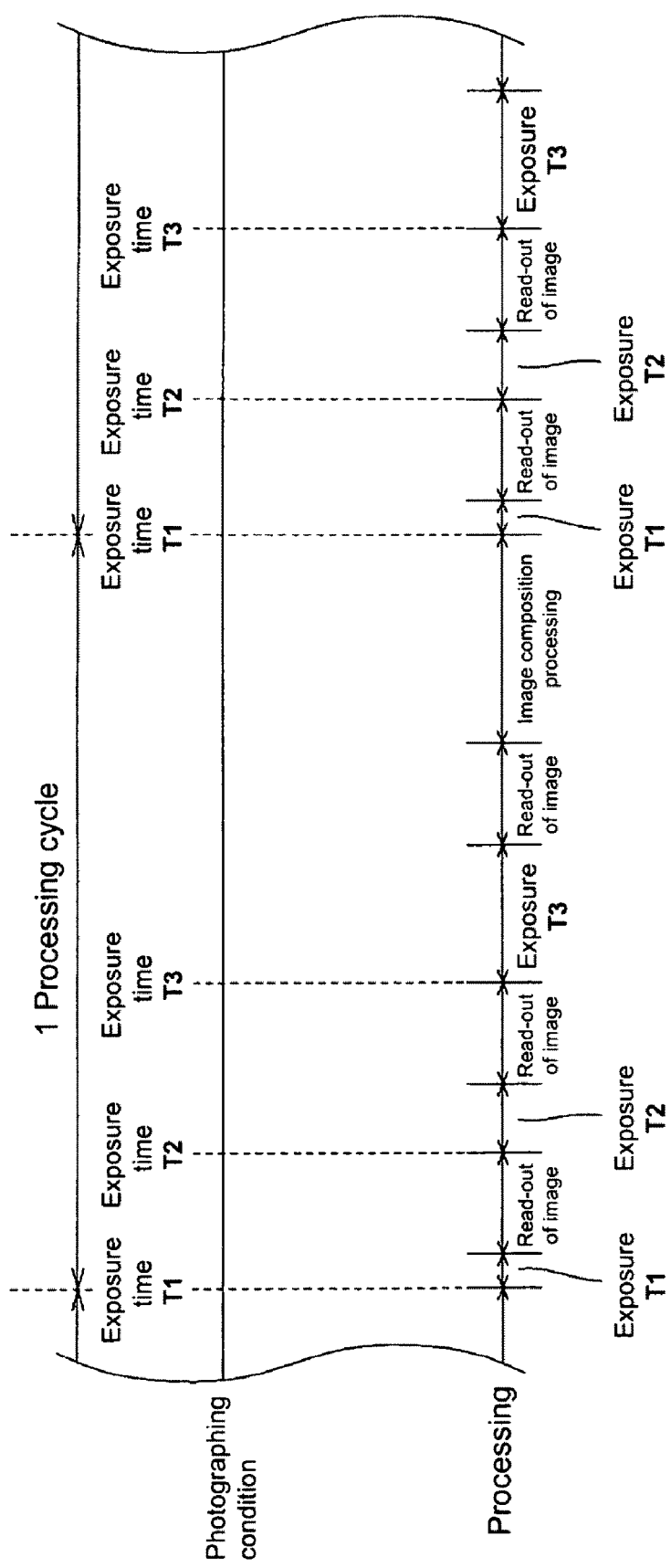
FIG. 11 shows an explanatory view for describing an example of a calculation method of a processing time in the image processing apparatus according to the first embodiment of the present invention.

FIG. 11 shows a diagram for describing an example of the calculation method of the processing time in the image processing apparatus according to the first embodiment of the present invention.

In FIG. 11, the processing time required for generating one composite image data can be calculated as a sum of the time (exposure time) required for photographing in each photographing, the time required for reading out the input image data photographed by the image pickup part 8 in each photographing, and the time required for the image composition processing.

Note that a series of photographing (in FIG. 11, three times of photographing such as exposure times T1, T2, T3) for generating one composite image data is cyclically repeated. Therefore, one processing cycle required for generating one composite image data corresponds to a period from starting photographing at exposure time T1 to starting photographing again at the same exposure time T1.

The time required for the photographing can be estimated from the set exposure time. In addition, the time required for reading the input image data is approximately a constant value that depends on specifications of the hardware and can be previously acquired. Also, the time required for the image composition processing can also be estimated, because processing amount is determined by the number of input images to be processed. Accordingly, the processing time calculation part 222 can calculate the expected processing time required for generating the composite image data, based on the number of times of photographing and the exposure condition in each photographing.

<Change Processing of the Photographing Conditions>

When the "brightness" upper/lower limit values are set by the user, the photographing control part 200 (FIG. 4) refers to the correspondence relation (FIG. 5) between the previously defined exposure time and the "brightness", and decides the number of times of photographing required for generating one composite image data in the "operation mode" and the exposure condition (photographing condition) in each photographing. If the "allowable time" is set by the user, the photographing control part 200 determines whether or not an expected processing time based on the initially set photographing condition exceeds the "allowable time". When it is determined that the expected processing time exceeds the "allowable time", the photographing control part 200 changes the photographing condition so that the expected processing time falls within the "allowable time". The change processing of the photographing condition will be exemplified hereinafter with reference to FIG. 12.

Figure 12:
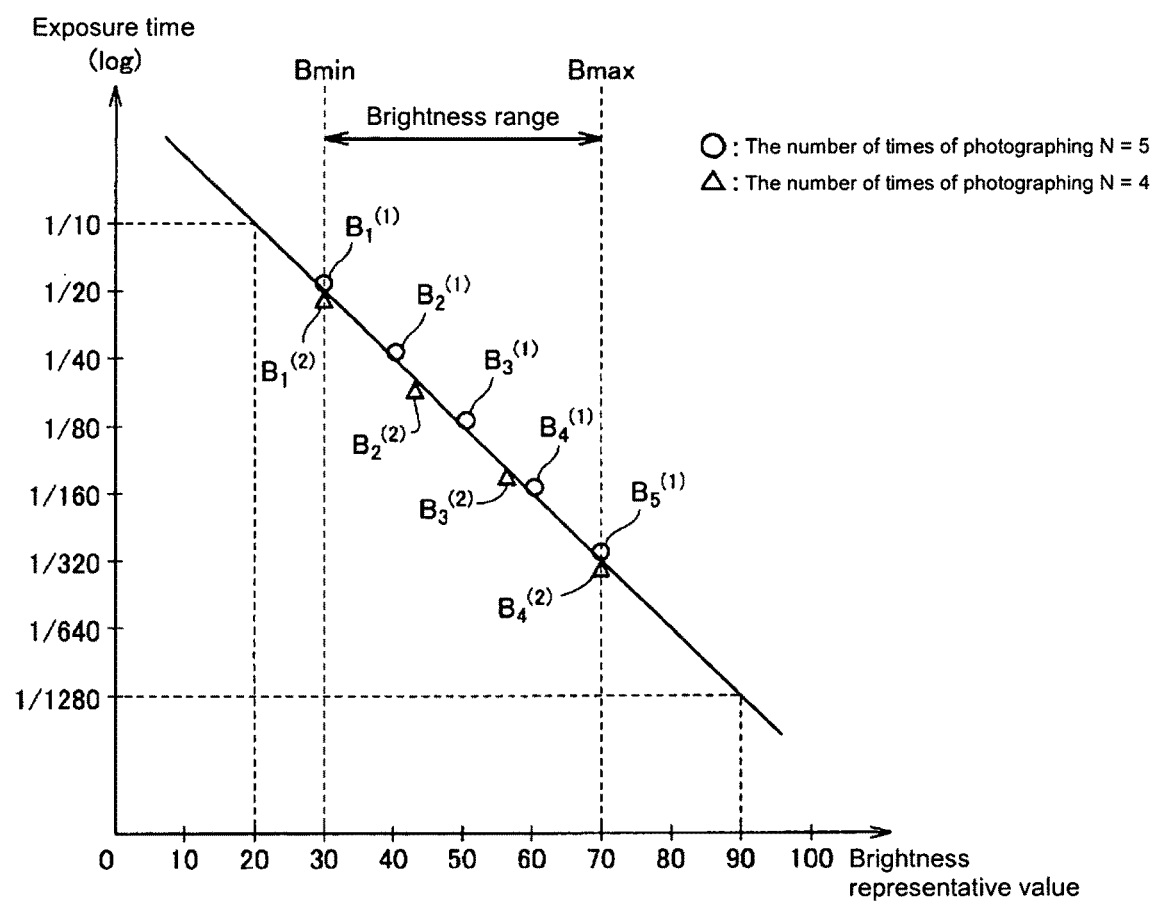
FIG. 12 shows an explanatory view for describing change processing of photographing conditions according to the first embodiment of the present invention.

FIG. 12 is a diagram for describing the change processing of the photographing condition according to the first embodiment of the present invention.

In FIG. 12, the correspondence relation between the exposure time and the "brightness" representative value shown in FIG. 5 can be expressed as a relation of a direct function with the "brightness" representative value taken on the horizontal axis and the exposure time taken on the vertical axis (log scale). That is, the correspondence relation shown in FIG. 5 corresponds to the correspondence relation between the exposure time and the "brightness" representative value with the "brightness" representative values set to be "20", "30", . . . , "90" on the direct function shown in FIG. 12.

The photographing control part 200 refers to the correspondence relation shown in FIG. 12 and changes or decides the photographing condition, so that the expected processing time falls within the "allowable time".

In the image processing apparatus according to the present embodiment, the "brightness" range to be detected is defined in accordance with the "brightness" range inputted by the user. Therefore, the photographing control part 200 decides the number of times of photographing and the exposure time in each photographing, from the range of the exposure time included in the "brightness" range inputted by the user.

More specifically, when a "brightness" lower limit value Bmin and a "brightness" upper limit value Bmax are set by the user, the photographing control part 200 suitably changes the number of times of photographing allotted to a range (brightness range) from the "brightness" lower limit value Bmin to the "brightness" upper limit value Bmax, and decides an allotment pattern so that the expected processing time is not more than the "allowable time".

As shown in FIG. 12, as an example, when the "brightness" lower limit value Bmin=30 and the "brightness" upper limit value Bmax=70 are established, the photographing control part 200 decides a total of five times of photographing as initial setting, with the "brightness" representative values set to "30", "40", . . . , "70" ("brightness" representative values B(1)1, B(1)2, . . . , B(1) 5=30, 40, . . . 70). Note that exposure time Tk corresponding to the "brightness" representative value Bk is calculated by a relational expression shown below.

$$T_k = \frac{1}{10 \times 2^{\frac{B_k - 20}{10}}}$$ (Equation 3)

When it is determined that the expected processing time exceeds the "allowable time" in the aforementioned photographing condition, the photographing control part 200 subtracts 1 from initially set 5 to thereby reduce the number of times of photographing to 4. Then, the photographing control part 200 allots four times of photographing to the aforementioned range from the "brightness" lower limit value Bmin to the "brightness" upper limit value Bmax. At this time, it is preferred to allot the photographing to at least the "brightness" lower limit value Bmin and the "brightness" upper limit value Bmax.

In the example shown in FIG. 12, when photographing of four times is allotted, the "brightness" representative value B(2)1, B(2)2, B(2)3, B(2)4=30, 43, 57, 70 is established. Further, the photographing control part 200 calculates the exposure times corresponding to the allotted "brightness" representative values B(2)1, B(2)2, B(2)3, and B(2)4 and determines whether or not the expected processing time based on this photographing condition is not more than the "allowable time".

In the same way, the number of times of photographing is sequentially reduced until the expected processing time becomes not more than the "allowable time", and the photographing control part 200 decides the photographing condition including the maximum number of times of photographing in which the expected processing time is not more than the "allowable time". Note that in the image composition processing according to the present embodiment, the composite image data is generated based on a plurality of input image data. Therefore, when the expected processing time, in a case where the number of times of photographing is set to two, exceeds the "allowable time", generation processing of the composite image data cannot be performed, and the user may be notified of this matter.

<First Modification of the Change Processing of the Photographing Conditions>

The change processing of the photographing conditions shown in FIG. 12 shows a structure in which the exposure condition is set so that the "brightness" representative value corresponding to each exposure time falls within the "brightness" range inputted by the user. However, the exposure conditions may be set in consideration of the "brightness" range covered by each exposure time.

Figure 13:
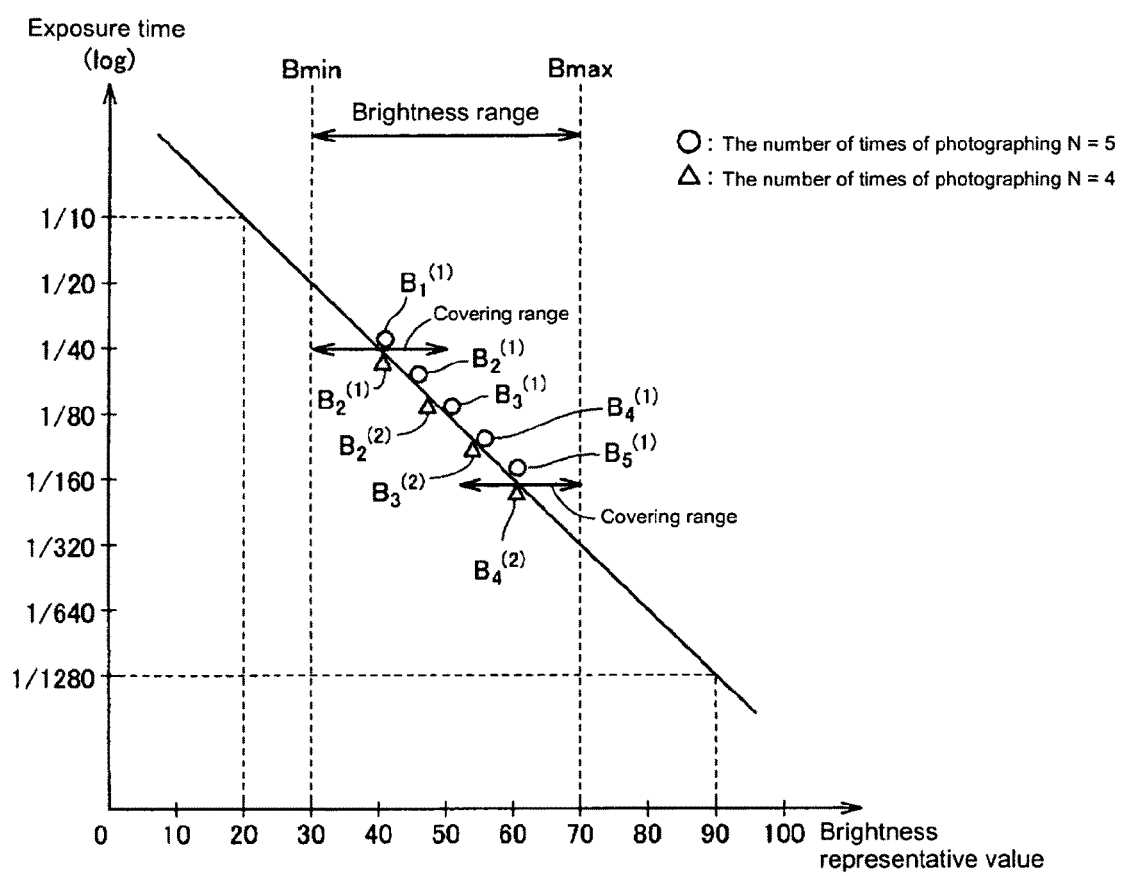
FIG. 13 shows an explanatory view for describing a first modification of the change processing of the photographing conditions according to the first embodiment of the present invention.

FIG. 13 is a diagram for describing a first modification of the change processing of the photographing conditions according to the first embodiment of the present invention.

In FIG. 13, as an example, in the same way as FIG. 12, a case of setting the "brightness" lower limit value Bmin=30 and the "brightness" upper limit value Bmax=70 is considered. As shown in FIG. 5, when the range covered by each exposure time is set to "±10" with the "brightness" representative value as a center, a minimum value in the "brightness" representative values including the "brightness" lower limit value Bmin in this "brightness" range is "40". Similarly, a maximum value in the "brightness" representative values including the "brightness" upper limit value Bmax in this "brightness" range is "60". Therefore, the number of times of photographing may be allotted to a range excluding the range covered by each exposure time from the "brightness" range inputted by the user.

In an example shown in FIG. 13, when photographing of five times is allotted to the aforementioned range, "brightness" representative value B(1)1, B(1)2, . . . , B(1)5=40, 45, 50, 55, 60 is established. Also, when photographing of four times is allotted, "brightness" representative value B(2)1, B(2)2, B(2)3, B(2)4=40, 46, 53, 60 is established.

<Second Modification of the Change Processing of the Photographing Conditions>

In the change processing of the photographing conditions shown in FIGS. 12 and 13, a structure of sequentially deciding the number of times of photographing and the exposure time in each photographing is shown based on a function indicating the correspondence relation between the exposure time and the "brightness" representative value. However, it is also acceptable to decide the number of times of photographing and the exposure time in each photographing based on a table format as shown in FIG. 5.

FIG. 14 is a diagram illustrating an example of the correspondence relation between the exposure time and the "brightness" used in a second modification of the change processing of the photographing conditions according to the first embodiment of the present invention.

In the correspondence relation between the exposure time and the "brightness" range shown in FIG. 14, more combinations are defined as compared with FIG. 5, so that the photographing conditions can be changed with a higher degree of freedom according to the "brightness" range inputted by the user.

In FIG. 14, as an example, in the same way as FIG. 12, a case of setting the "brightness" lower limit value Bmin=30 and the "brightness" upper limit value Bmax=70 is considered. At this time, a combination of the exposure time and the "brightness" range with part or the whole part of its "brightness" range included in the range of "30" to "70" set by the user, is extracted as a candidate decided to be the exposure conditions, out of the combinations of the exposure time and the "brightness" range shown in FIG. 14. In examples shown in FIG. 14, combinations in nine patterns are the candidates decided to be the exposure conditions. Then, by combining these candidates appropriately, the photographing condition can be decided such that the expected processing time falls within the "allowable time".

<Still Another Modification of the Change Processing of the Photographing Condition>

Instead of automatically changing the photographing conditions by the photographing control part 200 as described above, it is also possible that the correspondence relation between the exposure time and the "brightness" as shown in FIG. 12 or FIG. 13 is visually displayed on the monitor 102, and that the photographing conditions are directly set by the user with reference to the correspondence relation.

<Operation Mode>

An example of the processing in the operation mode will be described hereunder. Conventionally, there are proposed various methods of performing inspection or measurement of the workpiece by using the generated composite image data. However, the present embodiment exemplifies search processing of searching a portion that coincides with a previously registered image pattern and edge scan processing of detecting edges of the workpiece and measuring a distance between the edges. Note that the processing in the operation mode is not limited to the processing.

Figure 15:
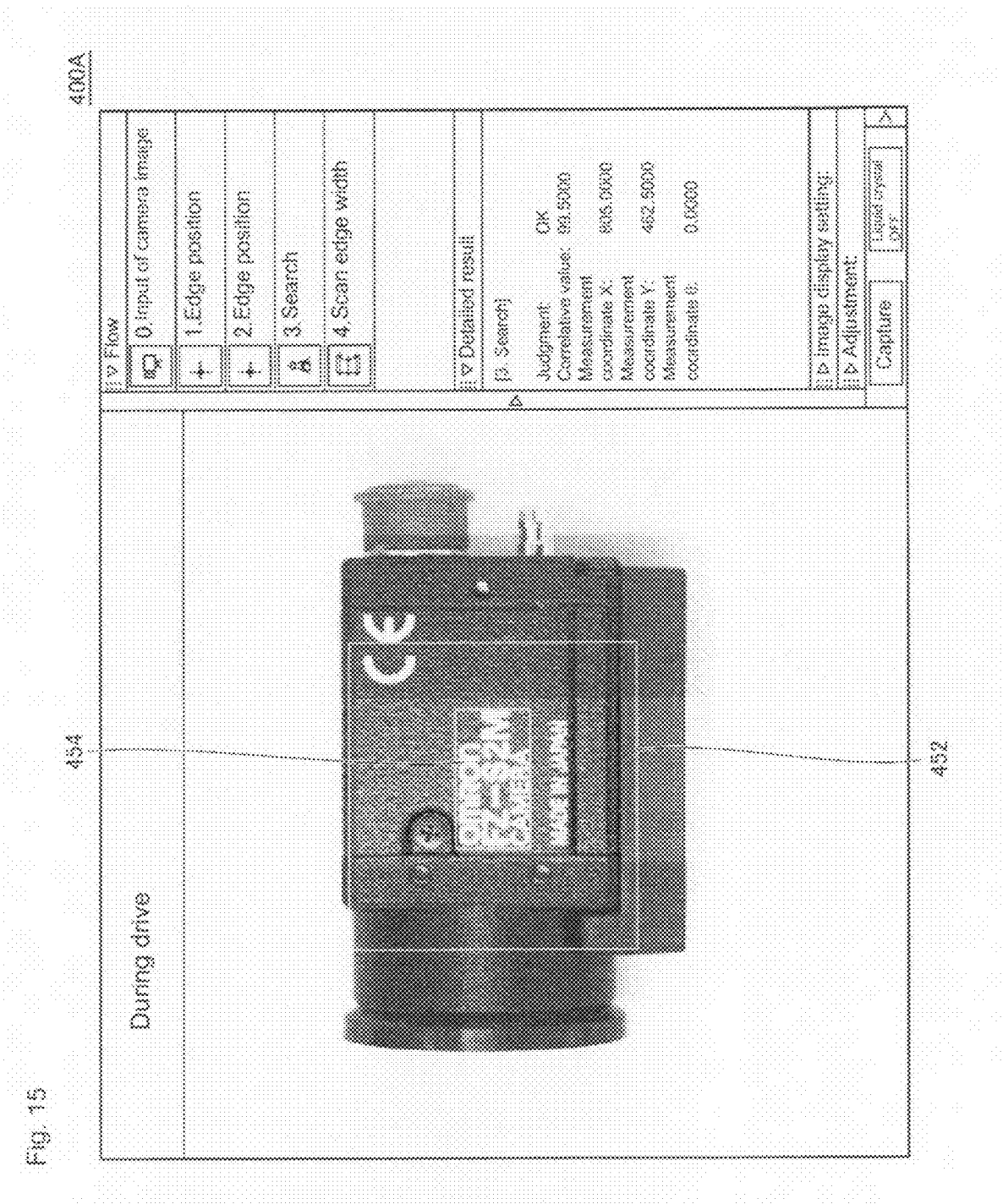
FIG. 15 shows a display example of search processing, which is an example of the operation mode.

FIG. 15 shows a diagram illustrating a display example of the search processing, which is an example of the operation mode.

Figure 16:
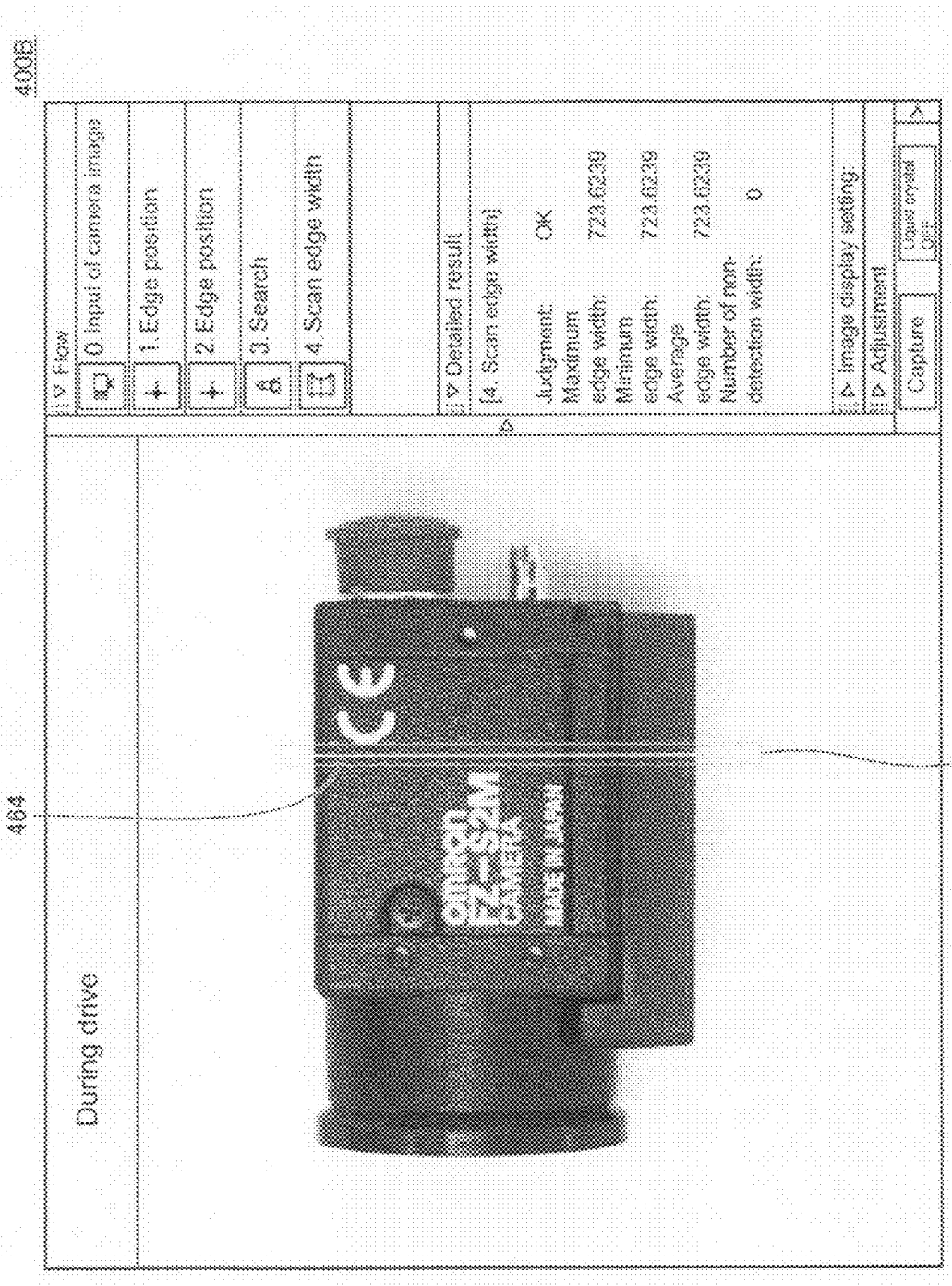
FIG. 16 shows a display example of edge scan processing, which is an example of the operation mode.

FIG. 16 shows a diagram illustrating a display example of the edge scan processing, which is an example of the operation mode.

In FIG. 15, when the search processing is selected in the "operation mode", an operation mode screen 400A is displayed in the monitor 102. In this operation mode screen 400A, the user previously sets a target region 402 and registers the image pattern to be detected. Then, by sequentially calculating a correlation value between the target region 402 of the composite image data and the registered pattern by applying the aforementioned image composition processing to the target region 402, the CPU 105 specifies an area 404 that coincides with the registered pattern. Further, the CPU 105 displays positional information and the like of the specified area 404, on the monitor 102.

According to this search processing, when a specific kind of workpiece is sequentially produced, a different kind of mixed workpiece can be detected.

In FIG. 16, when the edge scan processing is selected in the "operation mode", an operation mode screen 400B is displayed on the monitor 102. In this operation mode screen 400B, the user previously sets a target region 412. Then, in the composite image data, the CPU 105 applies the aforementioned image composition processing and specifies two places (edge positions) in which color difference is a predetermined threshold value or more, in the target region 412. Then, the CPU 105 defines a straight line 414 connecting these specified two points and calculates a distance (such as a pixel value) between these two points on the figure.

According to such edge scan processing, by comparing an inter-edge distance and a defined value, a production failure of the workpiece and the like can be detected.

In addition to the aforementioned processing, it is also possible to perform color area calculation processing of counting the number of pixels having a specific color range.

<Processing Procedure>

Figure 17:
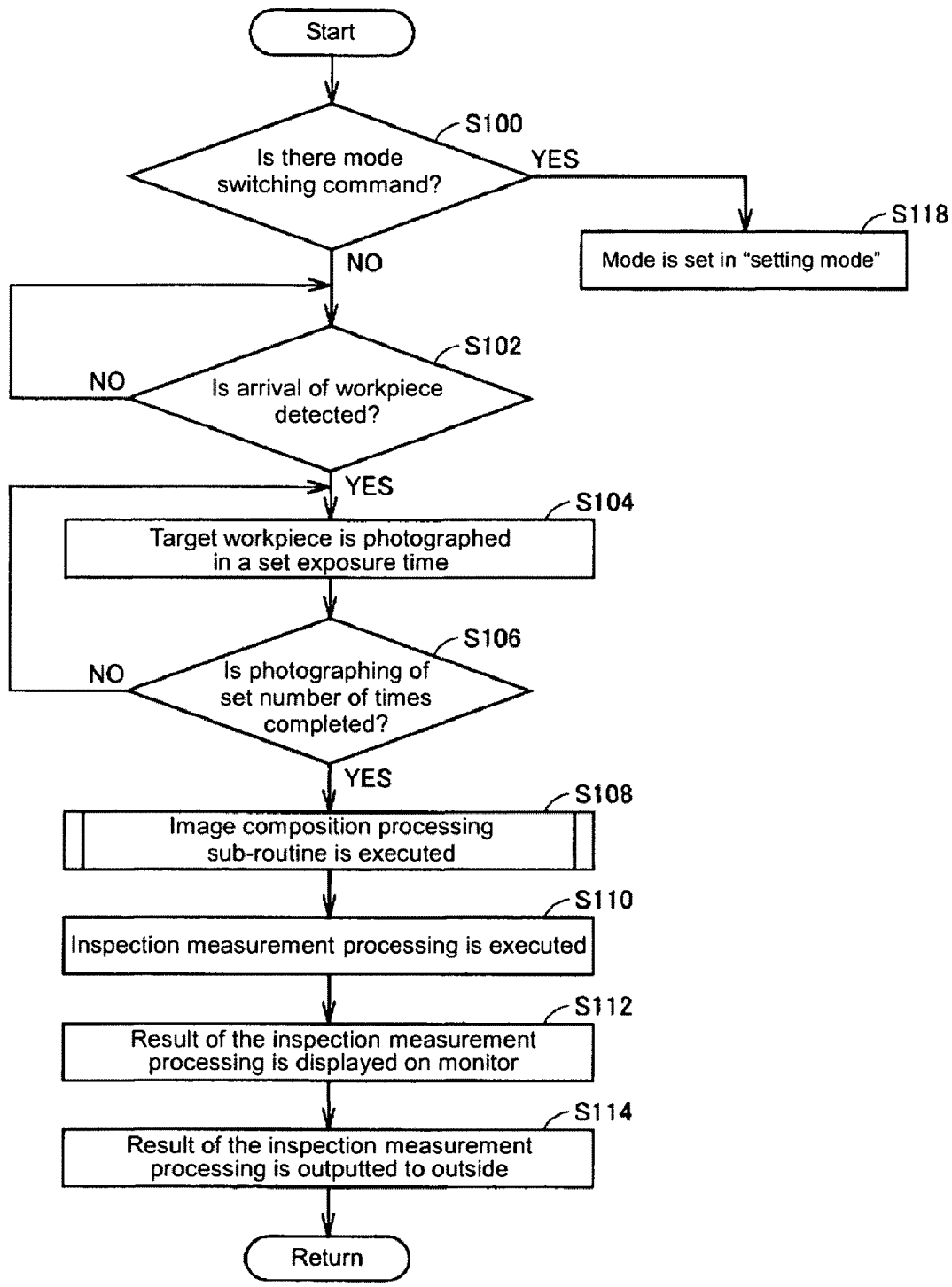
FIG. 17 shows a flowchart illustrating an overall process in the image processing apparatus according to the first embodiment of the present invention.

FIG. 17 is a flowchart illustrating overall processing in the image processing apparatus according to the first embodiment of the present invention. The flowchart shown in FIG. 17 is realized by reading the program previously stored in the fixed disk 107 or the like into the memory 106 and executing this program by the CPU 105. Note that an initial mode is set to the "operation mode".

In FIG. 17, the CPU 105 determines whether or not a mode switching command is given (step S100). When the mode switching command is not given (NO in step S100), the CPU 105 executes inspection measurement processing from step S102 to step S114.

That is, the CPU 105 determines whether or not the arrival of the workpiece 2 is detected by the optoelectronic sensor (step S102). When the workpiece 2 does not arrive (NO in step S102), the processing of step S102 is repeated.

When the workpiece 2 arrives (YES in step S102), the CPU 105 photographs the workpiece 2 in the set exposure time, in accordance with the setting previously stored in the fixed disk 107 (step S104). Then, the CPU 105 determines whether or not the set number of times of photographing is completed (step S106). If the set number of times of photographing is not completed (NO in step S106), the CPU 105 repeats the processing of step S104.

If the set number of times of photographing is completed (YES in step S106), the CPU 105 executes image composition processing sub-routine and generates the composite image data from the photographed input image data (step S108).

Subsequently, the CPU 105 executes inspection measurement processing based on the generated composite image data (step S110). Then, the CPU 105 displays the result of the inspection measurement processing on the monitor 102 or the like (step S112) and outputs this result to an external device such as a PLC (Step S114). Then, the processing is returned to the first step.

Meanwhile, when the mode switching command is given (YES in step S100), the mode of the CPU 105 is moved to a "setting mode" (step S118).

Figure 18:
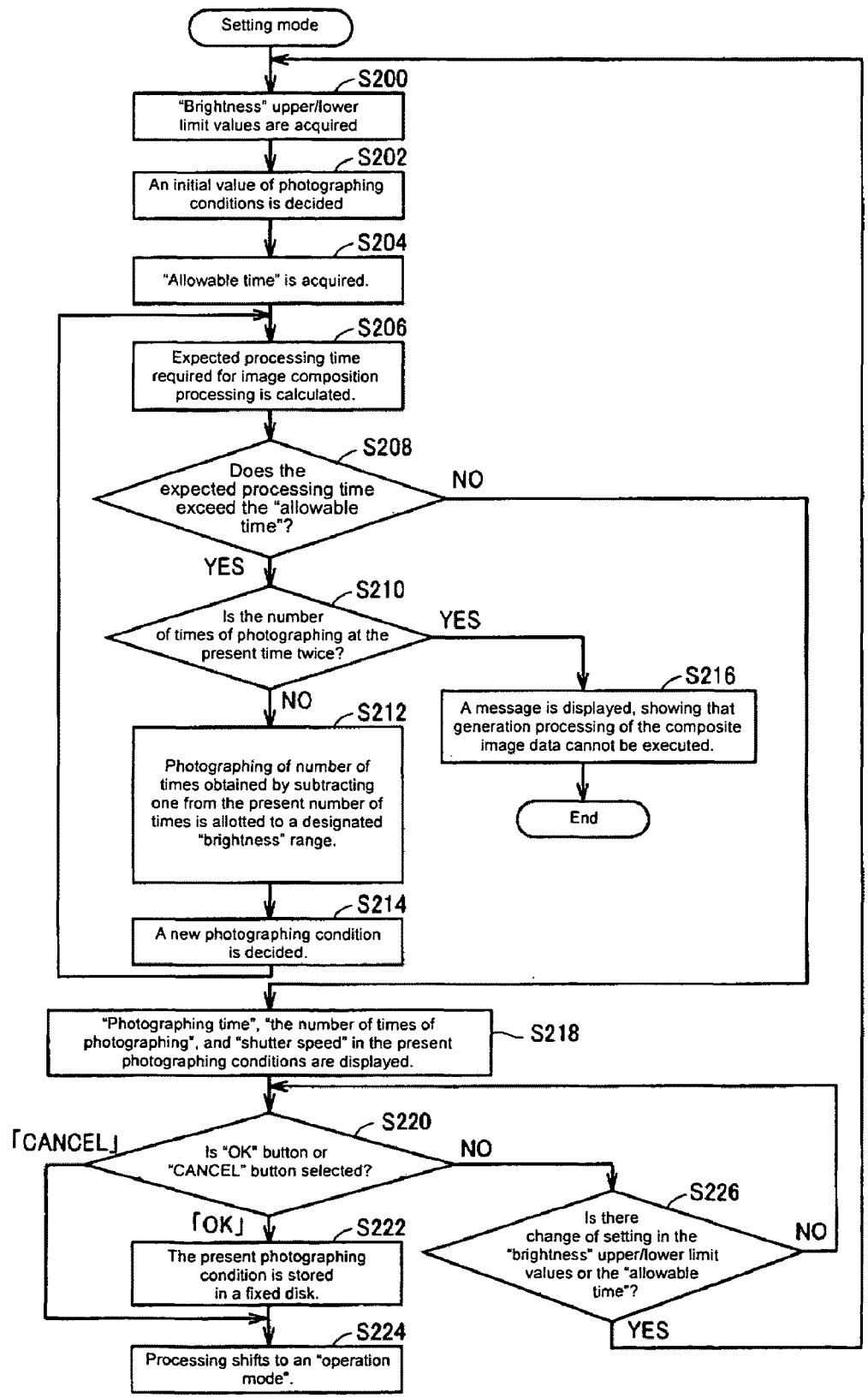
FIG. 18 shows a flowchart illustrating the change processing of the photographing conditions in the image processing apparatus according to the first embodiment of the present invention.

FIG. 18 shows a flowchart illustrating the change processing of the photographing conditions in the image processing apparatus according to the first embodiment of the present invention. The flowchart shown in FIG. 18 is realized by reading the program previously stored in the fixed disk 107 or the like into the memory 106 and executing this program by the CPU 105.

In FIG. 18, when the "setting mode" is selected, the CPU 105 acquires the "brightness" upper/lower limit values inputted by the user on the setting mode screen 300 (FIG. 8) (Step S200). Then, based on the "brightness" upper/lower limit values acquired in step S200, the CPU 105 refers to the correspondence relation (FIG. 5) between the previously defined exposure time and "brightness" and decides the number of times of photographing required for generating one composite image data in the "operation mode" and an initial value of the exposure condition (photographing condition) in each photographing (step S202).

Subsequently, the CPU 105 acquires the "allowable time" inputted by the user on the setting mode screen 300 (FIG. 8) (Step S204), and based on the photographing condition at the present time decided in step S202, calculates the expected processing time required for one time of composite image processing (step S206). Then, the CPU 105 determines whether or not the expected processing time calculated in step S206 exceeds the "allowable time" acquired in step S204 (Step S208).

When the expected processing time exceeds the "allowable time" (YES in step S208), the CPU 105 determines whether or not the number of times of photographing at the present time is twice (step S210). When the number of times of photographing at the present time is not twice (NO in step S210), the CPU 105 allots the photographing of the number of times obtained by subtracting one from the number of times of photographing at the present time, to the "brightness" range designated by the "brightness" upper/lower limit values acquired in step S200. Further, the CPU 105 decides a new photographing condition by calculating the exposure time corresponding to the "brightness" of each allotted photographing (step S214). Then, based on the photographing condition after change, the CPU 105 calculates the expected processing time required for one time of image composition processing (step S206) and performs the processing after step S208 again. That is, the processing from steps S206 to S214 is repeated until the expected processing time required for one time of image composition processing does not exceed the allowable time.

In addition, when the number of times of photographing at the present time is twice (YES in step S210), the CPU 105 displays a message that the generation processing of the composite image data cannot be performed based on the condition of the inputted allowable time, on the setting mode screen 300 (FIG. 8) (step S216), and the processing is completed.

Meanwhile, when the expected processing time does not exceed the "allowable time" (NO in step S208), the CPU 105 displays the "photographing time", "the number of times of photographing", "shutter speed", and the like based on the photographing conditions at the present time, on the setting mode screen 300 (FIG. 8) (Step S218).

Further, the CPU 105 determines whether or not an "OK" button 362 or a "CANCEL" button 364 on the setting mode screen 300 (FIG. 8) is selected (step S220).

When the "OK" button 362 is selected ("OK" in step S220), the CPU 105 stores the present photographing condition (the number of times of photographing and the exposure condition in each photographing) in the fixed disk 107 (step S222). Then, the CPU 105 shifts to the "operation mode" (step S224). Also, when the "CANCEL" button 364 is selected ("CANCEL" in step S220), the CPU 105 discards the present setting and shifts to the "operation mode" (step S224).

Meanwhile, when neither one of the "OK" button 362 or the "CANCEL" button 364 on the setting mode screen 300 (FIG. 8) is selected (NO in step S220), the CPU 105 determines whether or not the setting of the "brightness" upper/lower limit values or the "allowable time" is changed (step S226). When the setting of the "brightness" upper/lower limit values or the "allowable time" is changed (YES in step S226), the CPU 105 repeats the processing after step S200. Also, when the setting of the "brightness" upper/lower limit values or the "allowable time" is not changed (NO in step S226), the CPU 105 repeats the processing after step S220.

Figure 19:
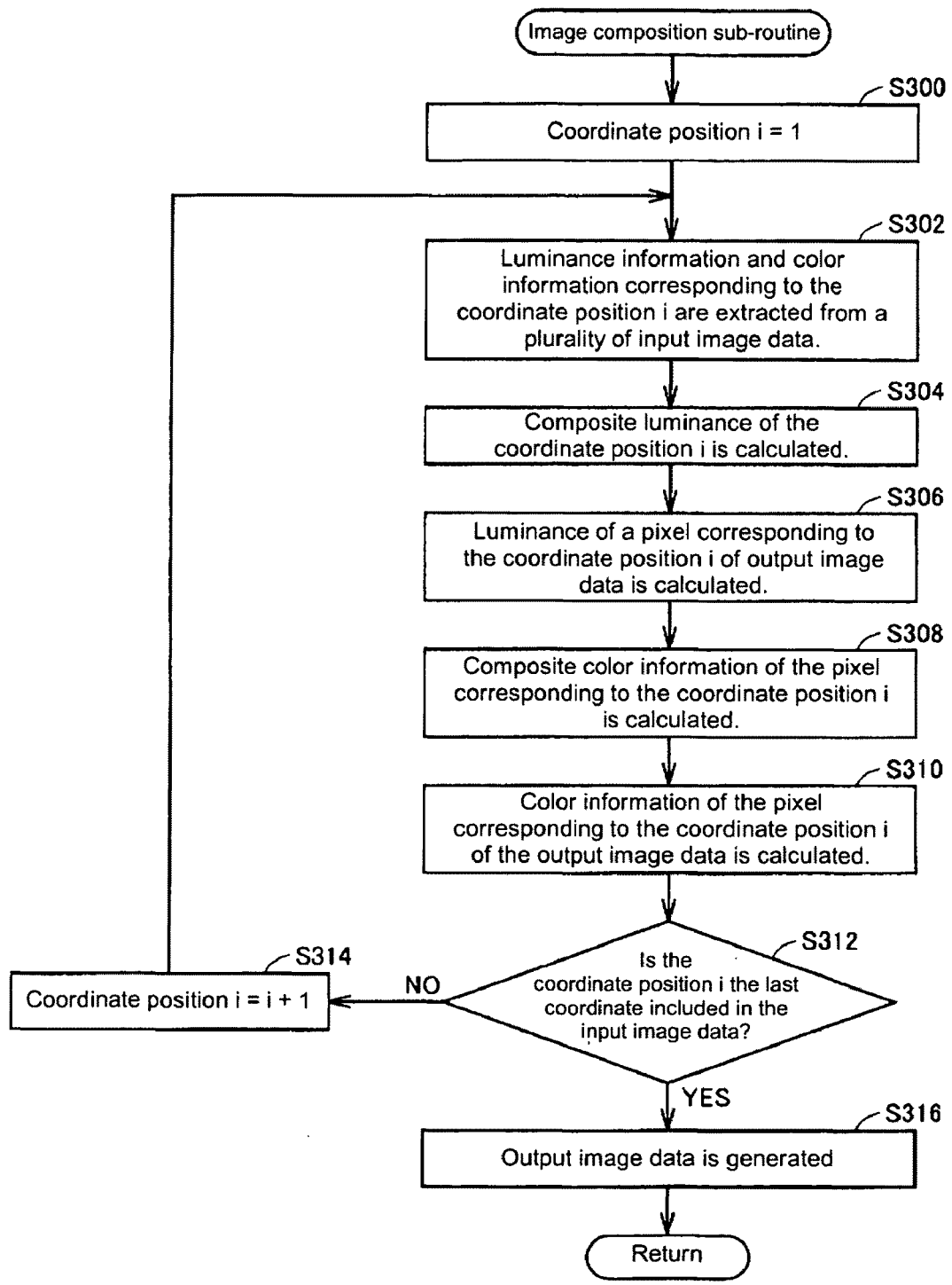
FIG. 19 shows a flowchart illustrating the processing in an image composition processing sub-routine shown in FIGS. 17 and 18.

FIG. 19 is a flowchart showing the processing in the image composition processing sub-routine shown in FIGS. 17 and 18. The flowchart shown in FIG. 19 is realized by reading out a program previously stored in the fixed disk 107 or the like into the memory 106 and executing this program by the CPU 105.

In FIG. 19, the CPU 105 sets a coordinate position i as the initial value (i=1) (step S300) and extracts luminance information and color information of the pixel corresponding to the coordinate position i, from a plurality of input image data (step S302).

Based on the luminance of the pixel corresponding to the coordinate position i, the CPU 105 calculates a composite luminance of the coordinate position (step S304). Then, the CPU 105 performs tone mapping in accordance with the set "brightness" upper/lower limit values and calculates the luminance of the pixel corresponding to the coordinate position i of the composite image data (step S306).

In addition, based on the color information of the pixel corresponding to the coordinate position i, the CPU 105 calculates composite color information of the pixel corresponding to the coordinate position i (step S308).

Further, based on the luminance calculated in step S306 and the composite color information calculated in step S308, the CPU 105 calculates the color information of the pixel corresponding to the coordinate position i of the composite image data (step S310).

Then, the CPU 105 determines whether or not the coordinate position i is a last coordinate included in the input image data (step S312). When the coordinate position i is not the last coordinate included in the input image data (NO in step S312), the CPU 105 adds "1" to the present coordinate position i (step S314) and repeats the processing after step S302.

When the coordinate position i is the last coordinate included in the input image data (YES in step S312), the CPU 105 generates the composite image data based on the color information corresponding to each coordinate position calculated in step S310 (Step S316). Then, the processing is returned to the main routine.

<Modification of the Present Embodiment>

In the aforementioned first embodiment, the structure of setting the range of the "brightness" upper/lower limit values by the user is shown. However, this range may be automatically set based on the histogram of the composite luminance calculated by the luminance composition part 210. When automatic setting is performed in this way, in order to obtain further higher accuracy, the range of the "brightness" upper/lower limit values may be set based on the histogram for the composite luminance of not a single but a plurality of composite image data, or the range of the brightness" upper/lower limit values may be set based on the histogram for part of the area of the composite image data.

Also, the flowchart of the change processing of the photographing condition shown in FIG. 18 shows the processing of searching an appropriate photographing condition by gradually subtracting the number of times of photographing from the initially set number of times of photographing. However, it is also acceptable that the number of times of photographing is set to be twice as the initial setting, and that the number of times of photographing is gradually increased to thereby search an appropriate photographing condition. Alternatively, it is also acceptable that all selectable photographing conditions are previously acquired, and the expected processing time based on each photographing condition is calculated, and that, based on the expected processing time calculated for each photographing condition, an appropriate photographing condition is selected.

<Effect of the Present Embodiment>

According to a conventional technique, generally, as the number of times of photographing is increased, extension of the dynamic range and improvement of accuracy of the composite image can be expected. However, the processing time required for generating one composite image is prolonged along with the increase of the number of times of photographing. That is, the extension of the dynamic range and the processing time are set to have a trade-off relation. At an actual production site, inspection and measurement must be performed, directed to the measuring objects sequentially conveyed on a conveying device such as a belt conveyor. Therefore, the processing time that can be allotted to each measuring object has an upper limit. Accordingly, there is a problem that the photographing conditions (such as the exposure condition and the number of times of photographing) must be appropriately set through try and error, so that a series of processing is completed within a restricted time in terms of manufacture as described above. However, according to the present embodiment, the photographing conditions can be appropriately set in accordance with the allowable time for one time of composition processing.

That is, according to the first embodiment of the present invention, when the user inputs the allowable time in the setting mode screen, the number of times of photographing and the exposure time in each photographing are automatically decided, so that the expected processing time required for generating one composite image data does not exceed the set time inputted by the user. Therefore, even if the user not having a preliminary knowledge can set appropriate photographing conditions only by inputting the "allowable time" in accordance with the takt time of the production line.

Second Embodiment

When the user sets the photographing conditions in the setting mode, it is considered that in many cases, illumination or the like is adjusted through try and error, according to a conveying speed of the workpiece. In this case, when a moving amount (motion amount) per unit time of the workpiece is relatively large, the motion of the workpiece cannot be displayed unless the processing time required for generating the composite image data is shortened. Therefore, description will be given for a structure enabling setting of the photographing conditions while observing the motion of the measuring object, even by a user not having preliminary knowledge, as the image processing apparatus according to a second embodiment.

An overall structure of a visual sensor system 1 including the image processing apparatus according to the second embodiment of the present invention is the same as the structure of FIG. 1, and therefore detailed description is not repeated. Also, a hardware configuration of the image processing apparatus according to the second embodiment of the present invention is the same as the structure of FIG. 2, and therefore detailed description is not repeated.

<Screen Display Example>

For the sake of easy understanding, a screen display example in the "setting mode" displayed on the monitor of the image processing apparatus according to the present embodiment will be described.

Figure 20:
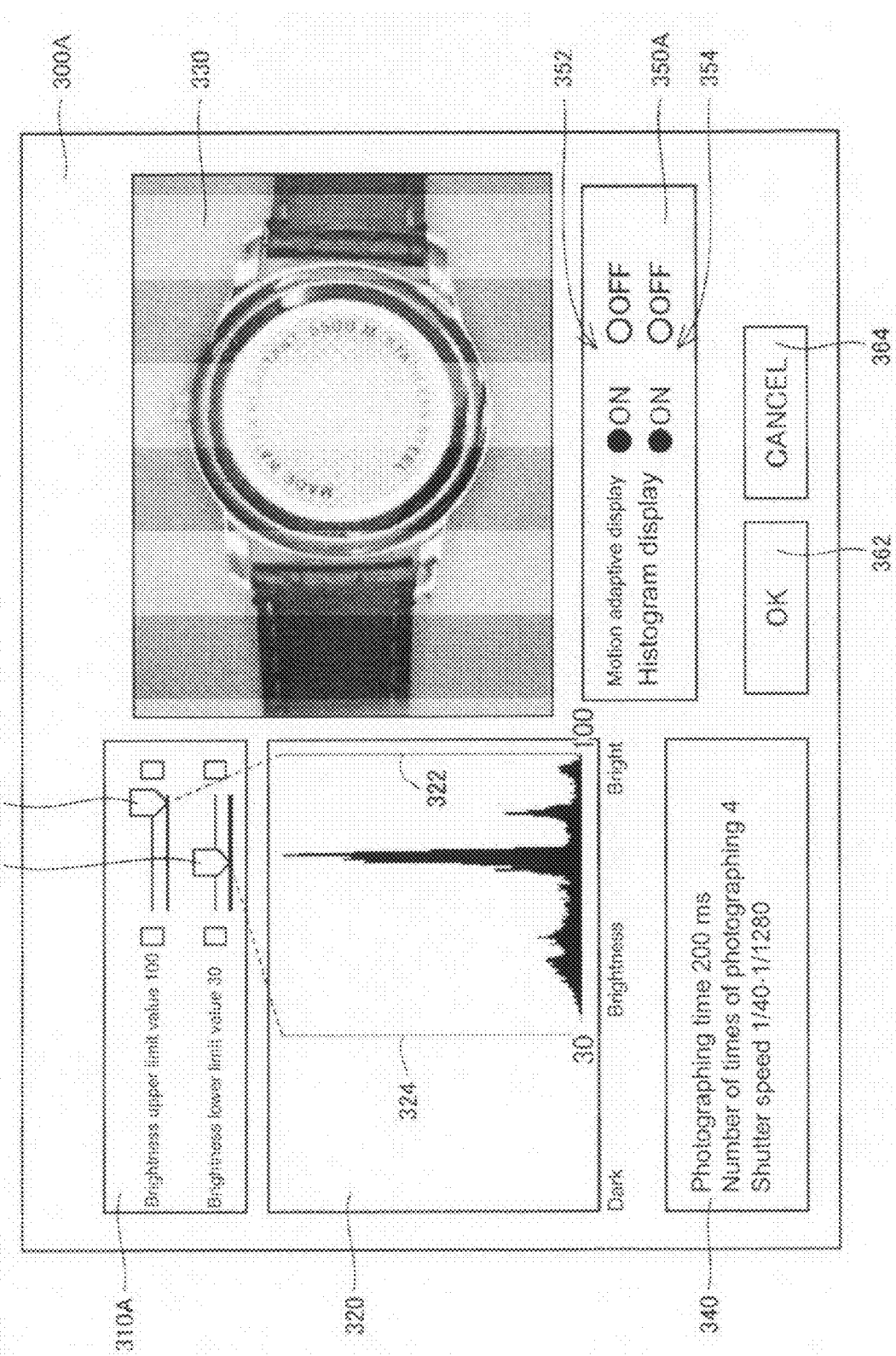
FIG. 20 shows a screen display example in a "setting mode" displayed on a monitor of an image processing apparatus according to a second embodiment of the present invention.

FIG. 20 shows a screen display example in the "setting mode" displayed on the monitor of the image processing apparatus according to the second embodiment of the present invention.

In FIG. 20, a setting mode screen 300A includes: a set value input area 310A; a histogram display area 320; a composite image display area 330; a photographing information display area 340; and a display mode selection area 350A.

Figure 21:
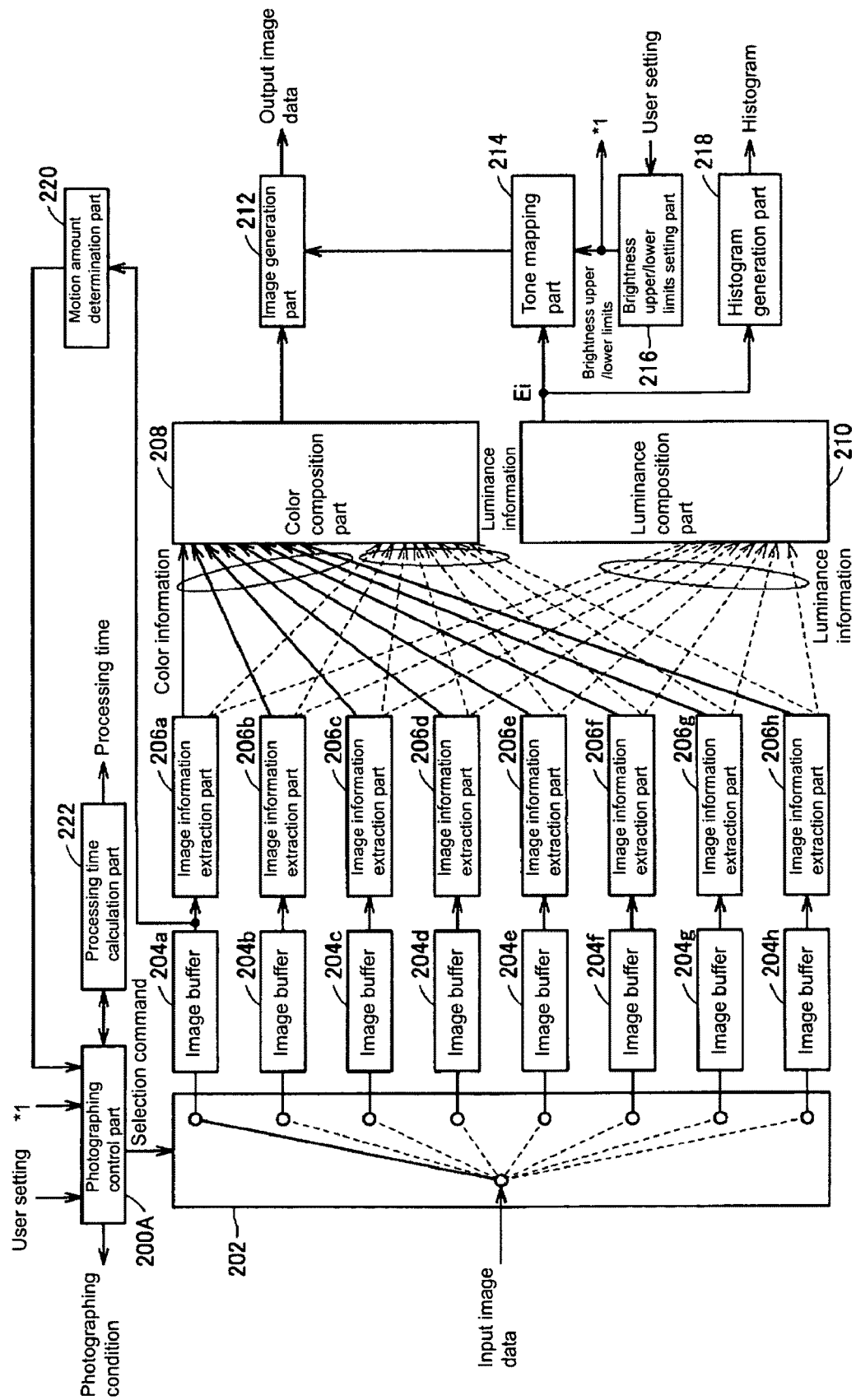
FIG. 21 shows a functional block diagram illustrating a control structure of the image processing apparatus according to the second embodiment of the present invention.

In the set value input area 310A, a slide bar 312 for setting the "brightness" upper limit value and a slide bar 314 for setting the "brightness" lower limit value are disposed. The "brightness" upper/lower limit values set through operation on these slide bars 312 and 314 are inputted in a brightness upper/lower limit setting part 216 (FIG. 21).

In the histogram display area 320, the histogram generated in the histogram generation part 218 (FIG. 21) is visually displayed.

In the composite image display area 330, the composite image based on the composite image data generated in accordance with the set "brightness" upper/lower limit values is displayed. An update cycle of the composite image based on the composite image data displayed in the composite image display area 330 corresponds to the time required for generating the composite image data. This update cycle of the composite image is optimized in accordance with a motion amount of the measuring object photographed by the image pickup part 8, when a "motion adaptive display mode" as will be described later is activated. Therefore, when the motion amount of the measuring object in a photographing range is relatively large, the time required for generating the composite image data can be shortened and the display can be made smooth. Meanwhile, when the motion amount of the measuring object in the photographing range is relatively small, the number of times of photographing can be increased, and the dynamic range can be extended and accuracy of the composite image can be enhanced.

In the photographing information display area 340, "photographing time", "the number of times of photographing", and "shutter speed" are displayed.

In the display mode selection area 350A, a radio button 352 for selecting activation (ON) or inactivation (OFF) of the "motion adaptive display mode"; and a radio button 354 for selecting display/non-display of the histogram in the histogram display area 320 are displayed. When the "motion adaptive display mode" is activated by the radio button 352, as described above, the update cycle of the composite image displayed in the composite image display area 330 can be optimized in accordance with the motion amount of the workpiece within the photographing range.

Further, in the setting mode screen 300A, an "OK" button 362 and a "CANCEL" button 364 are disposed, and when the user selects the "OK" button 362, a value set in each item is stored in the fixed disk 107 or the like, and thereafter the processing is moved to the "operation mode". Meanwhile, when the user selects the "CANCEL" button 364, the processing is moved to the "operation mode" with a value set in each item not stored in the fixed disk 107 or the like.

<Control Structure>

FIG. 21 shows a functional block diagram illustrating a control structure of the image processing apparatus according to the second embodiment of the present invention.

FIG. 21 shows a control structure of the image processing apparatus according to the first embodiment shown in FIG. 4, wherein a photographing control part 200A is disposed instead of the photographing control part 200 and a motion amount determination part 220 is further disposed. The other parts and the operation are almost the same as those of the first embodiment, and therefore detailed description therefor is not repeated.

The motion amount determination part 220 calculates the motion amount of the measuring object photographed by the image pickup part 8 and evaluates the calculated motion amount. More specifically, the motion amount determination part 220 calculates the motion amount of the workpiece, by comparing two or more successive input image data having the same exposure condition, photographed by the image pickup part 8. As an example of a calculation method of such a motion amount, a difference of the luminance information or the color information between the corresponding pixels included in the two successive input image data is taken, and a sum of the differences regarding all pixels can be calculated as the motion amount. Alternatively, the motion amount of the workpiece may also be calculated by using optical flow means.

Note that FIG. 21 shows a structure of calculating the motion amount by the motion amount determination part 220, based on one input image data stored in the image buffer 204a. However, the motion amount may be calculated based on more input image data, or the motion amount may be calculated based on the composite image data outputted from the image generation part 212.

Further, when the calculated motion amount of the workpiece exceeds a predetermined value, the motion amount determination part 220 outputs an instruction for reducing the time required for generating the composite image data, to the photographing control part 200A. Further, when the calculated motion amount of the workpiece is small, the photographing control part 200A may be notified of the fact that the time required for generating the composite image data can be extended, from the motion amount determination part 220.

When the instruction for reducing the time required for generating the composite image data is received from the motion amount determination part 220, the photographing control part 200A changes the photographing conditions so as to reduce the number of times of photographing for generating one composite image data. Thus, a cycle of generating one composite image data is shortened, and therefore the update cycle of the composite image based on the composite image data is shortened, and further smooth motion picture display is performed in the composite image display area 330. Thus, even if the moving speed of the workpiece is relatively high, the user can view the behavior of the workpiece.

More specifically, when the instruction for reducing the time required for generating the composite image data is received from the motion amount determination part 220, the composite image display area 330 sets the number of times of photographing obtained by subtracting one from the present number of times of photographing, as a new photographing condition. Note that regarding a decision method of the exposure condition in each photographing based on the new photographing condition, it is possible to use the same method as the method described in the aforementioned first embodiment based on FIGS. 12 to 14.

In addition, when the photographing control part 200A is notified of the fact that the time required for generating the composite image data can be extended, from the motion amount determination part 220, the photographing conditions may be changed so that the number of times of photographing for generating one composite image data is further increased. By increasing the number of times of photographing, information amount for generating one composite image data can be increased. Thus, the composite image with its dynamic range further extended can be displayed in the composite image display area 330. Note that regarding the decision method of the exposure condition in each photographing when the number of times of photographing is increased, it is possible to adopt the same method as the method described in the first embodiment based on FIGS. 12 to 14.

Note that control for changing the photographing conditions in accordance with the motion amount of the workpiece is performed in parallel with the generation processing of the composite image data.

<Time Chart>

Figure 22:
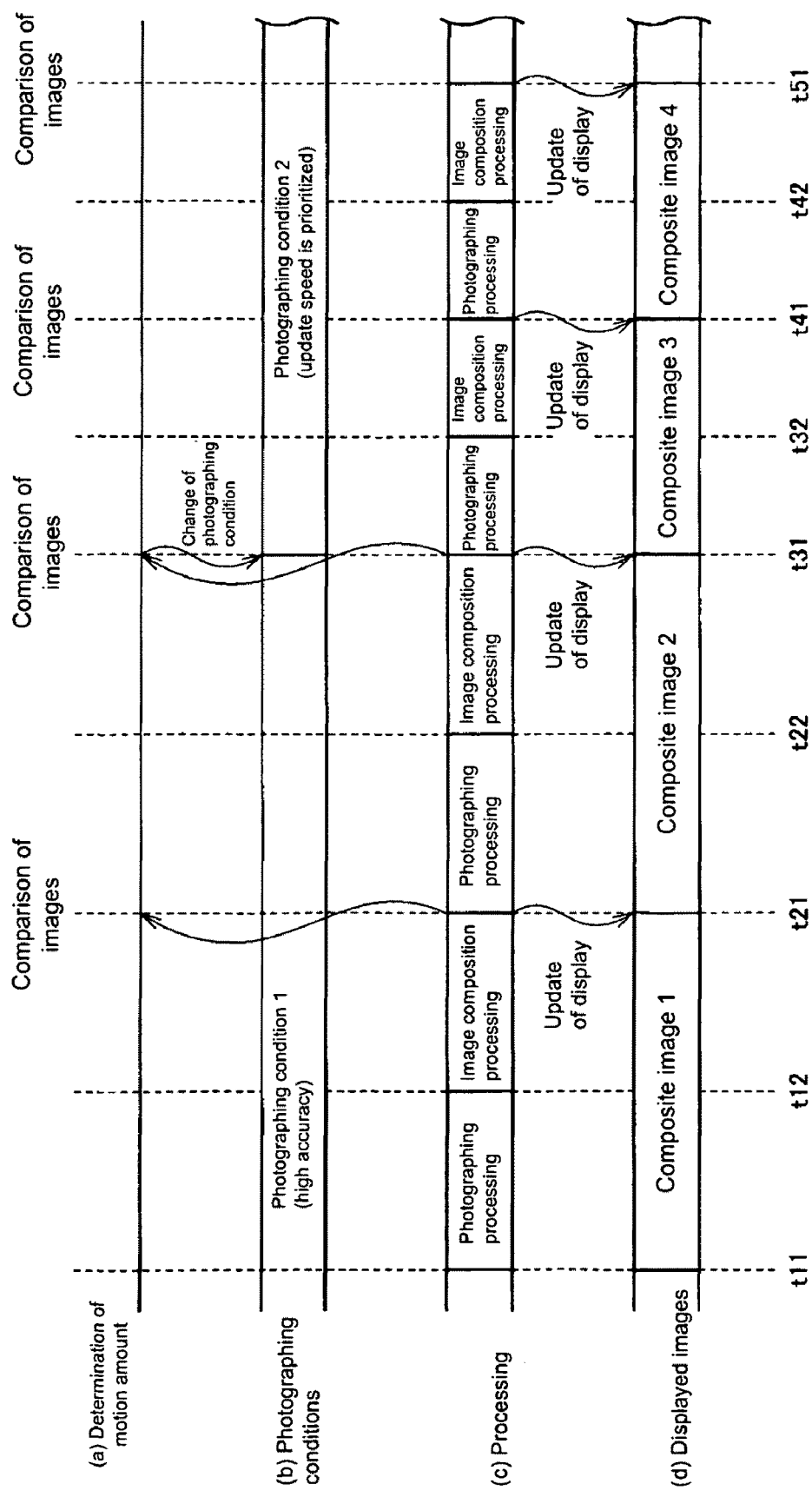
FIG. 22 shows a time chart illustrating an operation when a motion adaptive display mode according to the second embodiment of the present invention is enabled.

FIG. 22 is a time chart showing an operation when the motion adaptive display mode according to the second embodiment of the present invention is activated.

In FIG. 22, first, composite image data 1 is generated at time t11 through the processing before the time t11, and the composite image 1 based on this composite image data 1 is displayed in the composite image display area 330 (FIG. 20) (FIG. 22D).

The generation processing of one composite image data is executed in a period of time t11 to t21. That is, the workpiece is photographed by the image pickup part 8 in accordance with a photographing condition 1 defined in advance (FIGS. 22B and 22C). Note that the photographing condition 1 is a condition for realizing a high dynamic range. Then, in a period of the subsequent time t12 to t21, composite image data 2 is generated based on the photographed input image data (image composition processing).

Further, based on the generated composite image data 2, display of the composite image display area 330 is updated to a composite image 2 at time t21. Simultaneously, the motion amount determination part 220 compares the input image data used for generating the composite image data 2 and the input image data used for generating the composite image data 1, and determines the motion amount of the workpiece. In the comparison of images at time t21, the motion amount of the workpiece is within an appropriate range.

Subsequently, in a period of time t21 to t22, the image pickup part 8 photographs the workpiece in accordance with the photographing condition 1 (FIGS. 22B and 22C). Then, in the subsequent period of time t22 to t31, composite image data 3 is generated based on the photographed input image data. Further, at time t31, display of the composite image display area 330 is updated to the composite image 3 based on the generated composite image data 3. Simultaneously, the motion amount determination part 220 compares the input image data used for generating the composite image data 3 and the input image data used for generating the composite image data 2, and determines the motion amount of the workpiece.

In the comparison of the images at time t31, the motion amount of the workpiece is assumed to exceed a predetermined amount. Then, the photographing control part 200A determines that the update cycle of the composite image must be shortened, and sets the number of times of photographing obtained by subtracting one from the number of times of photographing of the photographing condition 1, as a new photographing condition 2 (FIG. 22B). This photographing condition 2 is a mode in which the update speed of the composite image is prioritized.

Subsequently, in a period of time t31 to t32, the image pickup part 8 photographs the workpiece in accordance with the photographing condition 2 (FIGS. 22B and 22C). The photographing condition 2 is a mode in which a display speed of the composite image is prioritized, and therefore the time required for photographing the workpiece is shortened compared with the time based on the photographing condition 1 (t12−t11>t32−t31). Then, in the subsequent period of time t32 to t41, composite image data 4 is generated based on the photographed input image data. However, the number of the input image data is reduced, and therefore the time required for this image composition processing is also shortened. Thus, the update cycle of the composite image is shortened, and the composite image can be further smoothly displayed.

<Processing Procedure>

Overall processing in the image processing apparatus according to the second embodiment of the present invention is the same as the flowchart shown in FIG. 17, and therefore detailed description therefor is not repeated.

Figure 23:
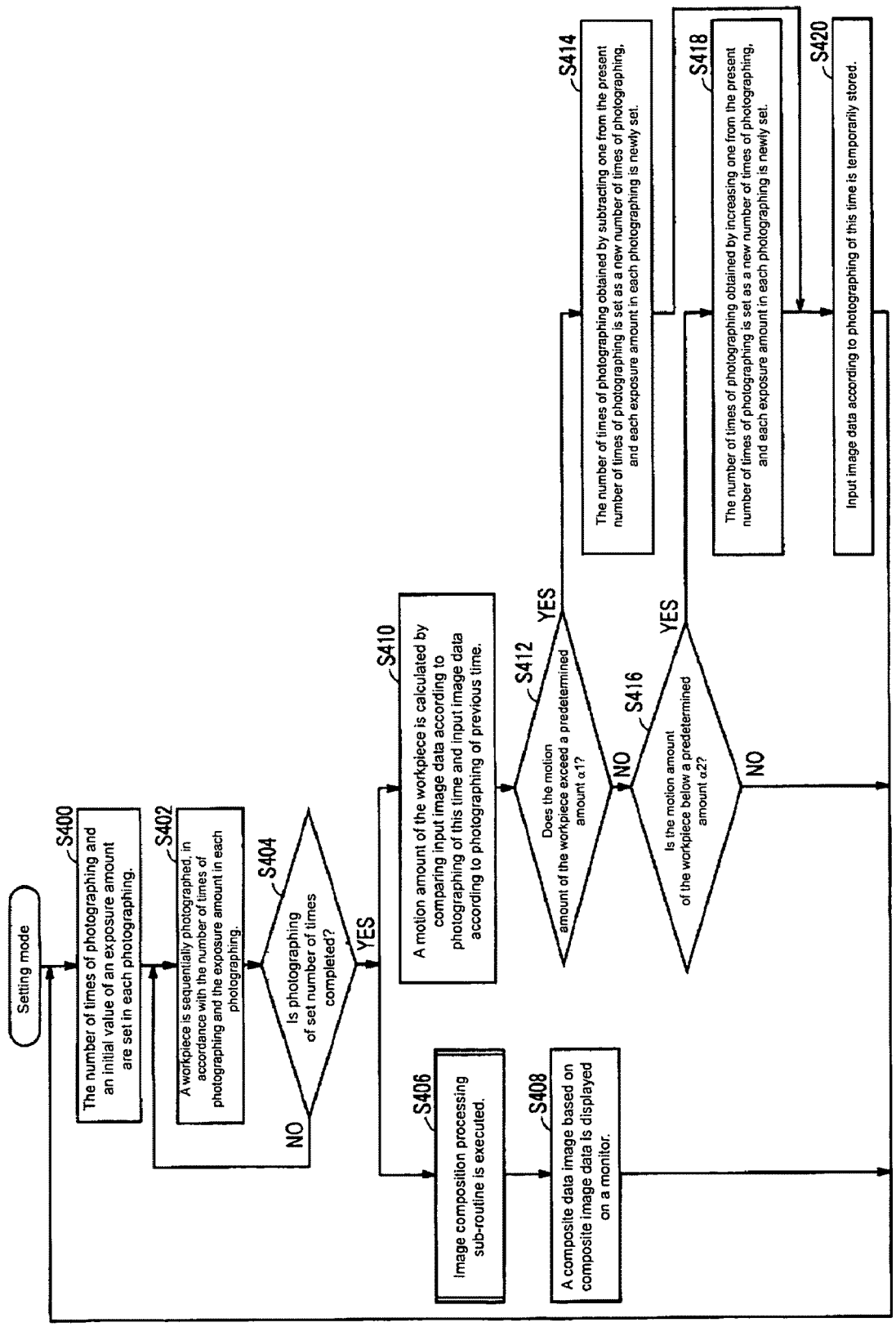
FIG. 23 shows a flowchart regarding the display of a composite image set in the "setting mode" in the image processing apparatus according to the second embodiment of the present invention.

FIG. 23 is a flowchart regarding the display of the composite image in the "setting mode" in the image processing apparatus according to the second embodiment of the present invention. The flowchart shown in FIG. 23 is realized by reading out a program previously stored in the fixed disk 107 or the like into the memory 106 and executing this program by the CPU 105.

In FIG. 23, when the "setting mode" is selected, the CPU 105 sets the number of times of photographing and the initial value of the exposure condition in each photographing (step S400). Then, the CPU 105 sequentially photographs the workpiece, in accordance with the number of times of photographing at the present time and the exposure condition in each photographing (step S402). Further, the CPU 105 determines whether or not the set number of times of photographing is completed (step S404). When the set number of times of photographing is not completed (NO in step S404), the CPU 105 repeats the processing of step S402.

When the set number of times of photographing is completed (YES in step S404), the CPU 105 executes the image composition processing sub-routine shown in FIG. 19, and generates the composite image data from the photographed input image data (step S406). Then, the CPU 105 displays the data composite image based on the composite image data generated in step S406, on the monitor 102 (step S408).

In parallel with the processing from the steps S406 and S408, the CPU 105 compares the input image data generated by photographing of this time and the input image data generated by photographing of the previous time, and calculates the motion amount of the workpiece (step S410). Then, the CPU 105 determines whether or not the motion amount of the workpiece calculated in step S410 exceeds a predetermined amount α1 (step S412). Note that the predetermined amount α1 is an amount corresponding to the motion amount of the workpiece within the photographing range of the image pickup part 8, which can be determined to be relatively large, and is defined based on a size of the photographing range of the image pickup part 8.

When the motion amount of the workpiece exceeds the predetermined amount α1 (YES in step S412), the CPU 105 sets the number of times of photographing obtained by subtracting one from the present number of times of photographing, as a new number of times of photographing, and calculates and sets each exposure condition in each photographing in the new number of times of photographing (step S414).

Meanwhile, when the motion amount of the workpiece does not exceed the predetermined amount α1 (NO in step S412), the CPU 105 determines whether or not the motion amount of the workpiece calculated in step S410 is below a predetermined amount α2 (α2<α1) (step S416). Note that the predetermined amount α2 corresponds to an amount so determined that the time required for generating the composite image data can be extended, because the moving amount of the workpiece within the photographing range which is very small.

When the motion amount of the workpiece is below the predetermined amount α2 (YES in step S416), the CPU 105 sets the number of times of photographing obtained by adding one to the present number of times of photographing, as a new number of times of photographing, and calculates and sets each exposure condition in each photographing in the new number of times of photographing (step S418).

Meanwhile, when the motion amount of the workpiece is not below the predetermined amount α2 (NO in step S416), or after the processing from steps S414 and S418 is executed, the CPU 105 temporarily stores the input image data generated by photographing of this time, in the memory 106 or the like (step S420).

After the processing from steps S408 and S420 is executed, the processing after step S402 is repeated again, and such processing is repeated while the "setting mode" is selected.

<Effect of the Present Embodiment>

The generation processing of the composite image is repeated, and by sequentially updating the composite image along with generation thereof, the composite image can be displayed as a motion image. At this time, the update cycle of this composite image corresponds to the processing time required for generating one composite image. Therefore, when a moving amount (that is, a motion amount) per unit time of the measuring object within the photographing range is relatively large, the motion of the measuring object cannot be displayed, unless the processing time required for generating the composite image is shortened. Meanwhile, when the motion amount of the measuring object is relatively small, it is preferred that more processing time is allotted and further highly accurate composite image is generated. Thus, there has been a problem that the photographing conditions (such as the exposure condition and the number of times of photographing) must be appropriately set in accordance with the motion amount of the measuring object. However, according to the second embodiment of the present invention, the processing time required for generating one composite image data is automatically changed in accordance with the motion amount of the measuring object photographed by the image pickup apparatus, and the update cycle of the composite image is appropriately set. Therefore, the photographing condition can be set while observing the motion of the measuring object even by a user not having preliminary knowledge.

Third Embodiment

As described above, in the image composition processing according to the present invention, by using the luminance information and the color information of a plurality of input image data, the composite luminance information and the composite color information are calculated per pixel. Therefore, the time required for the image composition processing is proportional to the number of pixels and the number of input image data to be processed.

Meanwhile, the size of the workpiece to be inspected is small in many cases compared with the photographing range of the image pickup apparatus. In such a case, by performing image composition processing only for the pixel to be inspected, the processing time can be further shortened. Therefore, as the image processing apparatus according to the third embodiment, description will be given for a structure in which the image composition processing can be performed only for each pixel included in an area to be processed.

The overall structure of the visual sensor system 1 including the image processing apparatus according to the third embodiment of the present invention is the same as the structure of FIG. 1, and therefore detailed description therefor is not repeated. Also, the hardware configuration of the image processing apparatus according to the third embodiment of the present invention is the same as the structure of FIG. 2, and therefore detailed description therefor is not repeated.

<Screen Display Example>

First, for the sake of easy understanding, description will be given for a screen display example of the "setting mode" displayed on the monitor of the image processing apparatus according to the present embodiment.

Figure 24:
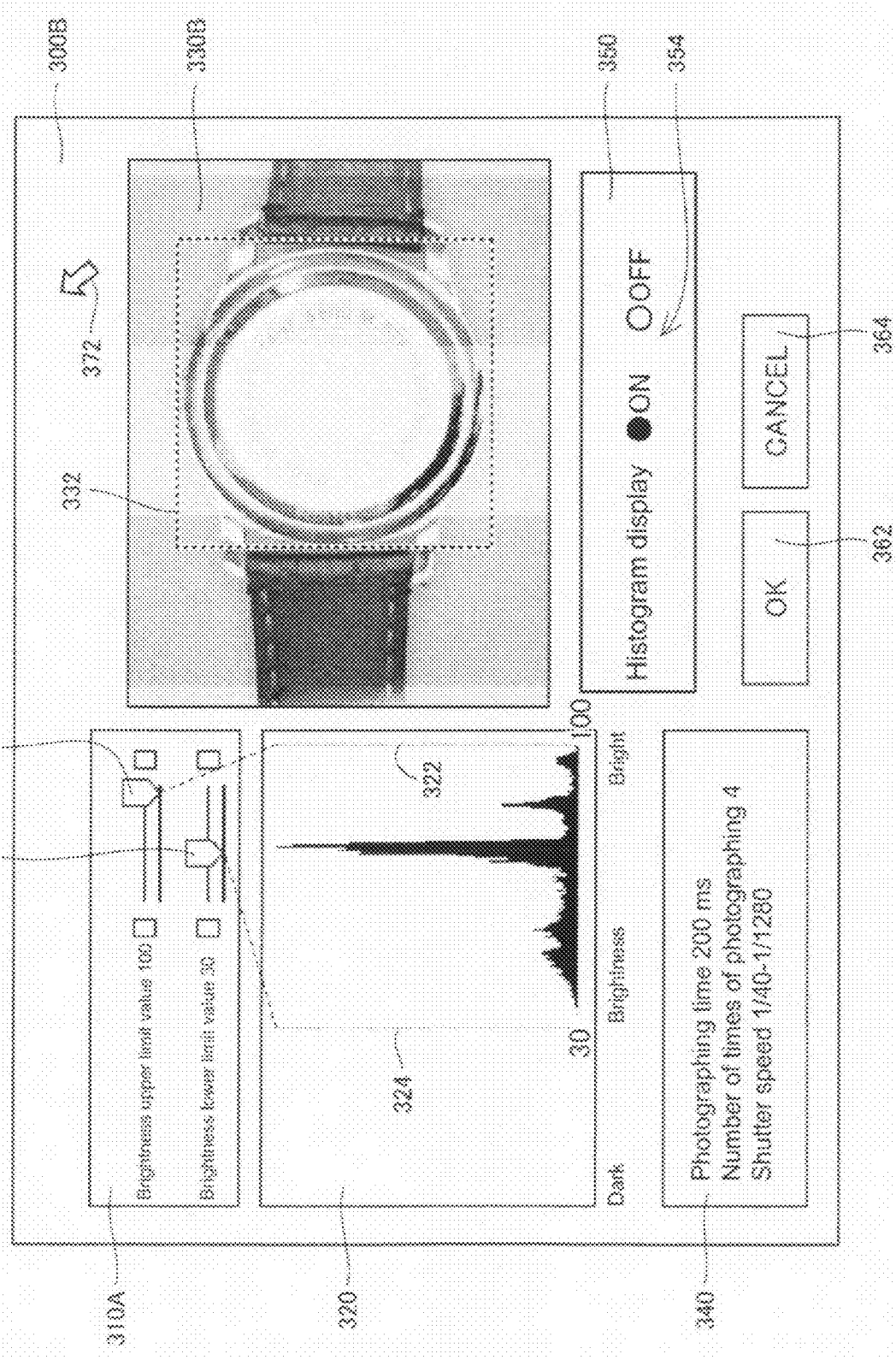
FIG. 24 shows a screen display example in a "setting mode" displayed on a monitor of an image processing apparatus according to a third embodiment of the present invention.
Figure 25:
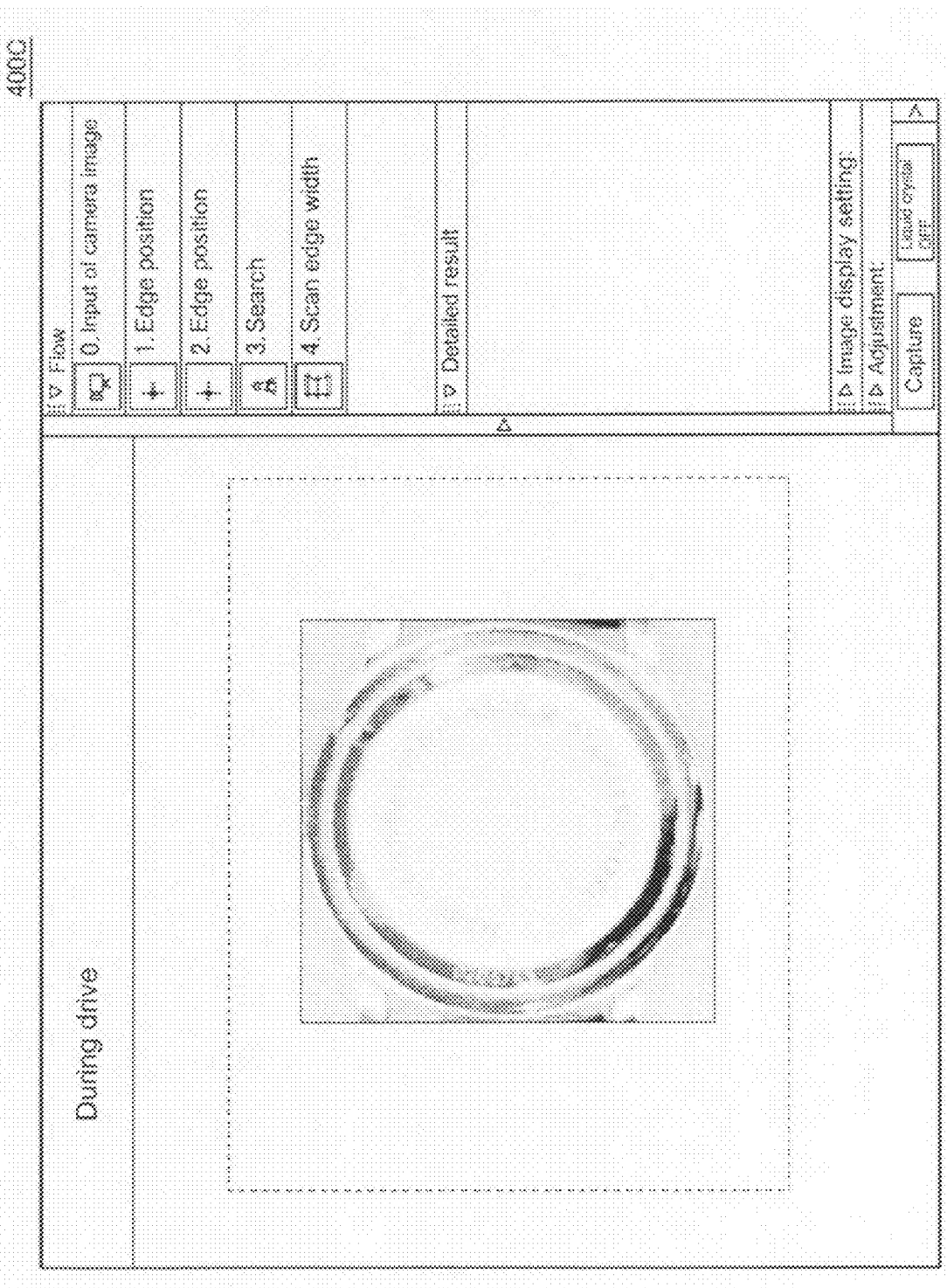
FIG. 25 shows a screen display example set in an "operation mode" displayed on the monitor of the image processing apparatus according to the third embodiment of the present invention.

FIG. 24 is a diagram illustrating a screen display example in the "setting mode" displayed on the monitor of the image processing apparatus according to the third embodiment of the present invention. FIG. 25 is a diagram illustrating a screen display example in the "operation mode" displayed on the monitor of the image processing apparatus according to the third embodiment of the present invention.

In FIG. 24, a setting mode screen 300B includes: a set value input area 310A; the histogram display area 320; a composite image display area 330B; the photographing information display area 340; and a display mode selection area 350.

Figure 26:
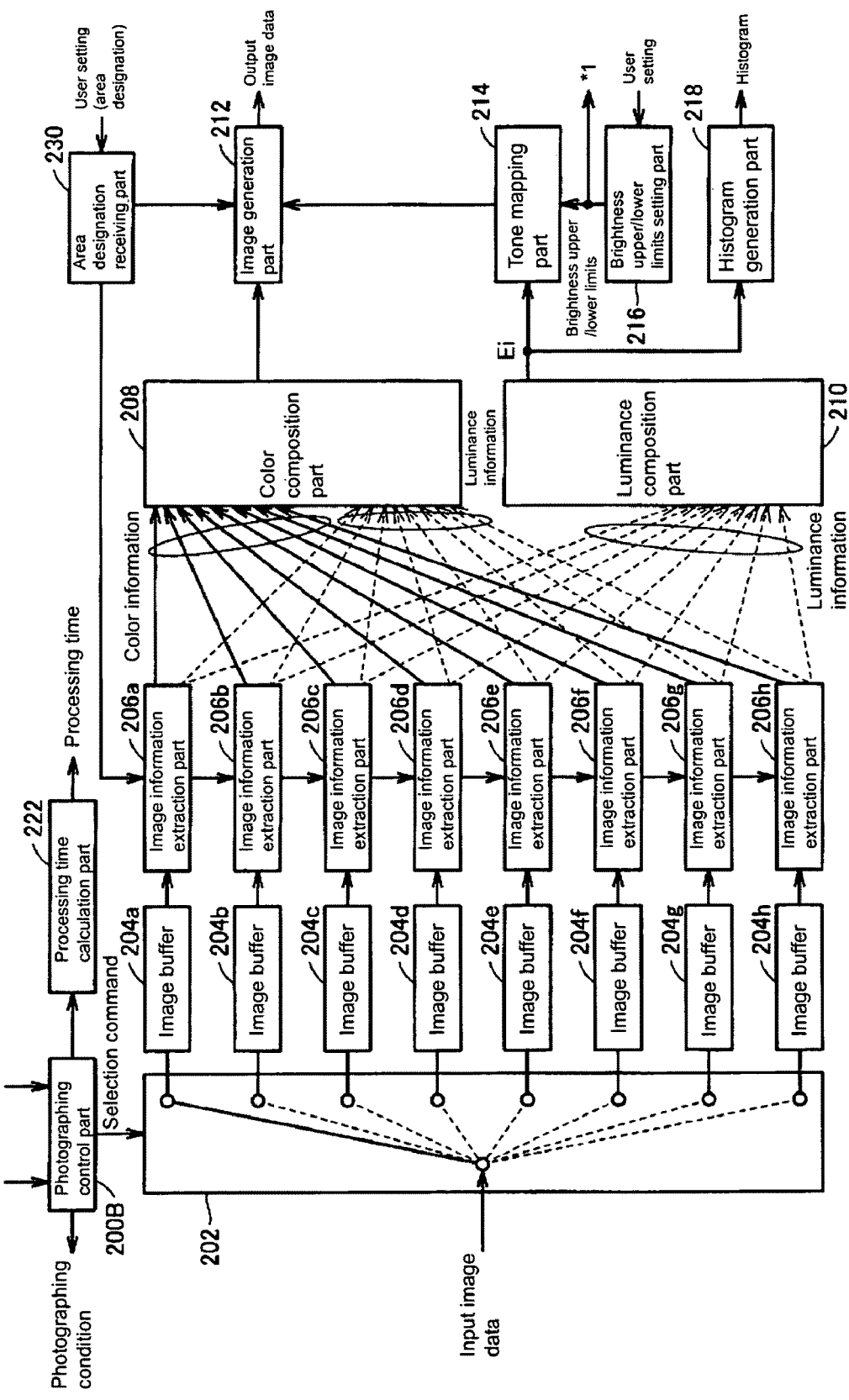
FIG. 26 shows a functional block diagram illustrating a control structure of the image processing apparatus according to the third embodiment of the present invention.

In the set value input area 310A, the slide bar 312 for setting the "brightness" upper limit value and the slide bar 314 for setting the "brightness" lower limit value are disposed. The "brightness" upper/lower limit values set through the operation of these slide bars 312 and 314 are inputted in the brightness upper/lower limit setting part 216 (FIG. 26).

In the histogram display area 320, the histogram generated in the histogram generation part 218 (FIG. 26) is visually displayed.

In the composite image display area 330B, the composite image based on the composite image data generated in accordance with the set "brightness" upper/lower limit values is displayed. An objective area frame 332 for setting an area to be processed in the composite image data can be set in the composite image display area 330B. This objective area frame 332 is designated by a cursor 372 or the like that can be moved in response to the operation of the mouse 104 (FIG. 2) by the user.

In FIG. 25, in the "operation mode", the image composition processing as described above is executed only for the pixels included in this objective area frame 332. Therefore, when the objective area frame 332 (FIG. 24) is set in the "operation mode", the composite image regarding the area included in the objective area frame 332 (FIG. 24) is displayed, and an image (or background) generated by processing with further shorter processing time is displayed in the other area. Note that for the sake of easy understanding, FIG.

25 shows an example of displaying an area excluding the area included in the objective area frame 332 (FIG. 24) as a background.

Note that for the sake of easy understanding, FIG. 24 shows a case of setting one objective area frame 332. However, a plurality of objective area frames 332 may also be set.

In the photographing information display area 340, the "photographing time", "the number of times of photographing", and "shutter speed" are displayed.

In the display mode selection area 350, the radio button 354 for selecting display/non-display of the histogram in the histogram display area 320 is displayed.

Further, in the setting mode screen 300B, the "OK" button 362 and the "CANCEL" button 364 are disposed, and when the user selects the "OK" button 362, the value set in each item is stored in the fixed disk 107 or the like, and thereafter the processing shifts to the "operation mode". Meanwhile, when the user selects the "CANCEL" button 364, the processing shifts to the "operation mode" with the value set in each item not stored in the fixed disk 107 or the like.

<Control Structure>

FIG. 26 is a functional block diagram illustrating a control structure of the image processing apparatus according to the third embodiment of the present invention.

FIG. 26 shows a control structure of the image processing apparatus according to the present embodiment, wherein a photographing control part 200B is disposed instead of the photographing control part 200 and an area designation receiving part 230 is further disposed in the control structure of the image processing apparatus according to the first embodiment. The other parts and operation are almost the same as those of the first embodiment, and therefore detailed description therefor is not repeated.

The area designation receiving part 230 receives setting of an area to be processed in the input image data (or composite image data) and outputs information for specifying the area to be processed, to image information extraction parts 206a to 206h. That is, the area designation receiving part 230 receives a setting content in the composite image display area 330B, in accordance with the objective area frame 332 designated by the user (FIG. 24).

Based on specified information from the area designation receiving part 230, the image information extraction parts 206a to 206h extract the color information and the luminance information respectively regarding each pixel included in the area to be processed, out of the input image data sequentially photographed by the image pickup part 8, and outputs them to the color composition part 208 and the luminance composition part 210.

Based on partial color information and luminance information extracted by the image information extraction parts 206a to 206h, the color composition part 208 generates the composite color information. Similarly, based on partial luminance information extracted by the image information extraction parts 206a to 206h, the luminance composition part 210 generates the composite luminance information. Further, the image generation part 212 generates the composite image in an area included in the objective area frame 332 after processing by the tone mapping part 214 and the brightness upper/lower limit setting part 216, and displays the composite image based on this composite image data in the composite image display area 330B.

Thus, the composite image processing is executed only for the pixels included in the area to be processed, out of the input image data. Therefore, the processing time required for generating one composite image data can be shortened.

Note that regarding each pixel of the composite image data excluding the pixel included in the area to be processed, the color information and the luminance information of the corresponding pixels of the composite image data may be calculated, based on one of the input image data. More specifically, the color composition part 208 and the luminance composition part 210 output the color information and the luminance information regarding each of the remaining pixels of any one of the input image data (such as the input image data stored in the image buffer 204a) excluding the pixels included in the area to be processed, as the corresponding composite color information and composite luminance information. Thus, the remaining pixels of the composite image data excluding the pixels included in the area to be processed are substituted by the corresponding pixels of any one of the input image data.

In addition, it is also possible that each of the remaining pixels of the composite image data excluding the pixels included in the area to be processed, is substituted by a specific background color such as "white color" and "black color". More specifically, the image generation part 212 generates the composite image data by complementing the pixel whose composite color information and composite luminance information are not inputted, with the specific background color.

Also, each of the remaining pixels of the composite image data excluding the pixels included in the area to be processed may be updated with a long cycle compared with the update cycle (generation cycle) of the pixels included in the area to be processed. That is, photographing of the workpiece is repeatedly executed more than once based on different exposure conditions by the image pickup part 8, and along with this processing, the composite image data is sequentially generated. With generation of the composite image data, pixel information of the pixels included in the area to be processed is calculated (updated) every time. However, the remaining pixels excluding the pixels included in the area to be processed may be calculated (updated) every time the composite image data is generated a plurality of times. In other words, the update cycle of the remaining pixels excluding the pixels included in the area to be processed may be delayed compared with the update cycle of the pixels included in the area to be processed.

<Effect of the Present Embodiment>

According to the third embodiment of the present invention, by designating the area of the measuring object present in a portion of the photographing range of the image pickup apparatus, a necessary composite image of the measuring object that is an object to be inspected and measured can be efficiently generated. Thus, the processing time required for image composition can be shortened, and therefore influence on the takt time of the production line can be reduced.

Fourth Embodiment

As described above, in the image composition processing according the present invention, by allotting the composite luminance of each pixel calculated from a plurality of input image data in accordance with a predetermined correspondence relation, the luminance information of the corresponding pixels of the composite image data is generated. More specifically, allotment is performed such that a range from the "brightness" lower limit value to the "brightness" upper limit value of the composite luminance has a correspondence relation with the luminance range of the composite image data. The above-described first to third embodiments show a case in which the user inputs the "brightness" upper limit value and the "brightness" lower limit value.

Such an allotment is executed for displaying an area having "brightness" of a prescribe range of the measuring object photographed by the image pickup apparatus, with further high accuracy. Therefore, it is considered that the user frequently desires to display a specific area out of the photographed input image data with high accuracy. In such a case, if a desired area is designated and the "brightness" upper limit value and the "brightness" lower limit value suitable for the display of this designated area are automatically decided, this is user-friendly.

Therefore, description will be given for a structure enabling setting of the brightness range suitable for the display of an area focused by the user, as an image processing apparatus according to a fourth embodiment.

The overall structure of the visual sensor system 1 including the image processing apparatus according to the fourth embodiment of the present invention is the same as the structure of FIG. 1, and therefore detailed description therefor is not repeated. Also, the hardware configuration of the image processing apparatus according to the fourth embodiment of the present invention is the same as the structure of FIG. 2, and therefore detailed description therefor is not repeated.

<Screen Display Example>

First, for the sake of easy understanding, a screen display example in the "setting mode" displayed on the monitor of the image processing apparatus according to the present embodiment will be described.

Figure 27:
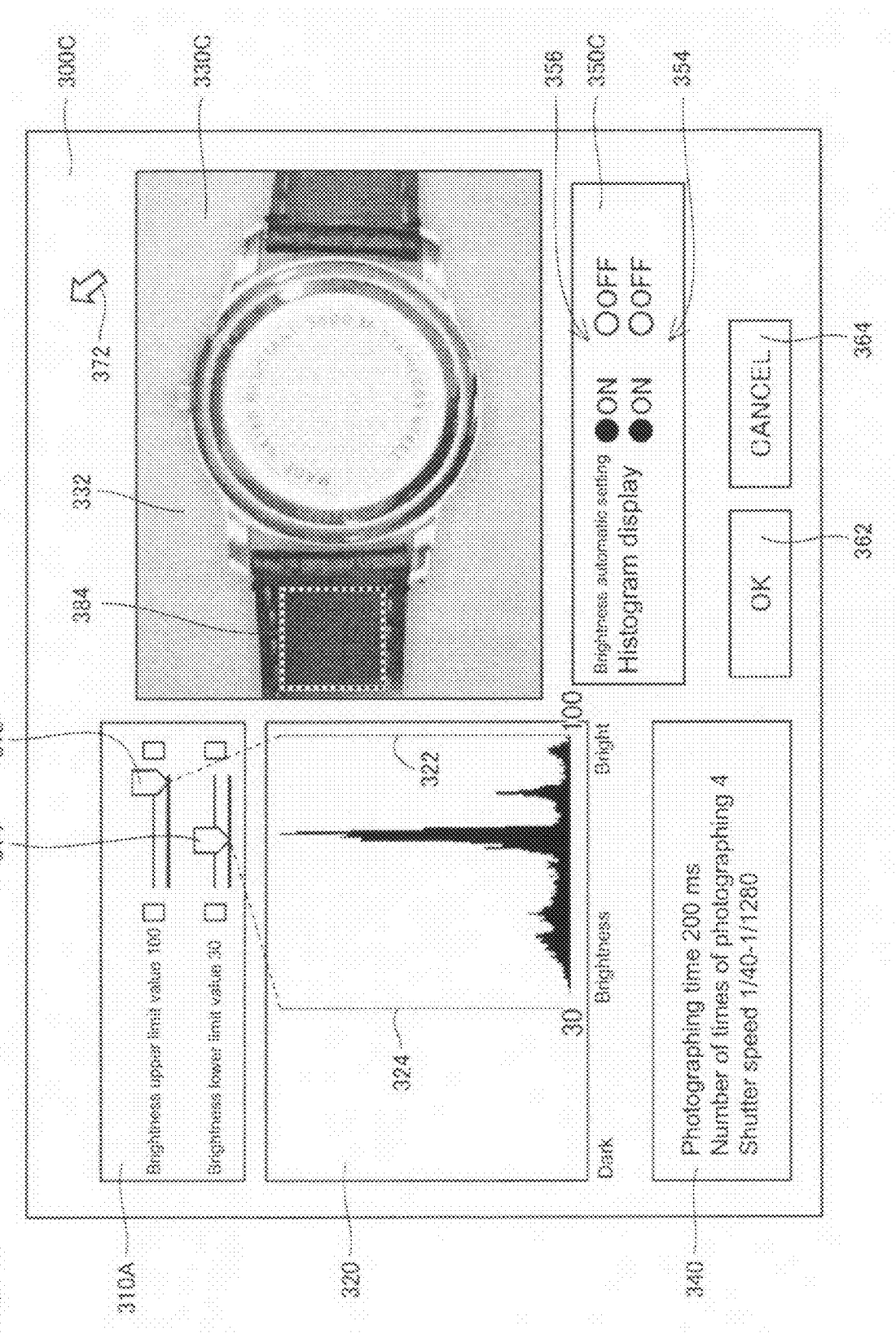
FIG. 27 shows a screen display example in a "setting mode" displayed on a monitor of an image processing apparatus according to a fourth embodiment of the present invention.
Figure 28:
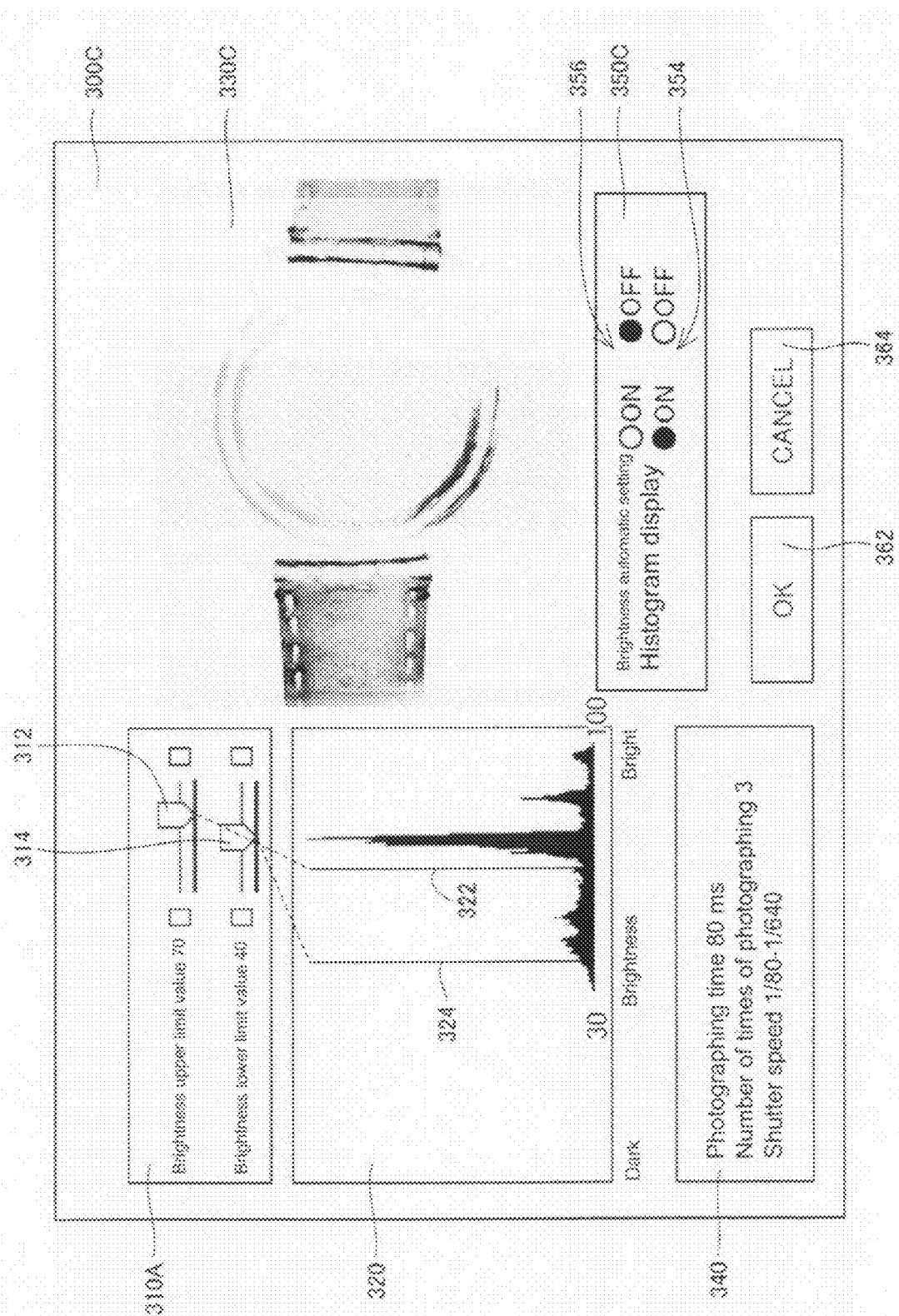
FIG. 28 shows a screen display example after a designation area is set in FIG. 27.

FIG. 27 is a diagram illustrating a screen display example in the "setting mode" displayed on the monitor of the image processing apparatus according to the fourth embodiment of the present invention. FIG. 28 is a diagram illustrating a screen display example after a designated area is set in FIG. 27.

In FIG. 27, a setting mode screen 300C includes the set value input area 310A; the histogram display area 320; a composite image display area 330C; the photographing information display area 340; and a display mode selection area 350C.

Figure 29:
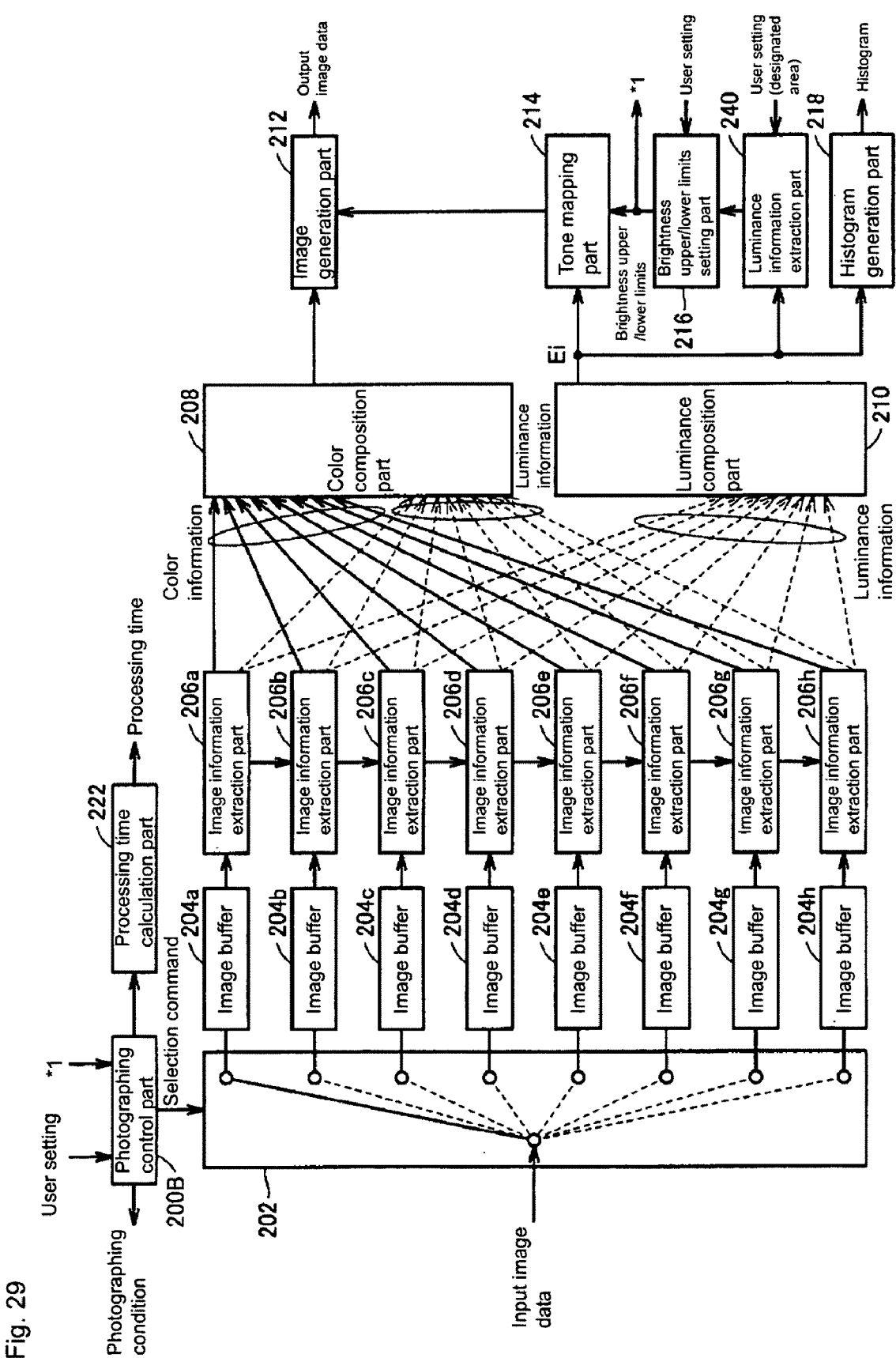
FIG. 29 shows a functional block diagram illustrating a control structure of the image processing apparatus according to the fourth embodiment of the present invention.

In the set value input area 310A, the slide bar 312 for setting the "brightness" upper limit value and the slide bar 314 for setting the "brightness" lower limit value are disposed. The "brightness" upper/lower limit values set through the operation of these slide bars 312 and 314 are inputted in the brightness upper/lower limit setting part 216 (FIG. 29).

In the histogram display area 320, the histogram generated in the histogram generation part 218 (FIG. 29) is visually displayed.

In the display mode selection area 350C, the radio button 354 for selecting display/non-display of the histogram in the histogram display area 320, and a radio button 356 for selecting activation (ON) or inactivation (OFF) of "brightness automatic setting" are displayed. When the non-display of the histogram is selected by the radio button 354, the histogram is not displayed in the histogram display area 320. Also, when the "brightness automatic setting" is activated (ON), a designated area frame 384 for setting the area to be processed can be set, out of the composite image based on the composite image data displayed in the composite image display area 330C.

As shown in FIG. 27, in the composite image display area 330C, first, the composite image in accordance with the initial "brightness" upper limit value and "brightness" lower limit value (for example, 0 to 100 "brightness") is displayed. As described above, when the "brightness automatic setting" is activated (ON), the designated area frame 384 can be set by the user in this composite image display area 330C. This designated area frame 384 is designated by the cursor 372 or the like movable in response to the mouse 104 (FIG. 2) operation by the user. Thus, a position and a size of the designated area can be set by the user depending on a purpose. The "brightness" upper limit value and the "brightness" lower limit value are automatically set in accordance with the composite luminance of the pixels included in this designated area frame 384. That is, a maximum value of the composite luminance of each pixel included in the designated area frame 384 is extracted to be set to the "brightness" upper limit value, and a minimum value is extracted to be set to the "brightness" lower limit value. Then, as shown in FIG. 28, the composite image display area 330C displays the composite image after the maximum value is changed to the set "brightness" upper limit value and the minimum value is changed to the set "brightness" lower limit value (for example, 40 to 70 "brightness").

That is, FIG. 27 shows a case in which a leather band portion of a wrist band watch, which is the measuring object, is set as the designated area, and FIG. 28 shows a case in which the pixels included in this designated area are displayed with further high accuracy (contrast). Note that in the example shown in FIG. 28, it is seen that the pixels having higher composite luminance compared with the composite luminance of the pixels included in the designated area are displayed in a state of overexposure or in a state close to overexposure.

Note that FIG. 27 shows a case of setting one designated area frame 384 for the sake of easy understanding. However, a plurality of designated area frames 284 may also be set.

The photographing information display area 340 displays the "photographing time", "the number of times of photographing", and "shutter speed". Note that when the "brightness" upper limit value and the "brightness" lower limit value are changed in accordance with the setting of the designated area frame 384, the "photographing time", "the number of times of photographing", and "shutter speed" are also changed. Therefore, values after change are displayed in the photographing information display area 340.

Further, in the setting mode screen 300C, the "OK" button 362 and the "CANCEL" button 364 are disposed, and when the user selects the "OK" button 362, the value set in each item is stored in the fixed disk 107 or the like, and thereafter the processing shifts to the "operation mode". Meanwhile, when the user selects the "CANCEL" button 364, the processing shifts to the "operation mode" with the value set in each item not stored in the fixed disk 107 or the like.

<Control Structure>

FIG. 29 is a functional block diagram showing the control structure of the image processing apparatus in the operation mode, according to the fourth embodiment of the present invention.

Referring to FIG. 29, the control structure of the image processing apparatus according to the present embodiment is the control structure of the image processing apparatus according to the first embodiment shown in FIG. 4 wherein a photographing control part 200B is disposed instead of the photographing control part 200 and a luminance information extraction part 240 is further disposed. The other parts and the operation are almost the same as those of the first embodiment, and therefore detailed description therefor is not repeated.

The luminance information extraction part 240 receives the designated area set by the user out of the composite image data and extracts the value of the composite luminance of each pixel included in this designated area out of the composite luminance of each pixel outputted from the luminance composition part 210. Then, based on the value of the extracted composite luminance, the luminance information extraction part 240 decides the "brightness" upper limit value and the "brightness" lower limit value. As an example, the luminance information extraction part 240 decides the maximum value of the composite luminance of the pixels included in the designated area as the "brightness" upper limit value, and decides the minimum value of the composite luminance of the pixels included in the designated area as the "brightness" lower limit value. Then, the luminance information extraction part 240 outputs the decided "brightness" upper/lower limit values to the brightness upper/lower limit setting part 216.

The brightness upper/lower limit setting part 216 prioritizes the "brightness" upper/lower limit values inputted from the luminance information extraction part 240, instead of the "brightness" upper/lower limit values set through the operation of the slide bars 312 and 314 (FIGS. 27 and 28) by the user, and outputs these "brightness" upper/lower limit values to the tone mapping part 214.

The tone mapping part 214 generates the composite image data by executing allotment processing for each pixel outputted from the direct function luminance composition part 210, so that the range from the "brightness" lower limit value to the "brightness" upper limit value has a correspondence relation with the luminance range of the composite image data. Note that this allotment is performed in accordance with the correspondence relation expressed by the direct function regarding the luminance information as shown in FIG. 7.

Thus, of the composite image data, the "brightness" upper limit value and the "brightness" lower limit value suitable for the display of the designated area that the user desires display thereof are automatically decided. Therefore, the image of the measuring object included in this designated area can be displayed with further higher accuracy.

Note that regarding each of the remaining pixels out of the composite image data excluding the pixels included in the area to be processed, the color information and the luminance information of the corresponding pixels of the composite image data may be calculated based on one of the input image data. More specifically, the color composition part 208 and the luminance composition part 210 output the color information and the luminance information regarding each of the remaining pixels of any one of the input image data (such as the input image data stored in the image buffer 204*a*) excluding the pixels included in the area to be processed, as the corresponding composite color information and composite luminance information. Thus, the remaining pixels of the composite image data excluding the pixels included in the area to be processed are substituted by the corresponding pixels of any one of the input image data.

The aforementioned example shows processing in which the maximum value and the minimum value of the composite luminance of the pixels included in the designated area are respectively set as the "brightness" upper limit value and the "brightness" lower limit value of the composite luminance. However, as other processing, it is also possible to adopt a method of deciding a predetermined range as the "brightness" upper/lower limit values with a most frequent value of the composite luminance of the pixels included in the designated area as a center, and a method of deciding the "brightness" upper/lower limit values based on a dispersion value of the composite luminance of the pixels included in the designated area.

<Effect of the Present Embodiment>

According to the fourth embodiment of the present invention, by visually designating the area to be displayed with high accuracy or the area to be inspected by the user, the "brightness" upper limit value and the "brightness" lower limit value suitable for the display of such areas are automatically decided. Therefore, the time required for adjusting the setting by the user can be shortened. Thus, a setting condition appropriate for the measuring object can be decided even by a user not having preliminary knowledge.

Fifth Embodiment

The above-described first embodiment shows a structure of changing the photographing conditions so that the expected processing time required for generating one composite image data falls within the allowable time set by the user, the second embodiment shows a structure of changing the photographing conditions so that the motion of the workpiece can be appropriately displayed in accordance with the motion amount of the workpiece in the photographing range, and the above-described third embodiment shows a structure of shortening the processing time required for generating one composite image data by applying image composition processing only to the pixels included in the area to be processed.

Of these structures according to each embodiment, it is also possible that appropriate structures are combined and incorporated into a single image processing apparatus. That is, the above-described structures according to each embodiment can coexist and can be suitably combined.

Note that in the description of the first to fourth embodiments, a case of using color image data is mainly shown. However, the present invention can also be similarly applied to monochromatic image data.

Other Embodiments

The program according to the present invention may be provided for executing processing by calling a necessary module in a predetermined array at predetermined timing, out of program modules provided as part of an operating system (OS) of a computer. In this case, the aforementioned module is not included in the program itself, and the processing is executed in cooperation with the OS. The program not including the module is also included in the program according to the present invention.

In addition, the program according to the present invention may be provided, incorporated into part of another program. In this case also, the module included in the another program is not included in the program itself, and the processing is executed in cooperation with the another program. The program incorporated into another program is also included in the program according to the present invention.

A program product provided is installed on a program storage part such as a hard disk and is executed. Note that the program product includes the program itself and a recording medium in which the program is stored.

Further, part of or the while of the function realized by the program according to the present invention may be constituted by dedicated hardware.

The embodiments disclosed this time should be considered for illustrative purpose only and are not restrictive. The scope of the present invention is defined not by the foregoing description but by the appended claims, and all changes and modifications are intended to be included within the scope of the claims and within the scope equivalent thereto.

What is claimed is:

1. An image processing apparatus, comprising:
   a camera interface connected to an image pickup part for photographing a measuring object and generating image data, such that a control instruction for controlling the image pickup part is outputted and the image data photographed by the image pickup part is inputted;

a display screen output part connected to a display part, for outputting image data for display displayed on the display part;

an input part that receives an input from the outside; and a processing part that executes processing, the image processing apparatus having a setting mode for performing setting based on the input received from the input part, and an operation mode for executing processing in accordance with the setting, wherein in the setting mode, the processing part outputs the control instruction for causing the image pickup part to photograph the measuring object through a camera interface, based on a first photographing condition including a plurality of photographing conditions to differentiate a luminance of the inputted image data, receives the input of a plurality of image data corresponding to the plurality of photographing conditions based on the control instruction, acquires the plurality of image data, with luminance of constituent pixels expressed by a first gradation number, calculates a standardized luminance standardized based on a photographing condition corresponding to each image data, regarding the luminance of the pixels constituting each image data, generates composite image data expressed by a second gradation number of which a gradation number of a composite standardized luminance of pixels constituting an image is increased from the first gradation number, by compounding the standardized luminance of each pixel of each image data at a mutually corresponding coordinates position, in accordance with weighting imposed on the standardized luminance previously defined based on the photographing conditions, generates the image data for display by converting the luminance of each pixel as needed such that the second gradation number expressing the luminance of pixels constituting the composite image data becomes a third gradation number, to output this image data for display by the display screen output part, receives designation of an area in the image data for display and sets a designated area, through the input part, and performs processing of setting a photographing condition corresponding to each range of the standardized luminance, such that one or a plurality of photographing conditions corresponding to a range of a composite standardized luminance in the designated area defined by an upper limit value and a lower limit value of the composite standardized luminance of pixels constituting the designated area in the composite image data, are set as a second photographing condition, in accordance with a previously defined correspondence relation, and in the operation mode, when there are a plurality of second photographing conditions set in the setting mode, the processing part outputs the control instruction for causing the image pickup part to photograph the measuring object based on the set plurality of photographing conditions, through the camera interface part, receives the input of the plurality of image data corresponding to the plurality of photographing conditions based on the control instruction, acquires the plurality of image data in which the luminance of the constituent pixels is expressed by the first gradation number, calculates the standardized luminance standardized based on a photographing condition corresponding to each image data, regarding the luminance of the pixels constituting each image data, generates the composite image data, in which the gradation number of the composite standardized luminance of the pixels constituting the image is increased from the first gradation number, by compounding the standardized luminance of each pixel of each image data at a mutually corresponding coordinates position, in accordance with weighting imposed on the standardized luminance previously defined based on the photographing condition, converts luminance gradation regarding the composite standardized luminance of pixels constituting an entire area of the composite image data, by luminance gradation conversion for converting the luminance of each pixel such that a range of the composite standardized luminance in the designated area defined by the upper limit value and the lower limit value of the composite standardized luminance of pixels constituting the designated area in the composite image data, becomes a fourth gradation number, and performs processing of calculating image data to be processed so as to be provided to later image processing, and when the second photographing condition set in the setting mode is one photographing condition, the processing part outputs the control instruction for causing the image pickup part to photograph the measuring object, based on the set one photographing condition, through the camera interface part, receives the input of one of the image data corresponding to the photographing condition based on the control instruction, acquires the image data in which the luminance of the constituent pixels is expressed by the first gradation number, and calculates the standardized luminance standardized based on the photographing condition corresponding to this image data, regarding the luminance of the pixels constituting this image data, converts luminance gradation regarding the luminance of the pixels constituting an entire area of the image data, by luminance gradation conversion for converting the luminance of each pixel such that a range of the standardized luminance in the designated area defined by the upper limit value and the lower limit value of the standardized luminance of pixels constituting the designated area in the image data, becomes the fourth gradation number, and performs processing of calculating image data to be processed so as to be provided to later image processing.

2. The image processing apparatus according to claim 1, wherein a photographing condition for obtaining highest luminance of inputted image data, out of a plurality of photographing conditions included in the first photographing condition is a photographing condition that does not allow pixels having saturated luminance to be included in the image data inputted corresponding to this photographing condition.

3. The image processing apparatus according to claim 1, wherein the image data inputted through the camera interface part is the image data including color information, the processing part calculates the luminance of the pixels based on a sum of the luminance of each component constituting the color information of the pixels, and in any of the composite image data, the processing part calculates the color information of the pixels of the composite image data by compounding the color information of each pixel of a plurality of image data used for generating the composite image data at a mutually corresponding coordinates position, in accordance with previously defined weighting based on the photographing conditions, imposed on the standardized luminance of the pixels, and in any of the image data to be processed, the processing part calculates the image data to be processed including the color information, with the color information of the pixels of the image data to be processed set as the color information of the corresponding pixels of the image data before performing luminance gradation conversion.

4. The image processing apparatus according to claim 1, wherein the photographing conditions include exposure time of the image pickup part.

5. The image processing apparatus according to claim 1, wherein the photographing conditions include a diaphragm of the image pickup part.

6. The image processing apparatus according to claim 1, wherein the camera interface part is further connected to an illumination part for irradiating the measuring object with light, and the photographing conditions include illumination intensity of the illumination part.

7. An image processing apparatus, comprising:

a camera interface connected to an image pickup part for photographing a measuring object and generating image data, such that a control instruction for controlling the image pickup part is outputted and the image data photographed by the image pickup part is inputted;

a display screen output part connected to a display part, for outputting image data for display displayed on the display part;

an input part that receives an input from the outside; and a processing part that executes processing, the image processing apparatus having a setting mode for performing setting based on the input received from the input part, and an operation mode for executing processing in accordance with the setting, wherein in the setting mode, the processing part outputs the control instruction for causing the image pickup part to photograph the measuring object through a camera interface, based on a first photographing condition including a plurality of photographing conditions to differentiate a luminance of the inputted image data, receives the input of a plurality of image data corresponding to the plurality of photographing conditions based on the control instruction, acquires the plurality of image data in which luminance of constituent pixels is expressed by a first gradation number, calculates a standardized luminance standardized based on a photographing condition corresponding to each image data, regarding the luminance of the pixels constituting each image data, generates composite image data expressed by a second gradation number of which a gradation number of a composite standardized luminance of pixels constituting an image is increased from the first gradation number, by compounding the standardized luminance of each pixel of each image data at a mutually corresponding coordinates position in accordance with weighting imposed on the standardized luminance previously defined based on the photographing conditions, generates the image data for display by converting the luminance of each pixel as needed such that the second gradation number expressing the luminance of pixels constituting the composite image data becomes a third gradation number, and outputs this image data for display by the display screen output part, receives designation of an area in the image data for display and sets a designated area, through the input part, and performs processing of setting a photographing condition corresponding to each range of the standardized luminance, such that one or a plurality of photographing conditions corresponding to a range of a composite standardized luminance in the designated area defined by an upper limit value and a lower limit value of the composite standardized luminance of pixels constituting the designated area in the composite image data, are set as a second photographing condition, in accordance with a previously defined correspondence relation, and in the operation mode, when there are a plurality of second photographing conditions set in the setting mode, the processing part outputs the control instruction for causing the image pickup part to photograph the measuring object based on the set plurality of photographing conditions, through the camera interface part, receives the input of the plurality of image data corresponding to the plurality of photographing conditions based on the control instruction, and acquires the plurality of image data in which the luminance of constituent pixels is expressed by the first gradation number, and for the designated area, calculates the standardized luminance standardized based on a photographing condition corresponding to each image data, regarding the luminance of pixels constituting the designated area in each image data, makes a composite standardized luminance of each pixel of each image data at a mutually corresponding coordinates position, in accordance with weighting imposed on the standardized luminance previously defined based on the photographing conditions, calculates the image data to be processed in the designated area on which luminance gradation conversion is performed regarding the composite standardized luminance of pixels constituting the designated area, by luminance gradation conversion for converting the luminance of each pixel such that a range of a composite standardized luminance in the designated area defined by the upper limit value and the lower limit value of the composite standardized luminance of the pixels constituting the designated area, becomes a fourth gradation number, and for an area other than the designated area, calculates the standardized luminance standardized based on the photographing condition corresponding to the image data, regarding the luminance of pixels constituting the area other than the designated area in the image data generated based on one photographing condition out of the plurality of photographing conditions, calculates the image data to be processed in the area other than the designated area on which the luminance gradation conversion is performed regarding the standardized luminance of the pixels constituting the area other than the designated area by the luminance gradation conversion, and performs processing of creating the image data to be processed of an entire area including the image data to be processed of the designated area and the image data to be processed of the area other than the designated area, so as to be provided to later image processing, and when the second photographing condition set in the setting mode is one photographing condition, the processing part:

outputs the control instruction for causing the image pickup part to photograph the measuring object based on the set one photographing condition, through the camera interface, receives the input of one image data corresponding to the photographing condition based on the control instruction, acquires the image data in which luminance of constituent pixels is expressed by the first gradation number, converts luminance gradation regarding the luminance of pixels constituting an entire area of the image data, by luminance gradation conversion for converting the luminance of each pixel such that a luminance range in the designated area defined by the upper limit value and the lower limit value of the standardized luminance of the pixels constituting the designated area in this image data, becomes the fourth gradation number, and performs processing of calculating the image data to be processed so as to be provided to later image processing.

* * * * *